US011761058B2

(12) United States Patent
Li et al.

(10) Patent No.: US 11,761,058 B2
(45) Date of Patent: Sep. 19, 2023

(54) MATERIALS DERIVED FROM COAL USING ENVIRONMENTALLY FRIENDLY SOLVENTS

(71) Applicant: UNIVERSITY OF WYOMING, Laramie, WY (US)

(72) Inventors: Dongmei Li, Laramie, WY (US); Shuai Tan, Laramie, WY (US); Chenlin Li, Idaho Falls, ID (US); Luke Williams, Idaho Falls, ID (US)

(73) Assignee: UNIVERSITY OF WYOMING, Laramie, WY (US)

( * ) Notice: Subject to any disclaimer, the term of this patent is extended or adjusted under 35 U.S.C. 154(b) by 0 days.

(21) Appl. No.: 17/864,857

(22) Filed: Jul. 14, 2022

(65) Prior Publication Data
US 2022/0372595 A1 Nov. 24, 2022

Related U.S. Application Data

(62) Division of application No. 15/863,139, filed on Jan. 5, 2018, now abandoned.

(60) Provisional application No. 62/442,613, filed on Jan. 5, 2017.

(51) Int. Cl.
C22B 3/00 (2006.01)
C22B 7/00 (2006.01)
C22B 59/00 (2006.01)
C22B 3/22 (2006.01)
D01D 5/00 (2006.01)
D01F 1/02 (2006.01)
D01F 9/14 (2006.01)
C01F 17/218 (2020.01)
C01F 17/17 (2020.01)
D01F 9/22 (2006.01)

(52) U.S. Cl.
CPC .............. C22B 59/00 (2013.01); C01F 17/17 (2020.01); C01F 17/218 (2020.01); C22B 3/22 (2013.01); D01D 5/003 (2013.01); D01F 1/02 (2013.01); D01F 9/14 (2013.01); D01F 9/22 (2013.01); Y02P 10/20 (2015.11)

(58) Field of Classification Search
CPC .............. C22B 3/00; C22B 7/00; C22B 59/00
See application file for complete search history.

(56) References Cited

U.S. PATENT DOCUMENTS 3,700,583 A     10/1972   Salamony
2016/0222532 A1*  8/2016  Sutto .................. C25C 1/20

OTHER PUBLICATIONS

Raquel Prado, et al., Study of the influence of reutilization ionic liquid on lignin extraction, Journal of Cleaner Production 111 (2016) 125-132.
Joshua Cummings, et al., Physicochemical interactions of ionic liquids with coal; the viability of ionic liquids for pre-treatments in coal liquefaction, Fuel 143 (2015) 244-252.
Christian Abels, et al., Simple purification of ionic liquid solvents by nanofiltration in biorefining of lignocellulosic substrates, Journal of Membrane Science 405-406 (2012) 1-10.
Energy Department Announces $12 Million for Technologies to Produce Renewable Carbon Fiber from Biomass, Office of Energy Efficiency & Renewable Energy, Feb. 3, 2014, 2 pp.
Pere Miro', et al., An atlas of two-dimensional materials, Chem. Soc. Rev., 43 (2014) 6537-6554.
Marta Markiewicz, et al., Changes in zeta potential of imidazolium ionic liquids modified minerals—Implications for determining mechanism of adsorption. Chemosphere 90 (2013) 706-712.
Ngoc Lan Mai, et al., Methods for recovery of ionic liquids—A review, Process Biochemistry 49 (2014) 872-881.
Gregory A. Ten, et al., Plasma-Enhanced Atomic Layer Deposition of Palladium on a Polymer Substrate, Chem. Vap. Deposition 13 (2007) 307-311.
Loma Crowhurst, et al., Solvent-solute interactions in ionic liquids, Phys. Chem. Chem. Phys., 5 (2003) 2790-2794.
Jared L. Anderson, et al., Characterizing Ionic Liquids On the Basis of Multiple Solvation Interactions, J. Am. Chem. Soc., 124 (2002) 14247-14254.
R. Kostic, et al., Optical Characterization of Graphene and Highly Oriented Pyrolytic Graphite, Acta Physica Polonica A, Proceedings of the 2nd NanoCharm European School on Ellipsometry, NANOELLI09, 116 (2009), 718-721.
Daejin Kim, et al., Selective Extraction of Rare Earth Elements from Permanent Magnet Scraps with Membrane Solvent Extraction, Environ. Sci. Technol. 49 (2015), 9452?9459.
Lei et al.,Microwave-assisted extraction of Xianfeng lignite in 1-butyt-3-methyl-imidazotium 6-9—chloride. Fuel; Dec. 28, 2011; p. 630.
Zhao et al.,Coal based activated carbon nanofibers prepared by electrospinning. Journal 1-5 of Material Chemistry A; Apr. 8, 2014.
Kim et al., A Supported Liquid Membrane System for the Selective Recovery of Rare Earth 13 Elements from Neodymium-Based Permanent Magnets. Separation Science and Technology; Apr. 7, 2016.
International Search Report and Written Opinion for International Application No. PCT/US18/12552 dated Mar. 19, 2018.
Australian Examination Report for Application No. AU 2018205516 dated Dec. 3, 2019.

(Continued)

Primary Examiner — Randy Boyer
(74) Attorney, Agent, or Firm — Patterson + Sheridan, LLP

(57) ABSTRACT

In a first embodiment, a coal treatment process includes exposing a material comprising coal to ionic liquid(s) to form a first mixture, isolating a residue from the first mixture, forming a second mixture comprising the residue, and electrospinning the second mixture to form a carbon fiber precursor material. In a second embodiment, a coal treatment process includes exposing a material comprising coal to ionic liquid(s) to form a mixture comprising solids and a liquid fraction, separating and filtering the liquid fraction from the mixture, and isolating one or more compounds from the liquid fraction. In a third embodiment, a coal treatment process includes exposing a material comprising coal to ionic liquid(s) to form a first mixture comprising residues, exposing the first mixture to (a) an acid, (b) a solvent, or (c) both to form a second mixture, and isolating rare earth elements and rare earth element compounds.

26 Claims, 32 Drawing Sheets

(56) References Cited

OTHER PUBLICATIONS

Office Action for U.S. Appl. No. 15/863,139 dated Oct. 8, 2020.
Office Action for U.S. Appl. No. 15/863,139 dated Mar. 25, 2021.
Final Office Action for U.S. Appl. No. 15/863,139 dated Aug. 5, 2021.
Office Action for U.S. Appl. No. 15/863,139 dated Dec. 21, 2021.
Y. Li et al., Ionic Liquids to Extract Valuable Components From Direct Coal Liquefaction Residues, 94FUEL 617-619 (2012).
G.-Z. Yang et al., Influence of Working Temperature on the Formation of Electrospun Polymer Nanofibers, 12:55 Nanoscaleres. Lett. (2017).
O. Zabihi et al., Low-Cost Carbon Fibre Derived from Sustainable Coal Tar Pitch and Polyacrylonitrile: Fabrication andCharacterisation, 12 Materials 1281 (2019).

\* cited by examiner

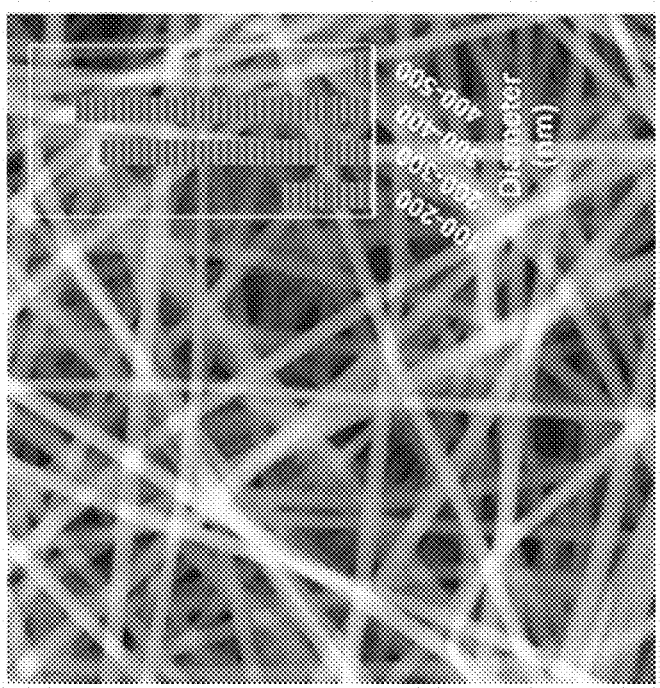
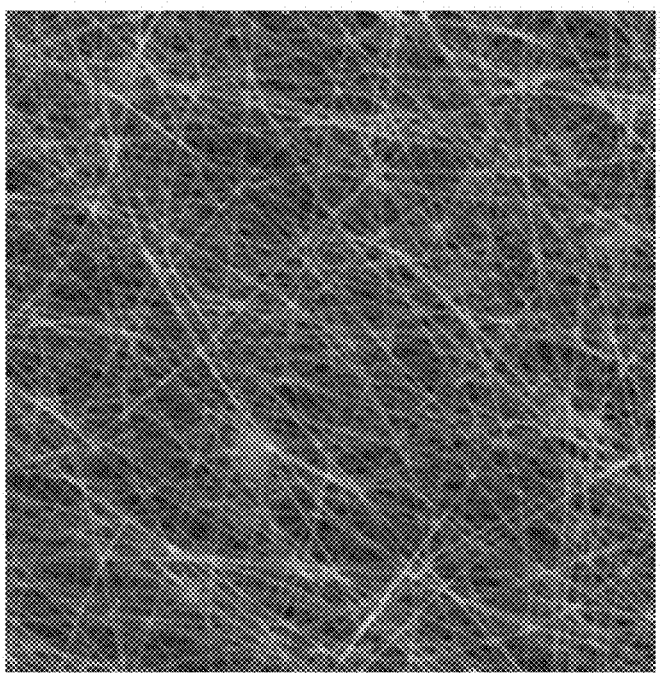

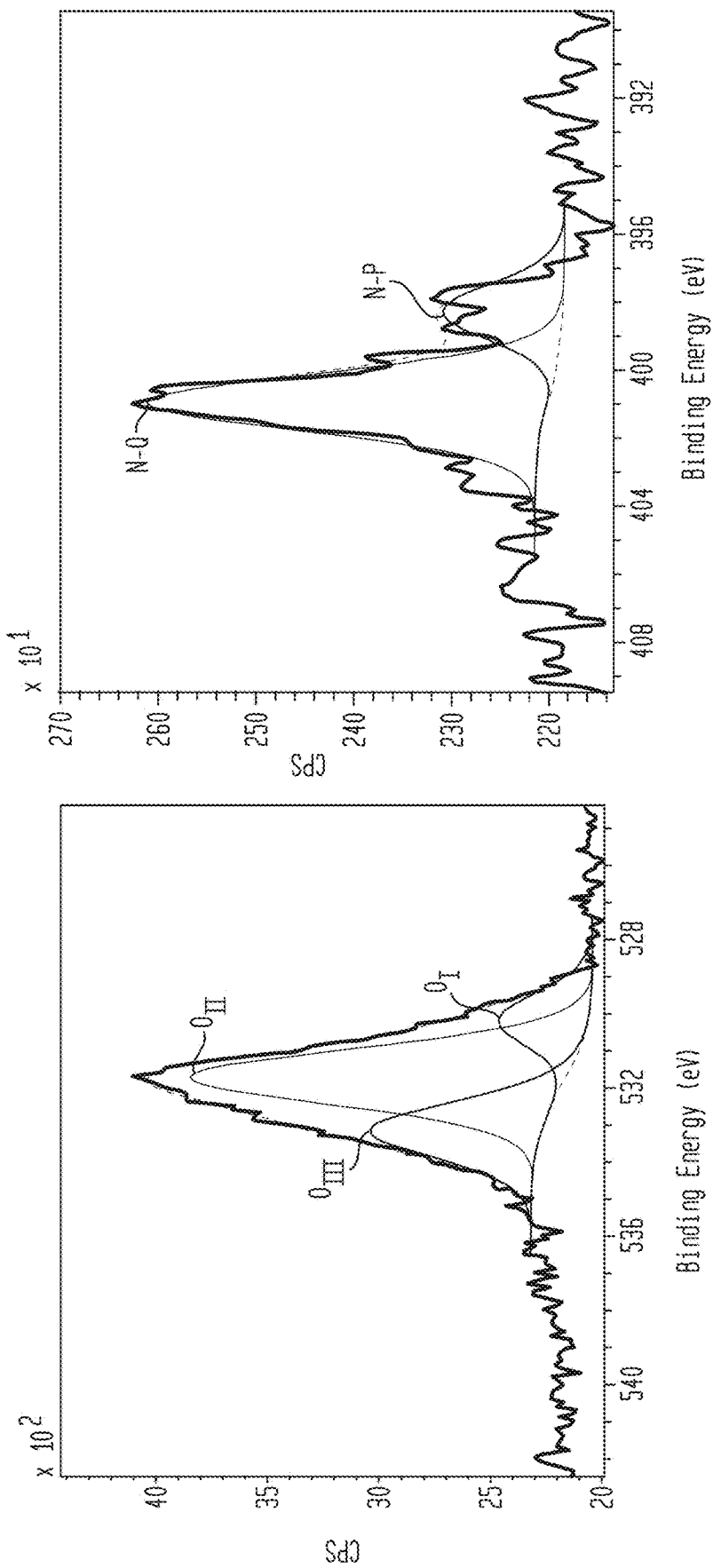

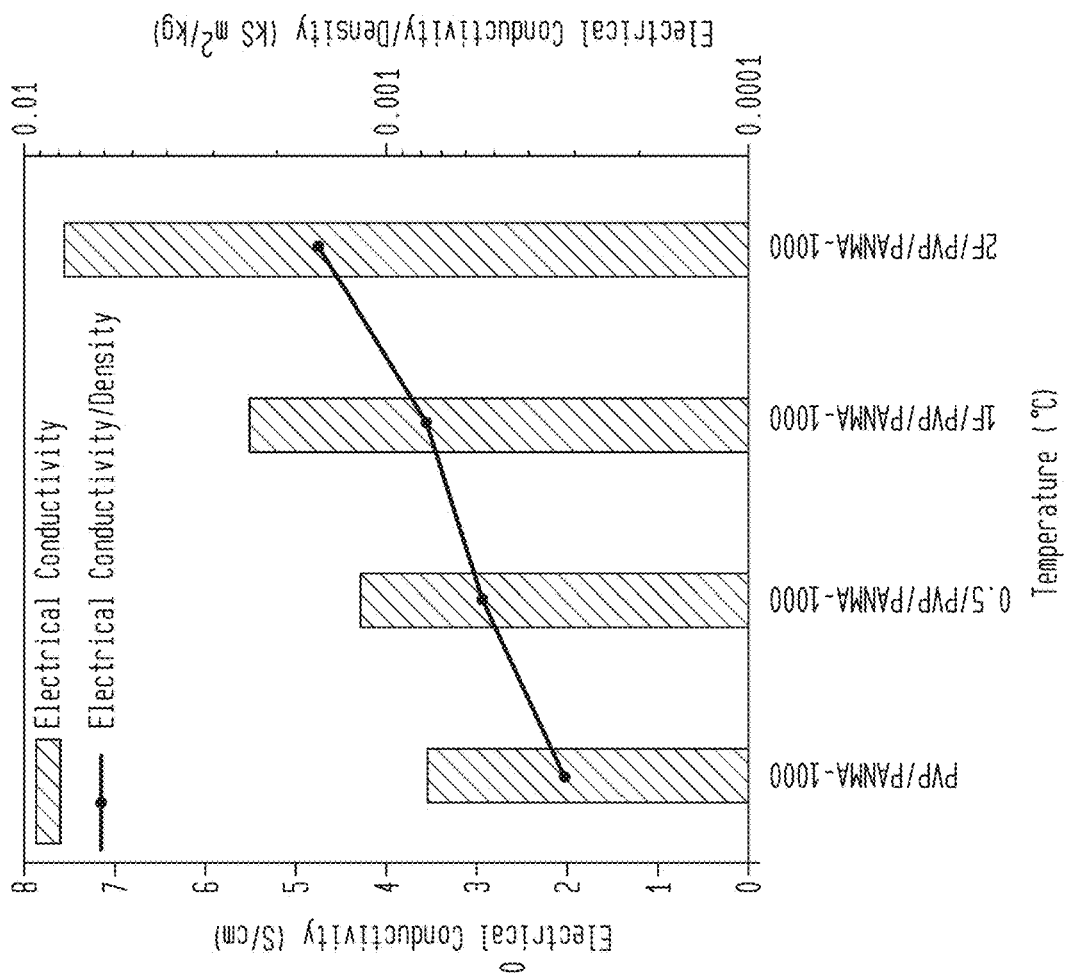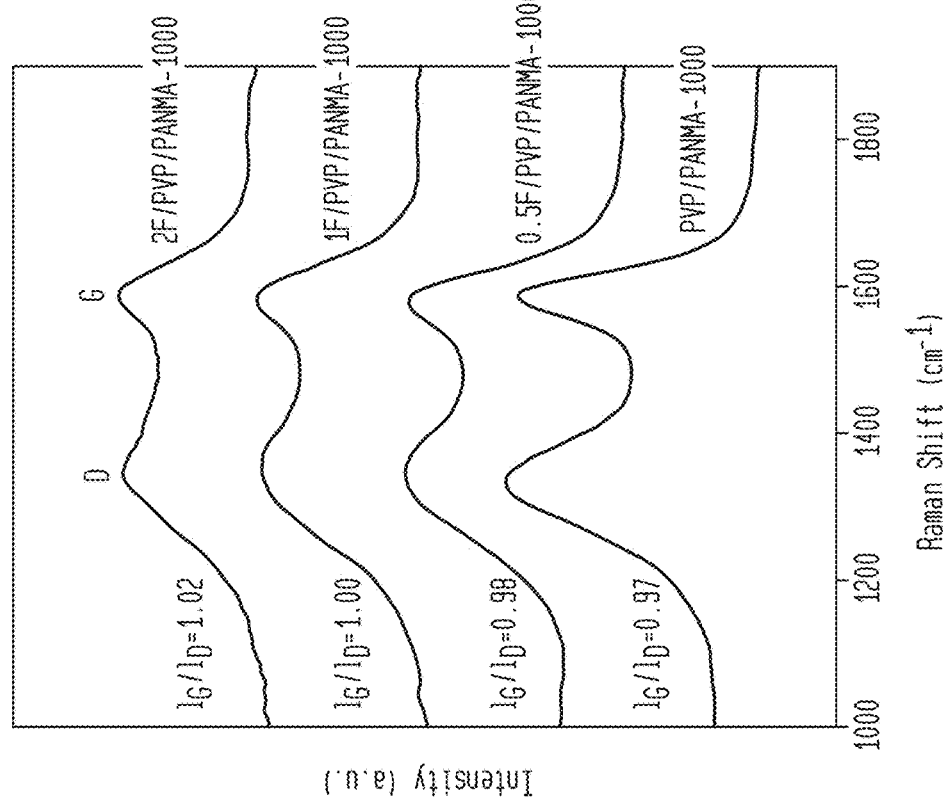

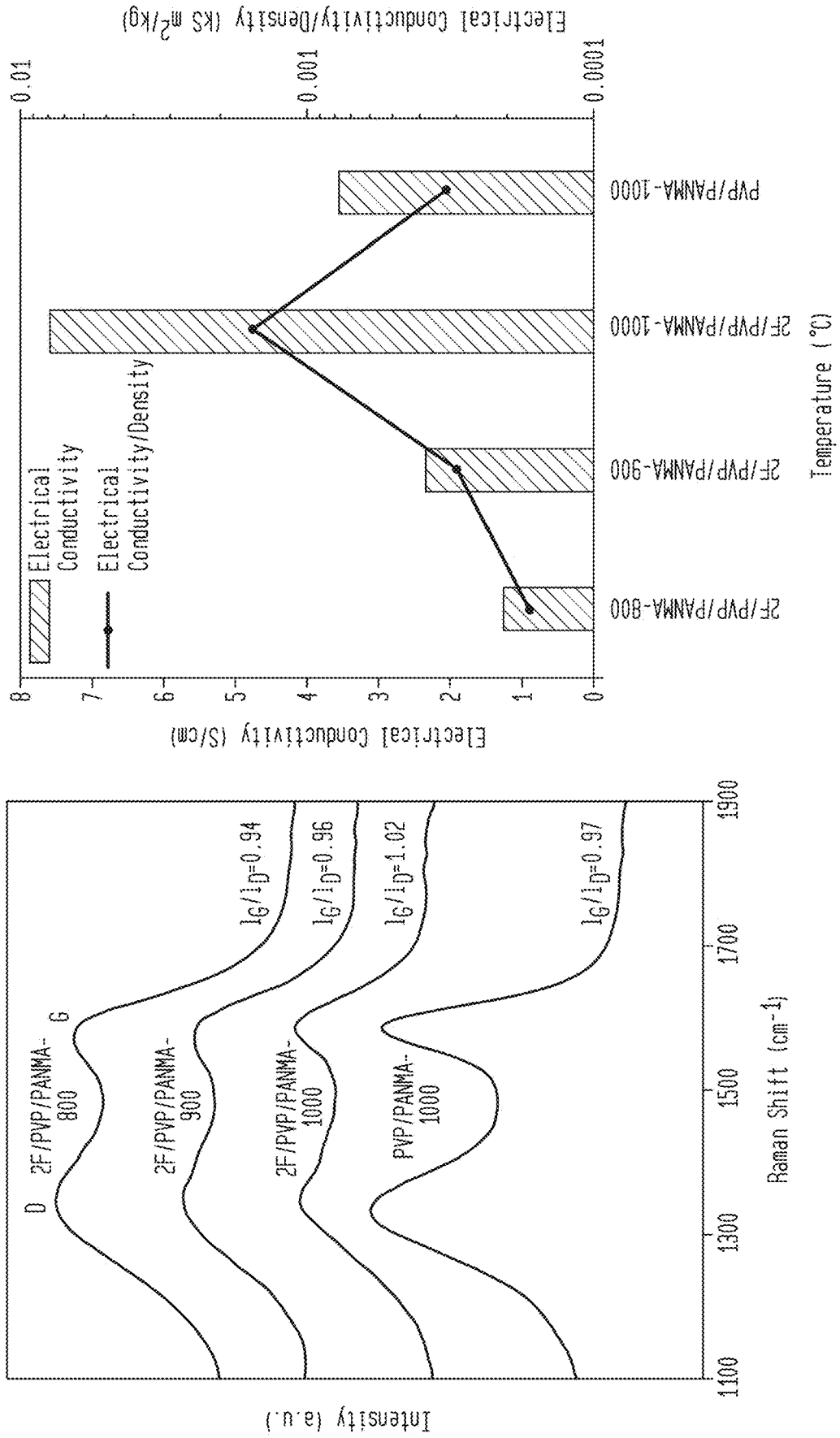

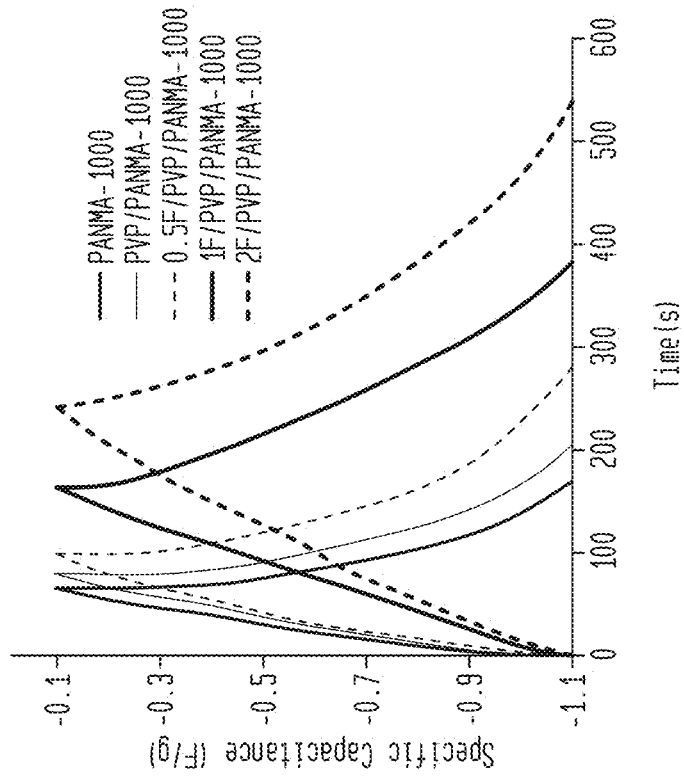
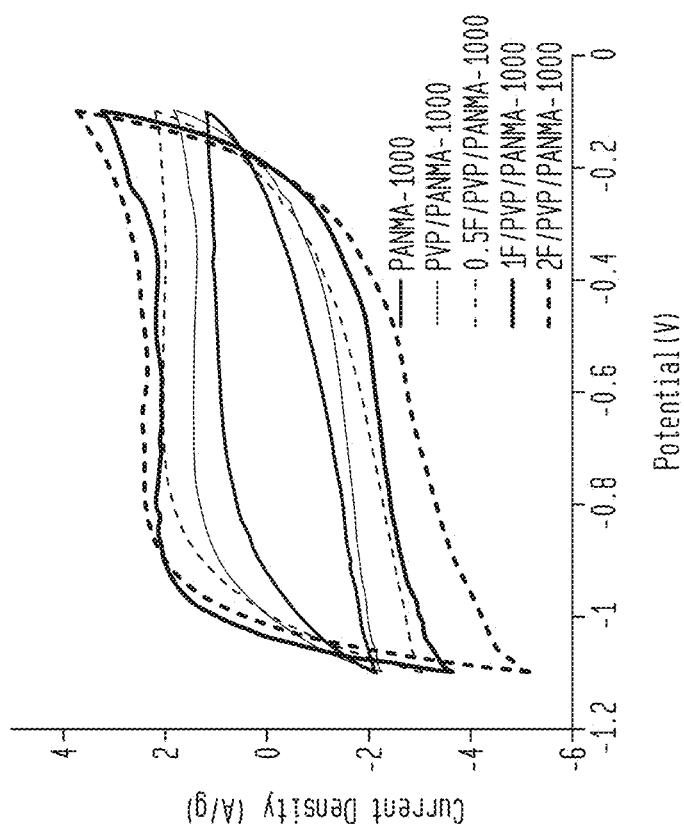
FIG. 12A
FIG. 12B

MATERIALS DERIVED FROM COAL USING ENVIRONMENTALLY FRIENDLY SOLVENTS

CROSS-REFERENCE TO RELATED APPLICATIONS

This application is a divisional of U.S. patent application Ser. No. 15/863,139, filed Jan. 5, 2018, which claims benefit of U.S. Provisional Patent Application No. 62/442,613, filed Jan. 5, 2017, both of which are hereby incorporated by reference in their entirety.

FIELD

Embodiments of the present disclosure generally relate to methods for manufacturing materials from coal and materials manufactured according to the methods described herein.

DESCRIPTION OF THE RELATED ART

Typically, coal is regarded as a polymer made up of a crosslinked macromolecular network linked together by relatively smaller molecules. Fragmented particles and liquid fractions can be produced separately via depolymerization of coal networks through the cleavage of intramolecular bonds. Compared to the chemical swelling of raw coal by organic solvents, depolymerization processes allow fragmented coal to be solvated by various solvents. While compounds in the insoluble phase may be used as precursors in chemical industry processes, such as carbon fiber fabrication, the resulting soluble phase can be separated and purified to valuable chemicals or further upgraded to be desirable fuels via molecular weight reduction and heteroatom removal.

Depolymerization of coal has been investigated using various solvents, including hexane, tetrahydrofuran (THF), and N-methyl-2-pyrrolidinone (NMP), and supercritical fluids.

Although solvent extraction using ionic liquids has been used for the dissolution of cellulosic biomass, their application to coal depolymerization is still in its infancy. For example, carbon fiber precursors have historically included polyacrylonitrile (PAN) and mesophase pitch, but carbon fiber production from biomass has been a source of recent interest.

Accordingly, what is needed in the art are methods for and materials derived from coal using solvents. Such materials include carbon-based materials. Carbon-based materials are considered as primary targets useful in energy storage, especially electrical double-layer capacitors (EDLCs). The structural diversity of carbon provides for carbon-based materials in a variety of forms, such as powder, multiwall carbon nanotube, and carbon fiber.

In regards to carbon fiber fabrication, polymer precursors, such as polyacrylonitrile (PAN) and poly(acrylonitrile-co-methyl acrylate) (PANMA), are the most widely used material. PAN exhibits desirable viscosity allowing facile spinnability in solution and high carbon yield after carbon fiber fabrication operations. Moreover, the porous carbon fiber from PAN precursors after thermal treatment has been proposed as another category of feasible capacitor material. PAN and PANMA can be mixed with other polymer precursors, such as polyvinylpyrrolidone (PVP), poly(methyl methacrylate) (PMMA), and polyimide (PI) to further enhance the orientation of the carbon skeleton of carbon fibers.

Some conventional methods for fabricating capacitors from carbon fibers utilize metal-based materials, such as $ZnCl_2$, embedded in PAN. $ZnCl_2$ can facilitate the creation of different pore sizes (such as micropores and mesopores) in the carbon fibers and can enhance the wettability of carbon fibers by increasing the concentration of O-functional groups on the surface. However, $ZnCl_2$ lacks reversible redox capabilities, which limit its further applications to carbon fibers.

O-/N-heteroatoms with reversible redox capability have been applied to active carbon (AC) and carbon nanotube materials to achieve enhanced capacitance. However, the compatibility of carbon networks in PAN-based carbon fibers with O-/N-functional groups has not been systematically investigated.

Coal has such carbon networks that consist of macromolecule units with different functional groups, especially O-/N-enriched groups. In order to make coal useful for carbon fiber applications, the coal is treated to break the bonds of its macromolecular framework. Without treatment, the cross-linked polymers in coal swell in the organic solvents that are used to dissolve PAN and make the resultant solution incompatible with fabricating carbon fibers.

One method of treatment uses an acidic mixture of nitric acid and sulfuric acid, and the resulting residues can be dissolved into a mixture of N,N-dimethylformamide (DMF) and PAN. However, pretreating coal with strong acids is not environmentally friendly and inhibits its application into scale-up carbon fiber fabrication.

Therefore, what is needed is a carbon network in PAN-based carbon fibers with O-/N-functional groups allowing for enhanced capacitance. Furthermore, environmentally friendly extraction methods are needed to capture materials containing carbon networks with O-/N-enriched groups are needed.

SUMMARY

In an embodiment, a coal treatment process is provided. The process includes exposing a material comprising coal to one or more ionic liquids to form a first mixture, isolating a residue from the first mixture, forming a second mixture comprising the residue, and electrospinning the second mixture to form a carbon fiber precursor material.

In another embodiment, a coal treatment process is provided. The process includes exposing a material comprising coal to one or more ionic liquids to form a mixture comprising solids and a liquid fraction, separating and filtering the liquid fraction from the mixture, and isolating one or more compounds from the liquid fraction.

In another embodiment, a coal treatment process is provided. The process includes exposing a material comprising coal to one or more ionic liquids to form a first mixture comprising residues, exposing the first mixture to (a) an acid, (b) a solvent, or (c) both to form a second mixture, and isolating rare earth elements and rare earth element compounds.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 8C is a SEM image of as-spun polymer fibers from the example 2F/PVP/PANMA/DMF solution, and the inset is the corresponding fiber diameter distribution, according to some embodiments.

FIG. 8D is a SEM image of as-spun polymer fibers from the example 2F/PVP/PANMA/DMF solution, and the inset is the corresponding fiber diameter distribution, according to some embodiments.

FIG. 9C is an O1s XPS spectrum of the comparative carbon fiber PVP/PANMA-1000.

FIG. 9D is a N1s XPS spectrum of the comparative carbon fiber PVP/PANMA-1000.

FIG. 11A is a plot of intensity (a.u.) versus Raman shift ($cm^{-1}$) for example carbon fibers with different amounts of coal fragments and a comparative, according to some embodiments.

FIG. 11B is a plot of electrical conductivity (S/cm) versus temperature and a bar graph of electrical conductivity/density ($kS*m^2/kg$) versus temperature (° C.) for example carbon fibers with different amounts of coal fragments and a comparative, according to some embodiments.

FIG. 11C is a plot of intensity (a.u.) versus Raman shift ($cm^{-1}$) for example carbon fibers carbonized at different temperatures and a comparative, according to some embodiments.

FIG. 11D is a plot of electrical conductivity (S/cm) versus temperature and a bar graph of electrical conductivity/density ($kS*m^2/kg$) versus temperature for example carbon fibers carbonized at different temperatures and a comparative, according to some embodiments.

FIG. 12A is a cyclic voltammetry profile for example carbon fibers and comparative carbon fibers, according to some embodiments.

FIG. 12B shows galvanostatic charge-discharge curves at 1 A/g current density of example carbon fibers and comparative carbon fibers, according to some embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
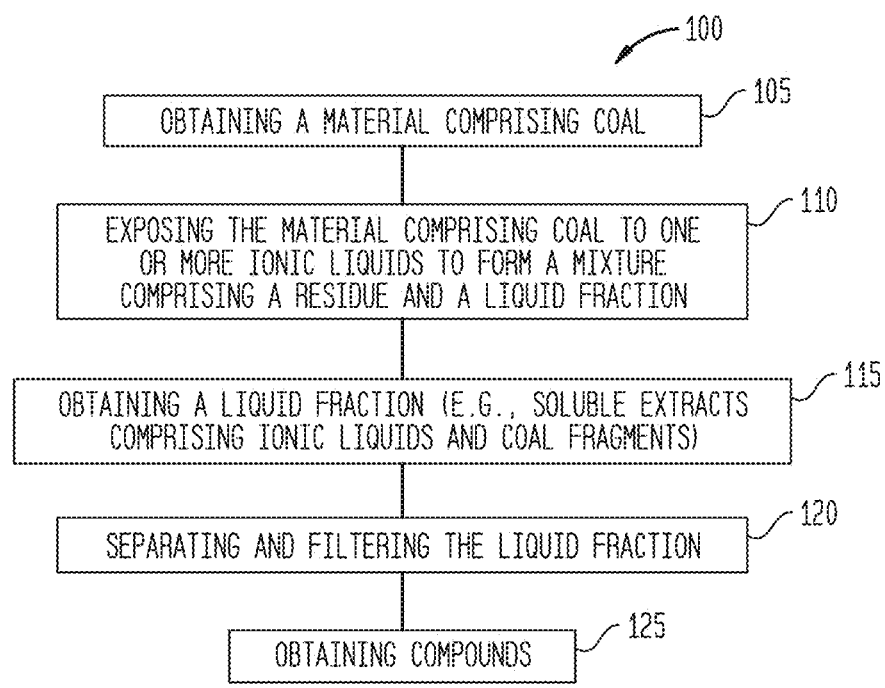
FIG. 1 is a flow diagram of a method of extracting coal and coal by-products using ionic liquids to obtain organic compounds according to some embodiments.

Embodiments described herein address the interaction of coal with different ionic liquids commonly used in coal and lignin dissolution, and which fragments of highly cross-linked macromolecular structures of coal can be solubilized by ionic liquids. Embodiments described herein also address what valuable compounds can be extracted from coal samples, such as those from Wyoming Powder River Basin (PRB) coal.

Embodiments described herein also address the use of coal in enhancing the capacitance of PAN-based (and PANMA-based) carbon fibers. Furthermore, the disclosure provides for environmentally friendly extraction methods to capture materials containing carbon networks with O-/N-enriched groups. Embodiments described herein also address the use of ionic liquids in treating coal to extract rare earth elements (REEs) and REE compounds (such as REE oxides).

NIST-2682 is a subbituminous coal (0.5% sulfur in mass fraction, 60 μm in average particle size) from Wyodak-Anderson coal seam purchased from the National Institution of Standards and Technology.

NIST-2684 is a bituminous coal (3% sulfur in mass fraction, 70 μm in average particle size) from Pittsburgh coal seam purchased from the National Institution of Standards and Technology.

Coal includes pre- and post-combustion coal, unless stated otherwise.

The following abbreviations may be used herein: PVP (also referred to as pvp) is polyvinylpyrrolidone; PAN (also referred to as pan) is polyacrylonitrile; PANMA (also referred to as panma) is poly(acrylonitrile-co-methyl acrylate); PMMA is poly(methyl methacrylate); PI is polyimide; PVDF is polyvinylidene fluoride; PVA is polyvinyl alcohol; PS is polystyrene; NMP (also referred to as nmp) is N-methyl-2-pyrrolidinone); DMF (also referred to as dmf) is N,N-dimethylformamide; IL is ionic liquid; and CF is carbon fiber.

This disclosure includes chemical structures that show atomic compositions of compounds and relative bonding arrangements of atoms in a chemical compound. Unless specifically stated, the geometric arrangement of atoms shown in the chemical structures is not intended to be an exact depiction of the geometric arrangement of every embodiment, and those skilled in the chemical arts will recognize that compounds may be similar to, or the same as, the illustrated compounds while having different molecular shapes or conformations. For example, the structures denoted herein may show bonds extending in one direction, while embodiments of the same compound may have the same bond extending in a different direction. Additionally, bond lengths and angles, Van der Waals interactions, isoelectronic structures, and the like may vary among instances of the same chemical compound. Additionally, unless otherwise noted, the disclosed structures cover all stereoisomers, conformers, rotamers, isomers, and enantiomers of the represented compounds.

As used herein, the term "substituted" means that a hydrogen group has been replaced with a heteroatom, or a heteroatom-containing group. For example, a "substituted hydrocarbyl" is a radical made of carbon and hydrogen where at least one hydrogen is replaced by a heteroatom or heteroatom-containing group.

The terms "hydrocarbyl radical," "hydrocarbyl," "hydrocarbyl group," "alkyl radical," and "alkyl" are used interchangeably throughout this document. Likewise, the terms "group," "radical," and "substituent" are also used interchangeably in this document. For purposes of this disclosure, "hydrocarbyl radical" refers to $C_1$-$C_{100}$ radicals, that may be linear, branched, or cyclic, and when cyclic, aromatic or non-aromatic. Examples of such radicals include methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and their substituted analogues. Substituted hydrocarbyl radicals are radicals in which at least one hydrogen atom of the hydrocarbyl radical has been substituted with at least one halogen (such as Br, Cl, F or I) or at least one functional group such as $C(O)R^*$, $C(O)NR^*_2$, $C(O)OR^*$, $NR^*_2$, or $OR^*$, (where $R^*$ is independently a hydrogen or hydrocarbyl radical, and two or more $R^*$ may join together to form a substituted or unsubstituted saturated, partially unsaturated or aromatic cyclic or polycyclic ring structure), or where at least one heteroatom has been inserted within a hydrocarbyl ring.

The term "alkenyl" or "alkenyl group" may be used herein and means a straight-chain, branched-chain, or cyclic hydrocarbon radical having one or more double bonds. These alkenyl radicals may be optionally substituted. Examples of suitable alkenyl radicals include ethenyl, propenyl, allyl, 1,4-butadienyl cyclopropenyl, cyclobutenyl, cyclopentenyl, cyclohexenyl, cyclooctenyl, including their substituted analogues.

The term "aryl" or "aryl group" may be used herein and includes a $C_4$ to $C_{20}$ aromatic ring, such as a six carbon aromatic ring, and the substituted variants thereof, including phenyl, 2-methyl-phenyl, xylyl, 4-bromo-xylyl. Likewise heteroaryl means an aryl group where a ring carbon atom (or two or three ring carbon atoms) has been replaced with a heteroatom, for example, N, O, or S. As used herein, the term "aromatic" also refers to pseudoaromatic heterocycles which are heterocyclic substituents that have similar properties and structures (nearly planar) to aromatic heterocyclic ligands, but are not by definition aromatic; likewise the term aromatic also refers to substituted aromatics.

Where isomers of a named alkyl, alkenyl, or aryl group exist (e.g., n-butyl, iso-butyl, iso-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, or aryl group without specifying a particular isomer (e.g., butyl) expressly discloses all isomers (e.g., n-butyl, iso-butyl, sec-butyl, and tert-butyl).

For any particular compound disclosed herein, any general or specific structure presented also encompasses all conformational isomers, regioisomers, and stereoisomers that may arise from a particular set of substituents, unless stated otherwise. Similarly, unless stated otherwise, the general or specific structure also encompasses all enantiomers, diastereomers, and other optical isomers whether in enantiomeric or racemic forms, as well as mixtures of stereoisomers, as would be recognized by a skilled artisan.

The term "ring structure" may be used herein and means atoms bonded together in one or more cyclic arrangements.

The term "ring atom" may be used herein and means an atom that is part of a cyclic ring structure. By this definition, a benzyl group has six ring atoms and tetrahydrofuran has 5 ring atoms.

A heterocyclic ring is a ring having a heteroatom in the ring structure as opposed to a heteroatom-substituted ring where a hydrogen on a ring atom is replaced with a heteroatom. For example, tetrahydrofuran is a heterocyclic ring and 4-N,N-dimethylamino-phenyl is a heteroatom-substituted ring.

The carbon fibers were named as: PVP/PANMA-1000 and PANMA-1000 refer to the carbon fibers fabricated at about 1000° C. carbonization temperature using 5% PVP/5% PANMA/DMF and 9% PANMA/DMF solutions, respectively; 0.5F/PVP/PANMA-1000, 1F/PVP/PANMA-1000, and 2F/PVP/PANMA-1000 refer to the carbon fibers fabricated at 1000° C. carbonization temperature from coal fragments/5% PVP/5% PANMA/DMF solutions with about 0.5 wt %, about 1 wt % and about 2 wt % of coal fragments in solution, respectively; 2F/PVP/PANMA-800 and 2F/PVP/PANMA-900 refer to the carbon fibers fabricated from 2 wt % coal fragments/5% PVP/5% PANMA/DMF solutions at about 800° C. and about 900° C. carbonization temperature, respectively.

Ionic Liquids

Ionic liquids are salts that exist in their liquid form below 100° C. Typically, ionic liquids consist of a large cation and an organic or inorganic anion. Ionic liquids are considered green solvents because they can work under less severe conditions due to their unique physicochemical characteristics, such as low melting point, non-flammability, and low volatility. Large organic cations associated with various anions in ionic liquids have the capability to cleave intramolecular connections via hydrogen bonds and π-π interactions. Moreover, ionic liquids can be used for efficient extraction of coal and lignin because these extraction processes may be performed under mild conditions (<100° C.) without releasing volatile organic carbons.

In some embodiments, the one or more ionic liquids useful for the processes described herein are represented by the formula (A) or formula (B):

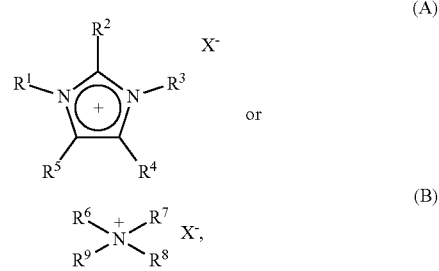

wherein:
each of $R^1$ and $R^3$ is independently a hydrocarbyl radical (for example, a $C_1$ to $C_{20}$ hydrocarbyl), or a substituted hydrocarbyl radical (for example, a substituted $C_1$ to $C_{20}$ hydrocarbyl);
each of $R^2$, $R^4$, and $R^5$ is independently a hydrogen, a hydrocarbyl radical (for example, a $C_1$ to $C_{20}$ hydrocarbyl), a substituted hydrocarbyl radical (for example, a substituted $C_1$ to $C_{20}$ hydrocarbyl), a $C_4$ to $C_{20}$ aryl radical, or a substituted $C_4$ to $C_{20}$ aryl radical;
each of $R^6$, $R^7$, $R^8$, and $R^9$ is independently a hydrogen, a hydrocarbyl radical (for example, a $C_1$ to $C_{20}$ hydrocarbyl), a substituted hydrocarbyl radical (for example, a substituted $C_1$ to $C_{20}$ hydrocarbyl), a $C_4$ to $C_{20}$ aryl radical, or a substituted $C_4$ to $C_{20}$ aryl radical, or two or more adjacent $R^6$, $R^7$, $R^8$, and $R^9$ groups may independently join together to form a substituted or unsubstituted hydrocarbyl ring or heterocyclic ring, where the ring has 5, 6, 7, or 8 ring atoms and where substitutions on the ring can join to form additional rings; and
X is independently chloride (Cl), bromide (Br), iodide (I), thiocyanate (SCN), hexafluorophosphate ($PF_6$), antimony hexafluoride ($SbF_6$), bis(trifluoromethyl-sulfonyl)imide ($NTf_2$), tetrafluoroborate ($BF_4$), tetracyanoborate ($B(CN)_4$), trifluoromethanesulfonate (OTf), dicyanamide ($N(CN)_2$), alkyl sulfate ($C_nH_{2n+1}OSO_3$, where n=0, 1, or 8, such as methyl sulfate (n=1, $MeOSO_3$)), dimethyl phosphate ($Me_2PO_4$), or acetate ($MeCO_2$).

In some embodiments, the ionic liquid is one or more of the following compounds represented by formula (1), (2), (3), (4), (5), (6), and (7):

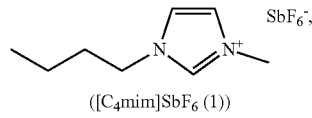

([$C_4$mim]$SbF_6$ (1))

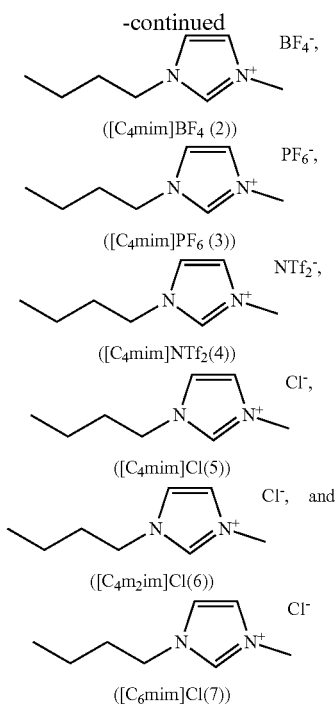

-continued ([C₄mim]BF₄ (2))

([C₄mim]PF₆ (3))

([C₄mim]NTf₂(4))

([C₄mim]Cl(5))

([C₄m₂im]Cl(6))

([C₆mim]Cl(7))

[C₄mim]SbF₆ (1) is 1-Butyl-3-methylimidazolium hexafluoro-antimonate; [C₄mim]BF₄ (2) is 1-Butyl-3-methylimidazolium tetrafluoroborate; [C₄mim]PF₆ (3) is 1-butyl-3-methylimidazolium hexafluorophosphate; [C₄mim]NTf₂ (4) is 1-butyl-3-methylimidazolium bis(trifluoromethanesulfonyl)imide; [C₄mim]Cl (5) is 1-Butyl-3-methylimidazolium chloride; [C₄m₂im]Cl (6) is 1-butyl-2,3-dimethylimidazolium; and [C₆mim]Cl (7) is 1-Hexyl-3-methylimidazolium chloride.

Obtaining Organic Compounds by Extracting Coal with Ionic Liquids

FIG. 1 illustrates a method 100 of obtaining (i.e., isolating) desirable organic compounds from materials comprising coal and coal byproducts by depolymerizing said materials. The method 100 includes obtaining a material comprising coal and coal byproducts at operation 105. Method 100 includes exposing the first material comprising coal to one or more ionic liquids to form a mixture of a residue and a liquid fraction at operation 110. The ionic liquid(s) may be any ionic liquid described herein.

Method 100 includes obtaining a liquid fraction, which is soluble extracts comprising ionic liquids and coal fragments at operation 115. Method 100 includes separating and filtering the liquid fraction, and obtaining (i.e., isolating) organic compounds from the liquid fraction at operations 120 and 125. Operations 120 and 125 may further include adding liquids (for example, water) to initiate precipitation and using solvents (such as MeOH, EtOH, DMF) for operations including dissolution, transfer, separation, and extraction. In some embodiments, further operations, such as solid phase extractions and analysis with matrix-assisted laser desorption ionization (MALDI) and GC-MS are performed. In some embodiments, the ionic liquid is selected based on a zeta potential of a composition comprising an ionic liquid adsorbed on coal, as described below.

Method 100 may be performed according to the following procedure. A beaker containing coal (about 0.5 g) and ionic liquid (about 5 g) is heated and stirred at about 100° C. for about 24 hours. The mixture is allowed to cool to about room temperature (e.g., about 15° C. to about 25° C.) and N-methyl-2-pyrrolidone (NMP, about 20 ml) is added to provide a mixture of solid residues and a liquid component. The mixture is centrifuged at about 4000 revolutions per minute (rpm) for about 10 minutes to separate the liquid fraction from the solid residues. The liquid fraction contains ionic liquids, NMP, and swollen (and soluble) coal particles and fragments typically less than about 100 nm in size. The solid residues may be used in further processing operations, including for fabricating carbon fibers, as described below.

The liquid fraction is transferred to a new container and water (about 30 ml) is added. Analytes (as solid particles) precipitate out and the analytes (as solid particles) are transferred to a new container. A dissolving solvent (for example, methanol (MeOH), ethanol (EtOH), and acetonitrile (CH₃CN)) is added to the container containing the analytes to form a crude solution. The crude solution is then purified by solid phase extraction (SPE) according to techniques known to those skilled in the art. Optionally, more than one SPE may be performed to remove impurities such as the ionic liquids. Additionally, analysis by matrix-assisted laser desorption ionization may be performed to determine whether additional SPE is needed. Following extraction via SPE, the solution (having dissolved analytes) is dried with sodium sulfate and concentrated in vacuo to provide organic compounds such as fatty acids, ethoxy diols, quinones, and amines. Thus, and as further discussed below, selection of the ionic liquid allows for selectivity in obtaining desirable compounds.

Zeta Potential Measurements

Zeta potential measurements of the liquid fraction were performed as described in the Test Methods section. The results show that different anions (SbF₄, BF₄, PF₆, and NTf₂) of the ionic liquids and different cations (C₄mim, C₄m₂im, and C₆mim) of the ionic liquids affect the interactions with coal fragments when solvated by ionic liquids. In an example, utilizing the ionic liquids (ILs) 1-4, i.e., the C₄mim cation with SbF₄, BF₄, PF₆, and NTf₂ anions, interact with the functional groups in a coal network, such as a carboxylate containing material. For ionic liquids (ILs) 5-7, the C₄mim, C₄m₂im, and C₆mim cations can form π-π and n-π interactions with aromaticities in the coal network, resulting from the ionic liquid's cationic moiety interacting with an electron-rich aromatic π-system in a coal network.

Effect of the Anion Component of the Ionic Liquid

Figure 4A:
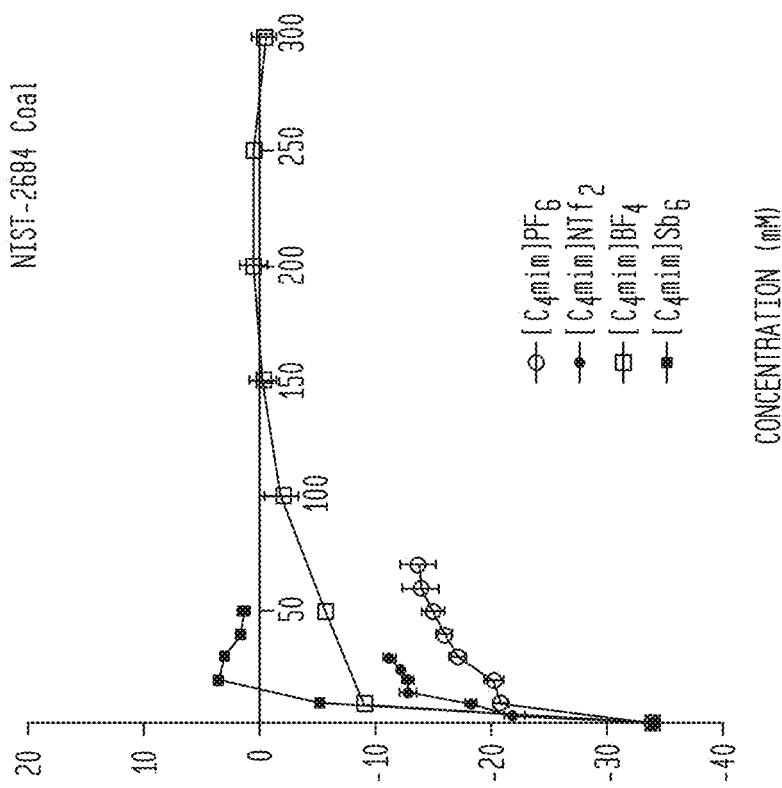
FIG. 4A is a plot of zeta potential (mV) versus concentration for ionic liquid extracts using different ionic liquids adsorbed on sub-bituminous coal from Wyodak (NIST-2682) according to some embodiments.

FIG. 4A shows the zeta potential of ILs 1-4 adsorbed on NIST-2682 coal, according to some embodiments. The zeta potential of NIST-2682 coal was found to gradually increase from about −45 mV to about −15 mV for [C₄mim]PF₆ and [C₄mim]NTf₂, and reversed to positive values for [C₄mim]BF₄ and [C₄mim]SbF₆. While not wishing to be bound by theory, it is believed that the reverse in zeta potential resulted at least partially from hydrogen bonding between the anions of ILs 1-4 and ligands on the coal surface. Zeta potential had a maximum value at about 200 mM (about +4.79 mV) for [C₄mim]BF₄ and then slightly decreased, possibly due to an electrical double layer (EDL) compression from the higher ionic liquid density on the coal surface.

Figure 4B:
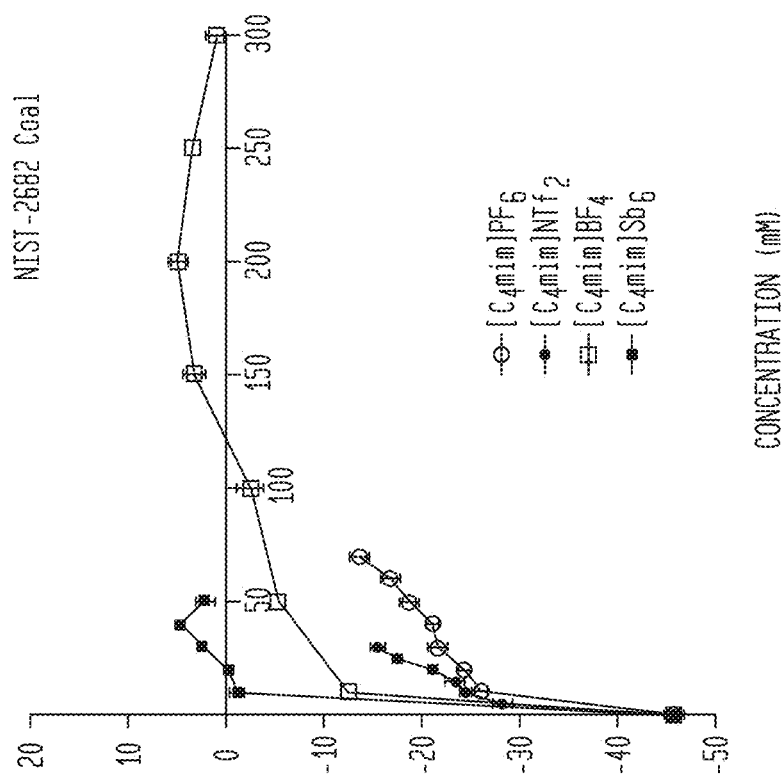
FIG. 4B is a plot of zeta potential (mV) versus concentration for ionic liquid extracts using different ionic liquids adsorbed on bituminous coal from Pittsburgh coal seam (NIST-2684) according to some embodiments.

FIG. 4B shows the zeta potential of ILs 1-4 adsorbed on NIST-2684 coal, according to some embodiments. A similar trend of zeta potential was observed for NIST-2684 coal, but a lower zeta potential peak (about +0.47 mV) was found for [C₄mim]BF₄. While not wishing to be bound by theory, because NIST-2684 coal is bituminous coal that has more aromaticities than the subbituminous coal in NIST-2682 coal, it is believed that the hydrogen bond between ionic liquids and available compounds (such as carboxylate) on the coal surface is quite limited, which contributed to the less significant change of zeta potential in NIST-2684 coal than in NIST-2682 coal.

Figure 4D:
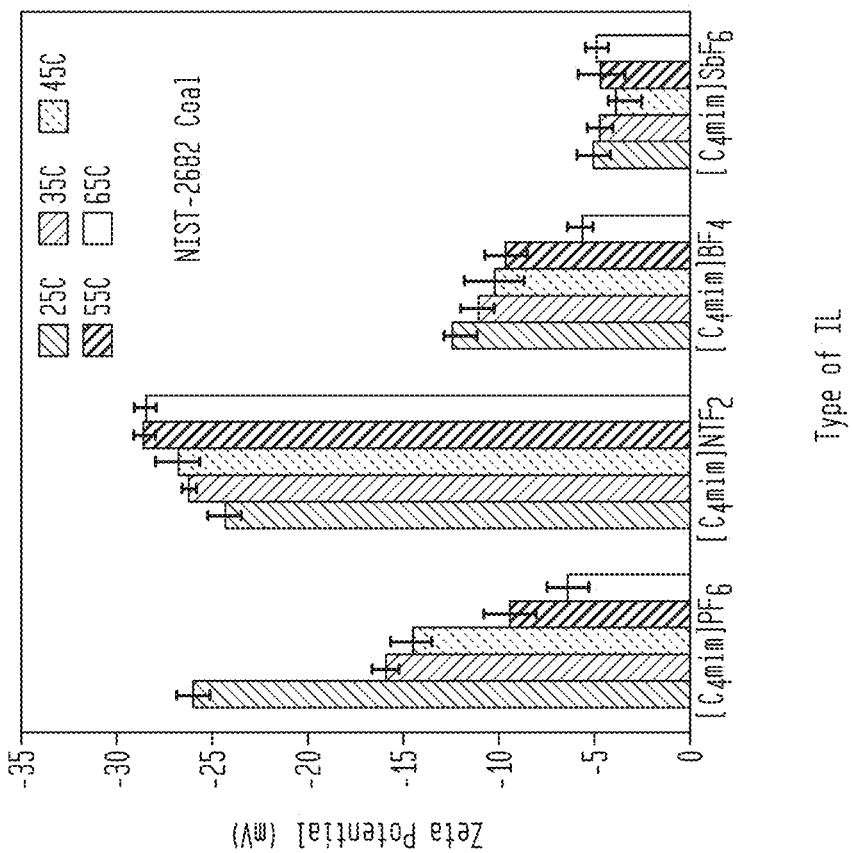
FIG. 4D is a bar graph of zeta potential (mV) versus type of ionic liquid adsorbed on NIST-2682 at various temperatures according to some embodiments.
Figure 4C:
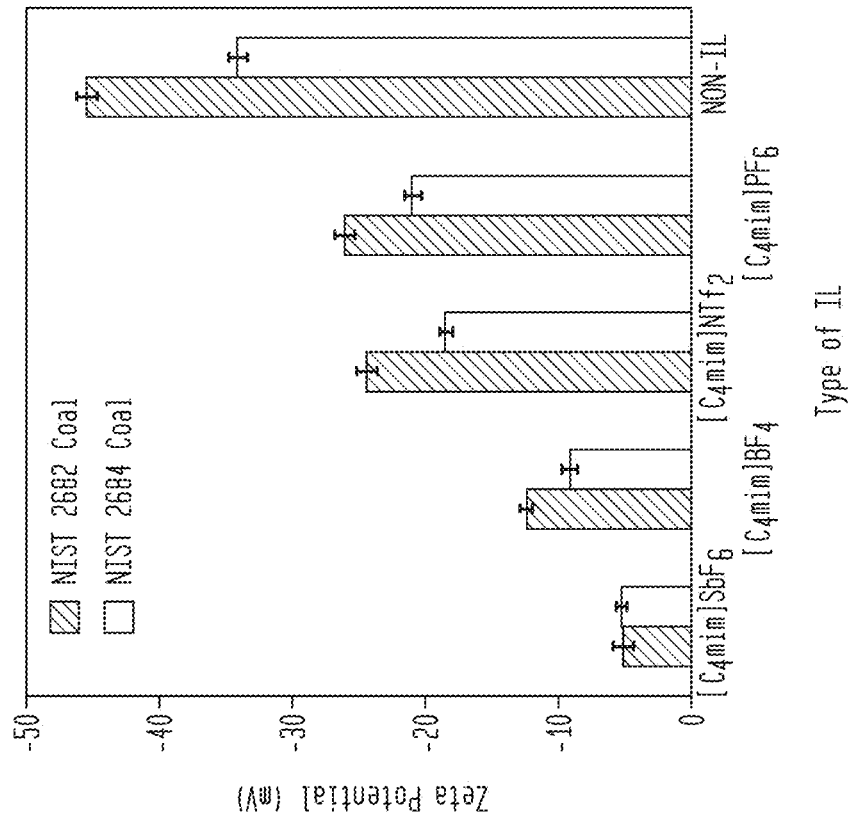
FIG. 4C is a bar graph of zeta potential (mV) versus type of ionic liquid adsorbed on NIST-2682 and NIST-2684 according to some embodiments.

FIG. 4C is a bar graph of zeta potential (mV) versus ILs 1-4 (concentration of ionic liquid is about 10 mM) and a comparative (Non-IL) adsorbed on NIST-2682 and NIST-2684, according to some embodiments. Non-IL is the coal dispersed in a potassium chloride (KCl) solution. The zeta potential of both types of coal increased significantly from non-ILs by the following sequence: $[C_4mim]PF_6$ (3)< $[C_4mim]NTf_2$ (4)<$[C_4mim]BF_4$ (2)<$[C_4mim]SbF_6$ (1). The zeta potential correlates to an ionic liquid's hydrogen bond basicity (β), where β ($[C_4mim]PF_6$)<β ($[C_4mim]NTf_2$)<β ($[C_4mim]BF_4$)<β ($[C_4mim]SbF_6$). The ionic liquids with higher hydrogen bond basicity means that their associated anions have denser HOMO lone pair electrons to be reoriented and to facilitate hydrogen bonding with solutes. Hence, the ionic liquids with higher β values can form a denser hydrogen bond layer on the coal surface, resulting in the significant increase of zeta potential. Additionally, the trend of calculated extraction yields (Table 1) from ILs 1-4 was consistent with both the zeta potential data and the β values, showing extraction yields in the following sequence: $[C_4mim]PF_6$ (about 12.5%)<$[C_4mim]BF_4$ (about 13.6%)< $[C_4mim]SbF_6$ (about 16.4%). Therefore, coal extraction was found to favor the ionic liquids having anions that have higher hydrogen bond basicity.

TABLE 1

Extraction yields of NIST-2682 and NIST-2684 coals from ILs 1-7

| Example | Type of IL | NIST-2682 Coal Extraction Yield (%) | NIST-2684 Coal Extraction Yield (%) |
| --- | --- | --- | --- |
| IL 1 | $[C_4mim]SbF_6$ | 16.4 | 22.2 |
| IL 2 | $[C_4mim]BF_4$ | 13.6 | 13.8 |
| IL 3 | $[C_4mim]PF_6$ | 12.5 | 12.5 |
| IL 4 | $[C_4mim]NTf_2$ | ?? | ?? |
| IL 5 | $[C_4mim]Cl$ | 24.7 | 26.8 |
| IL 6 | $[C_4m_2im]Cl$ | 25.6 | 27.7 |
| IL 7 | $[C_6mim]Cl$ | 26.6 | 31.8 |

Figure 4E:
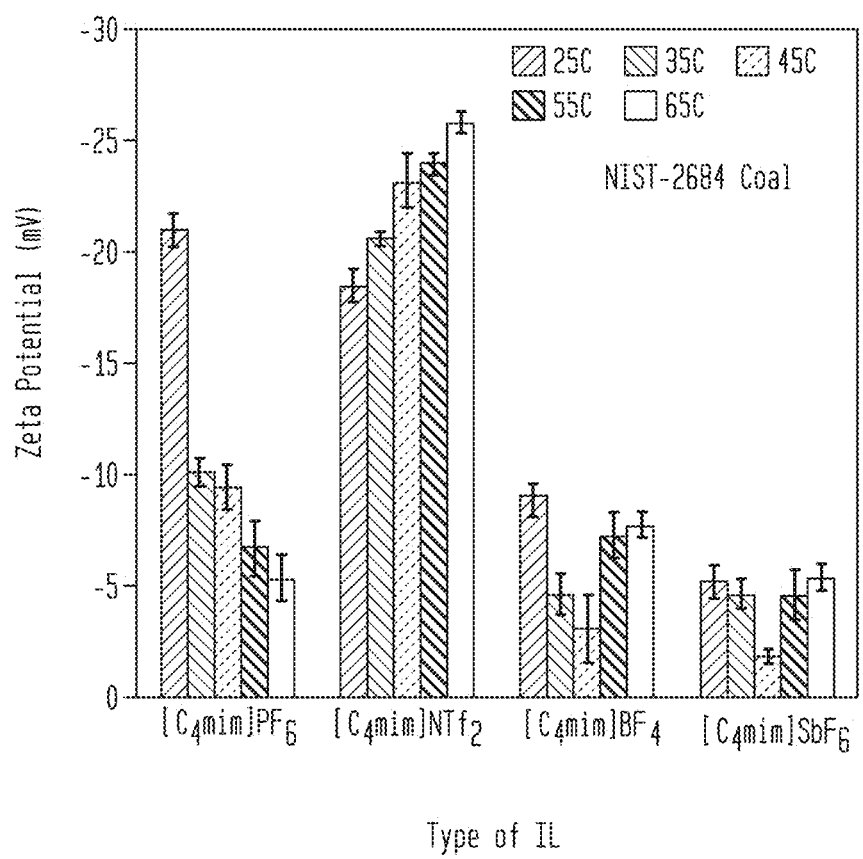
FIG. 4E is a bar graph of zeta potential (mV) versus type of ionic liquid adsorbed on NIST-2684 at various temperatures according to some embodiments.

FIG. 4D shows the relationship between zeta potential and temperature for ILs 1-4 (concentration at about 10 mM) adsorbed on NIST-2682 coal, according to some embodiments. When temperatures increased from about 25° C. to about 65° C., the zeta potential of NIST-2682 coal with $[C_4mim]PF_6$ (3) and $[C_4mim]BF_4$ (2) increased, which indicated that higher temperatures facilitated the reorientation of anions to form hydrogen bonds on the coal surface. In contrast, $[C_4mim]SbF_6$ (1) had a maximum zeta potential value at about 45° C., and then slightly decreased due to the higher ionic density around the EDL on the coal surface. The zeta potential of coal with $[C_4mim]NTf_2$ (4) showed a significant reduction, which may have resulted from the ionic liquid's solubility decrease for the very nonpolar anion group. The change of zeta potential with temperature for ILs 1-4 (concentration at about 10 mM) adsorbed on NIST-2684 coal showed similar trends (FIG. 4E). Thus, for both types of coal, the adsorption of ILs 1-4 is temperature sensitive.

Effect of the Cation Component of the Ionic Liquid

Figure 5A:
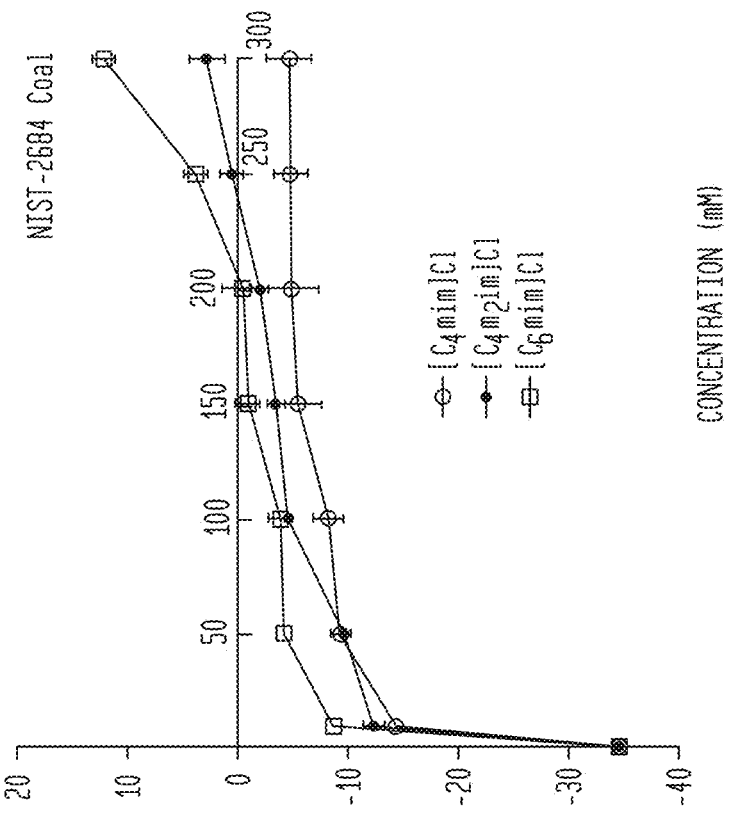
FIG. 5A is a plot of zeta potential (mV) versus concentration for ionic liquid extracts using different ionic liquids adsorbed on sub-bituminous coal from Wyodak (NIST-2682) according to some embodiments.
Figure 5B:
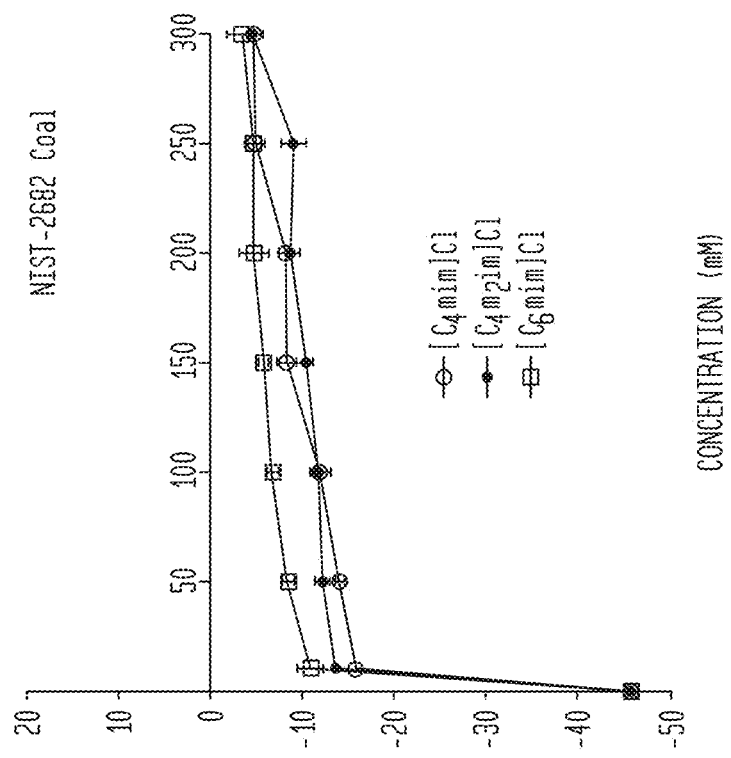
FIG. 5B is a plot of zeta potential (mV) versus concentration for ionic liquid extracts using different ionic liquids adsorbed on bituminous coal from Pittsburgh coal seam (NIST-2684) according to some embodiments.

FIGS. 5A and 5B show the zeta potential of ILs 5-7 adsorbed on NIST-2682 coal and NIST-2684 coal, respectively, according to some embodiments. FIGS. 5A and 5B show that the zeta potential of coal gradually increases with higher ionic liquid concentrations for both NIST-2682 coal and NIST-2684 coal. When the ionic liquid concentration increased from about 0 mM to about 300 mM, the zeta potential values of NIST-2682 coal increased from about −45 mV to about −4 mV, with each ionic liquid showing similar zeta potentials at similar concentrations. For the NIST-2684 coal sample, the data showed a significant difference with positive zeta potential values for both $[C_4m_2im]Cl$ (6) (about +2.8 mV) and $[C_6mim]Cl$ (7) (about +7.1 mV).

Figures 5C, 5D:
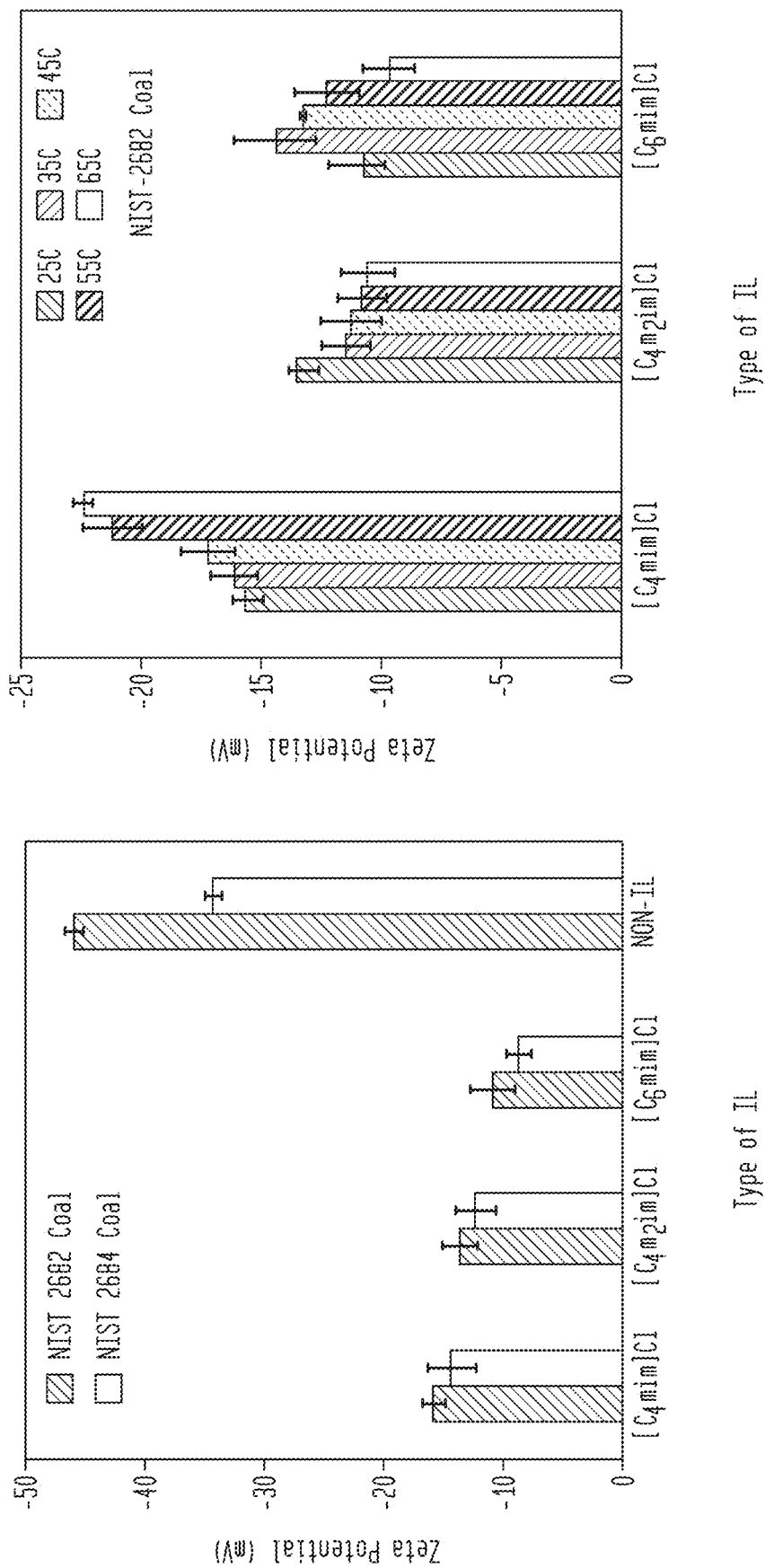
FIG. 5C is a bar graph of zeta potential (mV) versus type of ionic liquid adsorbed on NIST-2682 and NIST-2684 according to some embodiments.
FIG. 5D is a bar graph of zeta potential (mV) versus type of ionic liquid adsorbed on NIST-2682 at various temperatures according to some embodiments.

FIG. 5C is a bar graph of zeta potential (mV) versus ILs 5-7 (concentration of ionic liquid is about 10 mM) and a comparative (Non-IL) adsorbed on NIST-2682 and NIST-2684, according to some embodiments. Non-IL is a comparative and represents the coal dispersed in a potassium chloride (KCl) solution. The zeta potential for both types of coal increased significantly as compared to Non-IL by the following sequence: $[C_4mim]Cl$ (5)<$[C_4m_2im]Cl$ (6)< $[C_6mim]Cl$ (7). This trend is consistent with an ionic liquid's ability to interact with π- and n-electrons (r): r ($[C_4mim]Cl$)<r ($[C_4m_2im]Cl$)<r ($[C_6mim]Cl$), and shows that the type of cation affects the interaction between ionic liquids and the coal surface. While not wishing to be bound by theory, it is believed that the less dense aromaticities in NIST-2682 coal than NIST-2684 coal results in the saturated ionic liquid bound onto the coal surface via π-π and n-π interactions. This consumption is further confirmed by the coal extraction yields shown in Table 1. For NIST-2682 coal, the extraction yields were almost the same (about 25%). In contrast, extraction of NIST-2684 coal represented larger differences in extraction yields in the following sequence: $[C_4mim]Cl$ (about 26.8%)<$[C_4m_2im]Cl$ (about 27.7%)<$[C_6mim]Cl$ (about 31.8%). This data shows that the change of cations for the ionic liquids has a more significant effect on bituminous coal extraction than subbituminous coal extraction.

Figure 5E:
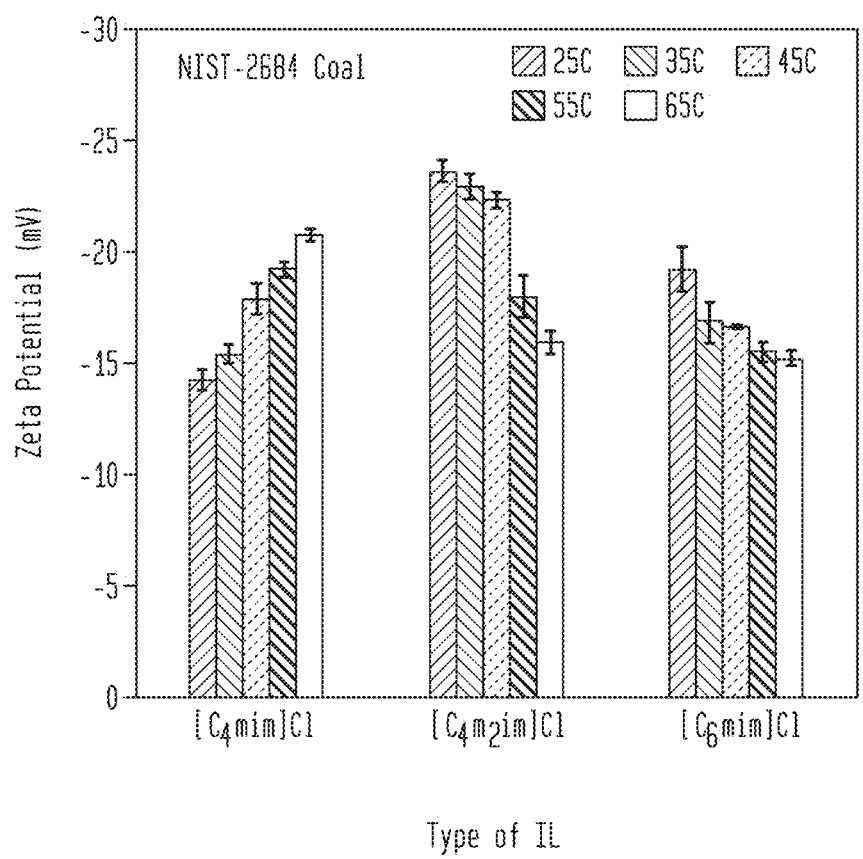
FIG. 5E is a bar graph of zeta potential (mV) versus type of ionic liquid adsorbed on NIST-2684 at various temperatures according to some embodiments.

FIG. 5D shows the relationship between zeta potential and temperature for ILs 5-7 (concentration at about 10 mM) on NIST-2682 coal, according to some embodiments. FIG. 5D shows that the adsorption of ionic liquids on coal is temperature sensitive, and that the change of zeta potential is consistent with the change in r value with increased temperature. The zeta potential of NIST-2682 coal with $[C_4m_2im]Cl$ (6) increased significantly from about 25° C. to about 35° C. in part due to a higher r value. Then, zeta potential slightly increased with temperature up to about 65° C., which may be a result of ionic density on the coal surface being near saturation. In contrast, the zeta potential of coal with $[C_6mim]Cl$ (7) had a lowest peak at about 35° C. The zeta potential of coal with $[C_4mim]Cl$ (5) dropped significantly from about −15.7 mV (about 25° C.) to about −22.45 mV (about 65° C.). This drop may be due to the higher β value of $[C_4mim]Cl$ at increased temperature which would result in hydrogen bonding instead of π-π and n-π interactions on the coal surface. The change of zeta potential for NIST-2684 coal showed a similar trend (FIG. 5E). The change of zeta potential with temperature for ILs 5-7 (concentration at about 10 mM) adsorbed on NIST-2684 coal showed similar trends (FIG. 5E). Thus, for both types of coal, the adsorption of ILs 5-7 is temperature sensitive.

In addition, ILs 5-7 enhance the extraction yields up to about 31.8% for $[C_6mim]Cl$ (7) as compared to ILs 1-4. While not wishing to be bound by theory, it is believed that the higher extraction yields are due to the ionic liquids having stronger interactions with the coal via π-π, n-π and hydrogen-bonding interactions.

GC-MS Measurements

Figure 6A:
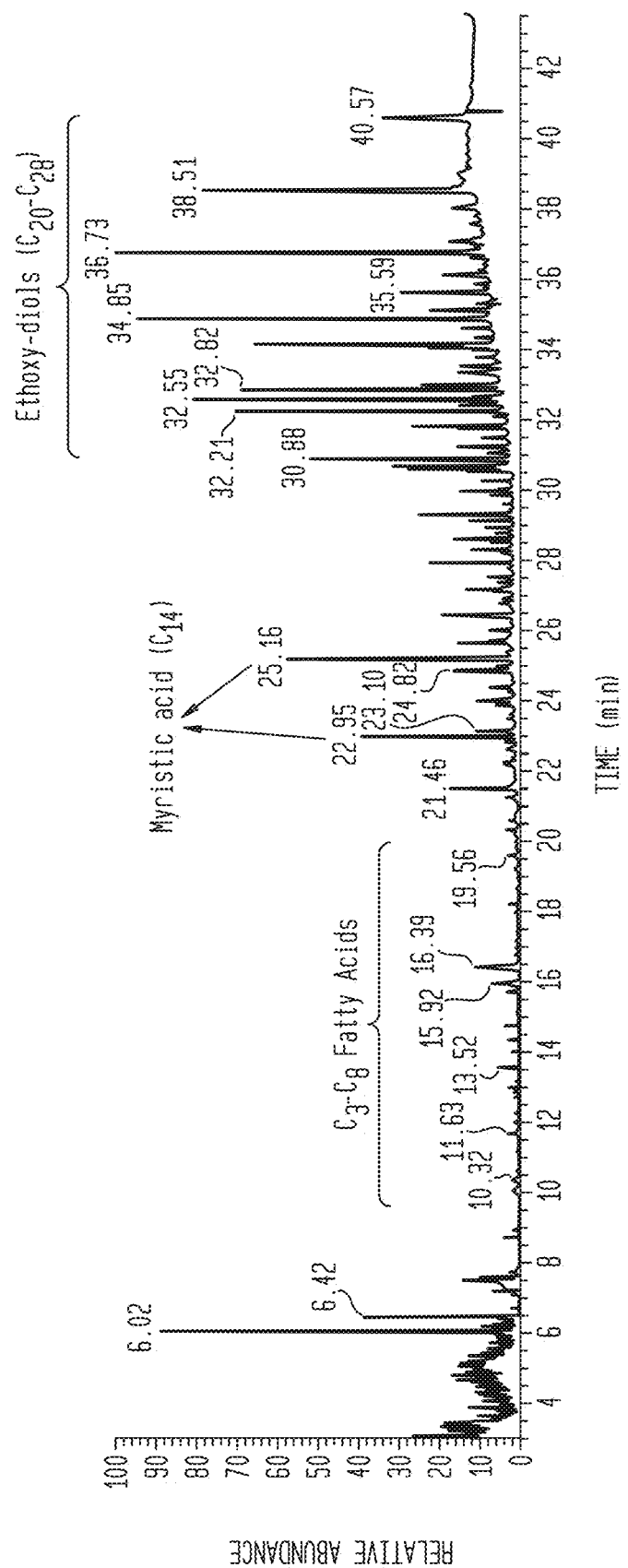
FIG. 6A is a gas chromatography-mass spectroscopy (GC-MS) spectrum of soluble extracts from $[C_4m_2im]Cl$-treated Wyodak coal.
Figure 6B:
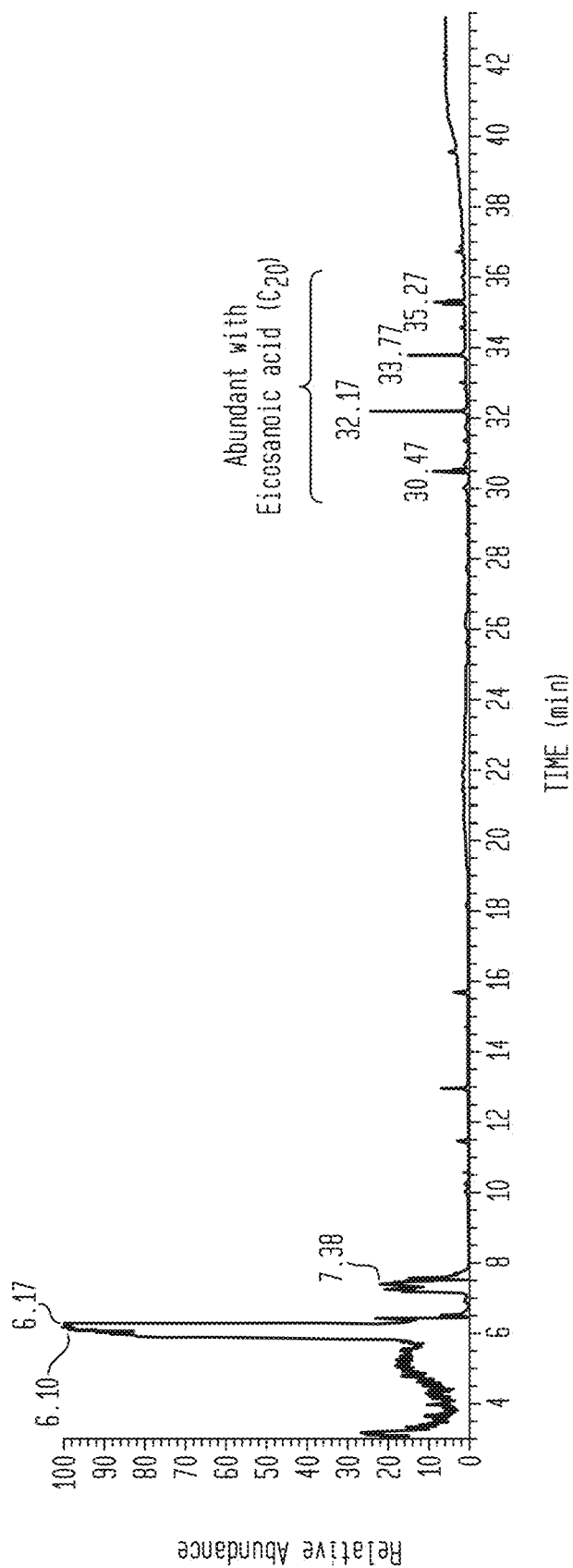
FIG. 6B is a GC-MS spectrum of soluble extracts from $[C_4mim]BF_4$-treated Wyodak coal.

GC-MS was used to analyze the compounds in the soluble extracts of ionic liquid-treated NIST-2682 coal (FIGS. 6A and 6B). GC-MS signals showed that ionic liquids can selectively cleave various compounds such as fatty acids, ethoxy diols, quinones, and amines.

Compounds with higher π interactions, such as [$C_4m_2im$]Cl (5), may selectively cleave myristic acid ($C_{14}H_{28}O_2$) in the fatty acid group and $C_{20}$ to $C_{28}$ ethoxy-diol groups (FIG. 6A). In contrast, the number of compounds in the extracts from lower-π interaction ILs, like [$C_4mim$]$BF_4$ (2), were lower, but more concentrated in eicosanoic acid ($C_{20}H_{40}O_2$) in the fatty acid group, as shown in FIG. 6B. While the precise mechanism of cleavage/extraction is not fully understood, it is believed that the π-π, n-π, and hydrogen-bonding interactions are factors in cleaving compounds from coal.

The data shows that cleavage of coal networks by ionic liquids is selective and temperature sensitive. The data also shows that zeta potential measurement can be an effective descriptor to characterize the impact of an ionic liquid's properties and temperature effect in coal depolymerization processes. Moreover, the data shows how to obtain desirable compounds and adjust coal extraction yield based on the ionic liquid, the coal's properties, and the temperature. Accordingly, zeta potential can be used to select ionic liquids to selectively extract desirable, high-value organic compounds from coal.

Method of Making Carbon Fibers

In some embodiments, a coal treatment process is provided. The process includes exposing a material comprising coal to an ionic liquid to form a mixture and extracting carbon fiber precursors from the mixture.

Figure 2:
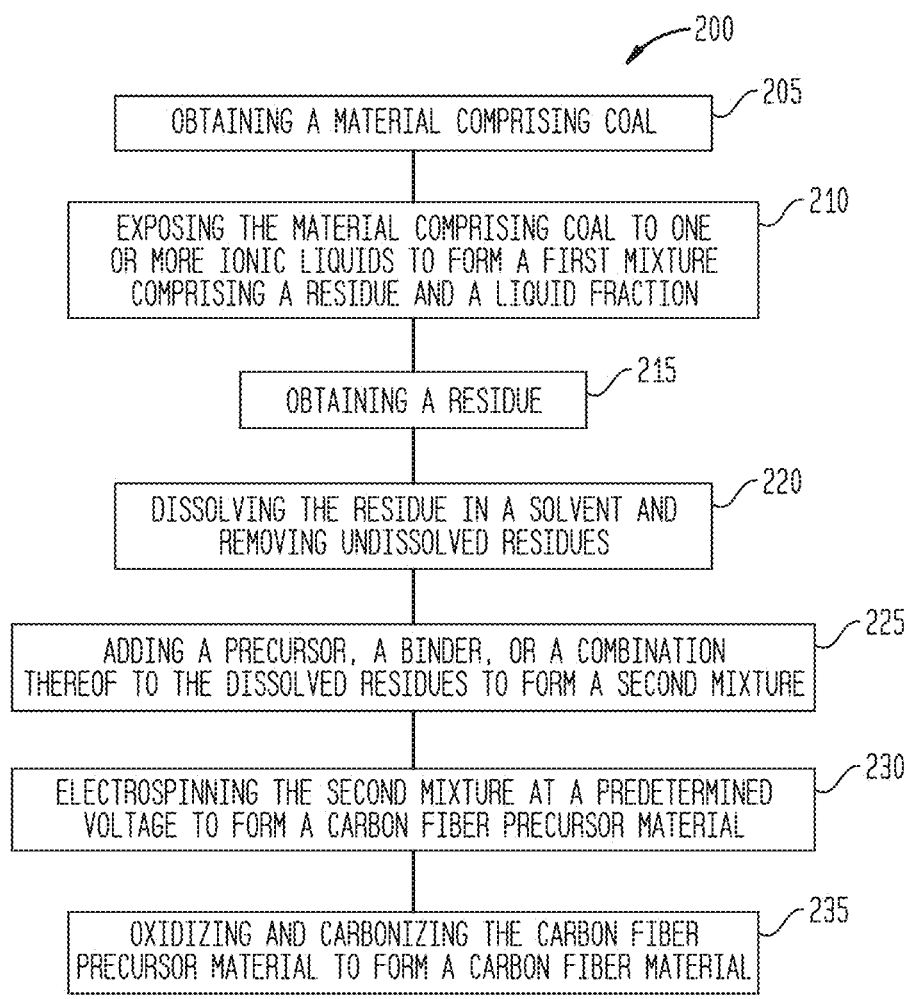
FIG. 2 is a flow diagram of a method of making carbon fibers from coal and coal byproducts according to some embodiments.

FIG. 2 shows a method 200 of making carbon fibers according to some embodiments. Method 200 includes obtaining a first material comprising coal at operation 205. The first material includes those set forth in operation 105 of FIG. 1, including coal byproducts. Method 200 includes exposing the first material comprising coal to one or more ionic liquids to form a first mixture comprising a residue and a liquid fraction at operation 210, similar to operation 110 of FIG. 1. The ionic liquids useful for method 200 include any ionic liquid described herein. The ionic liquid may be selected based on a zeta potential of a composition comprising an ionic liquid adsorbed on coal. Method 200 includes obtaining (i.e., isolating) a residue (e.g., coal solids and particulates) at operation 215. Method 200 includes dissolving the solid residues in a solvent and removing the undissolved residues at operation 220.

Method 200 includes adding a precursor, a binder, or a combination thereof to the dissolved residues to form a second mixture at operation 225. Precursors and binders include polyvinylpyrrolidone (PVP), polyacrylonitrile (PAN), poly(acrylonitrile-co-methyl acrylate) (PANMA), poly(methyl methacrylate) (PMMA), polyimide (PI), polyvinylidene fluoride (PVDF), polyvinyl alcohol (PVA), and polystyrene (PS).

Selection of the precursor and binder depends on the desired application. For example, PANMA may be selected when it is desired to have a polymer with a lower glass transition temperature.

In some embodiments, the precursors and binders have one or more of the following properties:

1) a weight percent of about 1%, for example, greater than about 4%, or between about 4 wt % and about 7 wt %, based on the total weight of the composition. For example, 5%% PVP/5% PAN may be used.

2) a molecular weight greater than about 100,000 g/mol, for example, between about 100,000 g/mol to about 360,000 g/mol.

In some embodiments, method 200 includes electrospinning the second mixture at a predetermined voltage to form a carbon fiber precursor material at operation 230. The voltage can be between about 10 kV and about 35 kV, for example, between about 18 kV and about 25 kV, or about 20 kV. Alternately, other spinning techniques or mechanical extrusion can be performed to form fibers including hollow fibers.

In an embodiment, method 200 includes stabilizing and carbonizing the carbon fiber precursor material to form a carbon fiber material at operation 235. The stabilization operation includes oxidation and cyclization. Cyclization of the PANMA portion of the material in the presence of oxygen (i.e., in an ambient air environment) may occur at a temperature greater than about 100° C., for example between about 250° C. and about 350° C., such as about 300° C. Following stabilization, the material is carbonized at temperatures greater than about 300° C., for example between about 300° C. and about 1000° C., such as between about 500° C. and about 1000° C., or between about 600° C. and about 1000° C., or between about 700° C. and about 1000° C., or between about 800° C. and about 1000° C. (for example about 800° C., about 900° C., or about 1000° C.).

In an embodiment, method 200 is performed according to the following procedure. A beaker containing coal (about 0.5 g) and ionic liquid (about 5 g) is heated and stirred at about 100° C. for about 24 hours. The mixture is allowed to cool to about room temperature (i.e., about 15° C. to about 25° C.) and N-methyl-2-pyrrolidone (NMP, about 20 ml) is added. The mixture is centrifuged at about 4000 revolutions per minute (rpm) for about 10 minutes to about 30 minutes to separate the liquid fraction from the solid residues. The solid residues are washed with deionized water several times, for example, between about 1 time and about 10 times. Alternately, the solid residues can be washed with deionized water in a soxhlet extractor. After washing, the solid residues are dried in a vacuum desiccator at about room temperature (e.g., about 15° C. to about 25° C.). The dried, solid residues are then redispersed in a solvent sufficient to dissolve residues and for the electrospinning process, such as DMF, at about 80° C. and stirred for about 8 hours to about 24 hours to obtain a solution of coal fragments dissolved in DMF. Alternately, the residues may be dissolved in trifluoroacetic acid, trichloroacetic acid, dichloromethane, dimethylsulfoxide, or combinations thereof for the electrospinning. These alternative solvents can be used in combination with DMF. Undissolved residues are removed by centrifuge at about 4000 revolutions per minute (rpm) for about 10 minutes to about 30 minutes.

PVP and PANMA are added at about room temperature and with constant stirring into the solution of dissolved coal residues in DMF to obtain about 5 wt % PVP and about 5 wt % PANMA in solution. The resulting solutions contain about 0.5 wt %, about 1 wt %, and about 2 wt % of coal fragments and are referred to as 0.5F/PVP/PANMA/DMF solution, 1F/PVP/PANMA/DMF solution, and 2F/PVP/PANMA/DMF solution, respectively. Undissolved residues were weighed after being washed with water and dried to determine the weight percentage of dissolved coal residues in PVP/PANMA/DMF solutions.

The coal/PVP/PANMA/DMF solution was placed into a 1 ml syringe with a 22 gauge (0.7176 mm OD) diameter needle. The syringe was placed into a syringe pump, and the syringe pump is set to a flow rate of about 0.7 ml/hour. The mixture was then electrospinned at about 20 kV onto a grounded collector covered with aluminum foil in an EC-DIG digital electrospinning machine from IME Technologies. The distance between the needle and the collector was kept at about 20 cm. Temperature and humidity were kept at about 30° C. and at about 30%, respectively. The procedure resulted in a material on aluminum foil.

The material is peeled from the aluminum foil using metallic clips on both ends and fixed onto a stainless steel sheet. Having the metallic clips on both ends allows the material to thermally expand and maintain tension with increased temperature during stabilization and carbonization. The material is placed into a muffle oven and heated at about 300° C. for about 3 hours (about 1° C./min ramp rate) under an ambient air environment). The material is then transferred into a tube furnace and carbonized at a preselected temperature (e.g., about 300° C., about 400° C., about 500° C., about 600° C., about 700° C., about 800° C., about 900° C., or about 1000° C.; ramp rate of 5° C./min.) under an atmosphere of argon or nitrogen for about 1 hour to form a carbon fiber.

The yield of the carbon fibers after stabilization and carbonization is about 28%, which is higher than carbon fiber yields from the commercial polymer binder, e.g., PVP/PANMA-1000 (about 22.8%).

The PANMA/DMF solution was prepared as an about 9 wt % PANMA in DMF. The PVP/PANMA/DMF solution was prepared as an about 5 wt % PVP/5 wt % PANMA in DMF. Each of these mixtures was subjected to electrospinning, stabilization, and carbonization as described above.

In some embodiments, a carbon fiber containing coal fragments has one or more the following properties:

1) a capacitance of more than about 160 F/g (for example, between about 160 F/g and about 400 F/g, between about 200 F/g and about 400 F/g, between about 200 F/g and about 300 F/g, or between about 200 F/g and about 275 F/g, such as about 250 F/g).

2) a conductivity of more than about 1 S/cm (for example, between about 1 S/cm and about 10 S/cm, between about 3 S/cm and about 10 S/cm, between about 5 S/cm and about 10 S/cm, or between about 6 S/cm and about 10 S/cm, such as about 7 S/cm).

3) a durability (e.g., capacitance retention) of more than about 50% retention after 1000 charge-discharge cycles at a current density of about 1 A/g (for example, more than about 60% retention, more than about 70% retention, more than about 80% retention, more than about 90% retention, such as about 92.5% retention).

4) an elastic modulus (MPa) of more than about 400 MPa (for example, between about 400 MPa and 700 MPa, such as between about 445 MPa to about 615 MPa).

5) a failure stress (MPA) of more than about 2 MPa (for example, more than about 3.5 MPa, more than about 3.7 MPa). Alternately a failure stress of between about 2 MPa and about 30 MPa (for example between about 3 MPa and about 10 MPa, such as about 3.7 MPa).

6) a failure strain (%) of more than about 0.1% (for example, more than about 0.25%, more than about 0.5%, or more than about 0.55%). Alternately a failure strain of between about 0.1% and about 2% (for example between about 0.25% and about 1%, such as between about 0.55% and about 0.65%).

Properties of Coal Before and After Pretreatment with Ionic Liquid

Figure 7B:
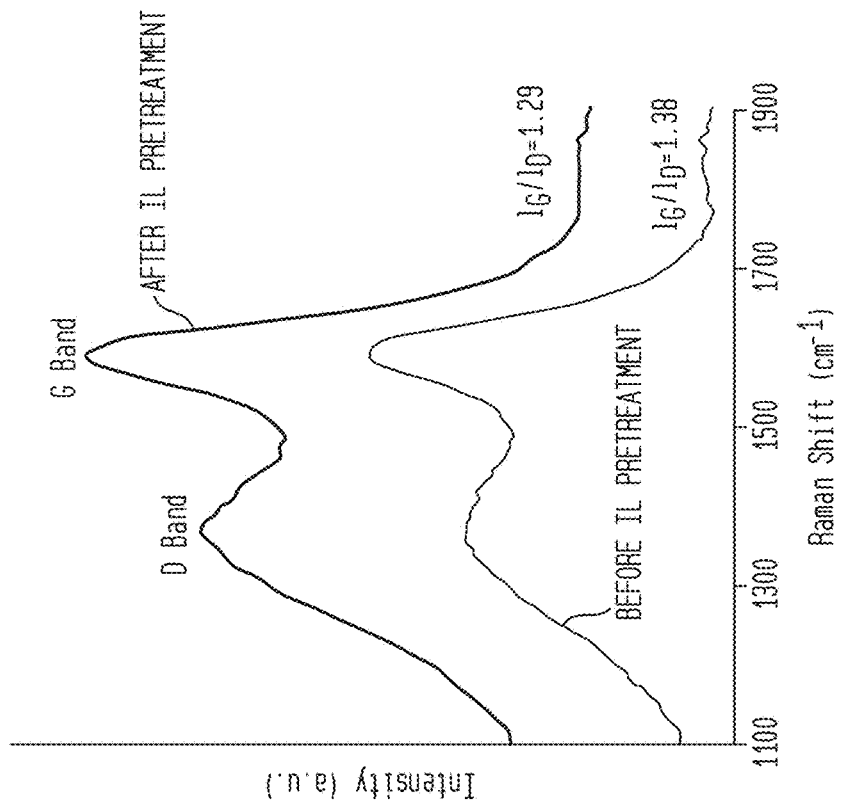
FIG. 7B is a Raman spectrum of coal before and after pretreatment with ionic liquids.
Figure 7A:
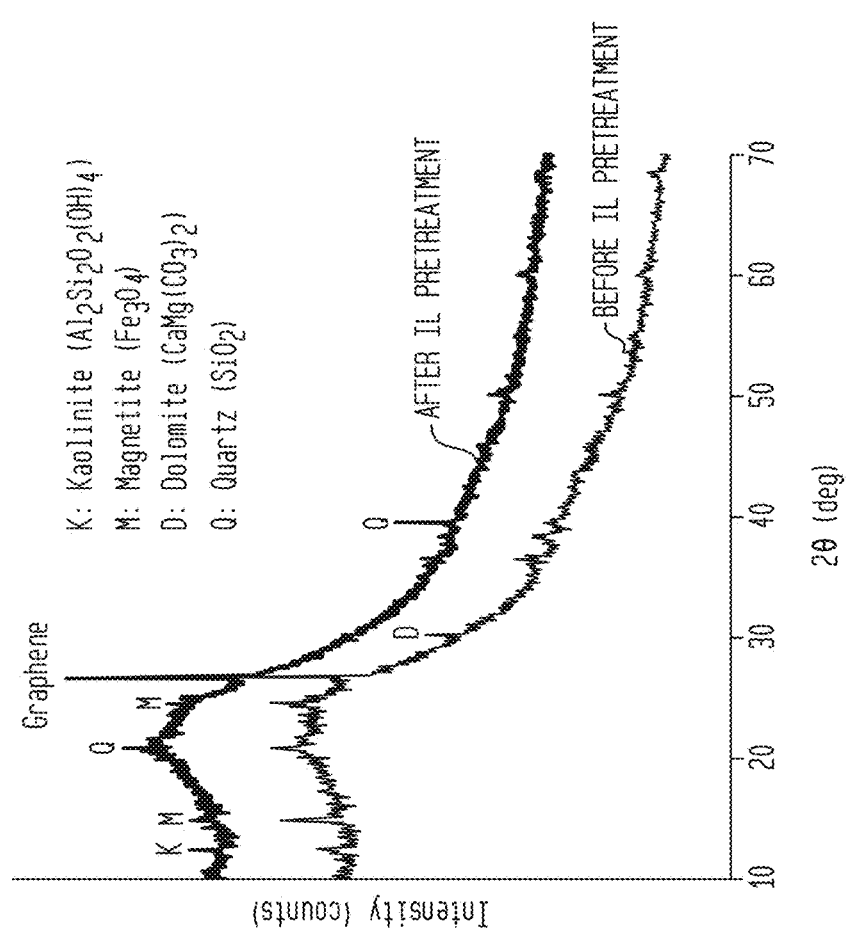
FIG. 7A is an x-ray diffraction (XRD) pattern of coal before and after pretreatment with ionic liquids.

FIG. 7A shows x-ray diffraction (XRD) patterns of raw coal and coal residues before and after pretreatment with ionic liquids. In this example, [$C_4$mim]Cl was used as the ionic liquid. The minerals containing calcium (Ca) and iron (Fe) were found to be solvated by ionic liquids, while silicon (Si) and magnesium (Mg) remained in the insoluble coal fragments, as shown by XRD peaks with significant intensity. As compared to the raw coal sample before pretreatment, the insoluble coal fragments after pretreatment showed a higher intensity and a wider diffraction peak of amorphous carbon centered at about 22°. This data indicated that more amorphous carbon was created during the ionic liquid pretreatment process.

FIG. 7B is a Raman spectrum of coal before and after pretreatment with ionic liquids. The D band at about 1374 $cm^{-1}$ refers to the carbon atoms with dangling bonds in the planes terminated by disordered graphite, while the G band at about 1588 $cm^{-1}$ refers to the $sp^2$-hybridized carbon atoms in a graphite layer. FIG. 7B shows that the graphitization degree of carbon derived from the ratio of intensity of the G band ($I_G$) over the intensity of the D band ($I_D$) was lower in coal residues ($I_G/I_D$ is about 1.29) than in raw coal ($I_G/I_D$ is about 1.38). The lower $I_G/I_D$ ratio indicates that the depolymerization of coal through pretreatment with ionic liquids can break the intramolecular bonds and contribute to a more disordered graphite in the coal residues.

Figure 7C:
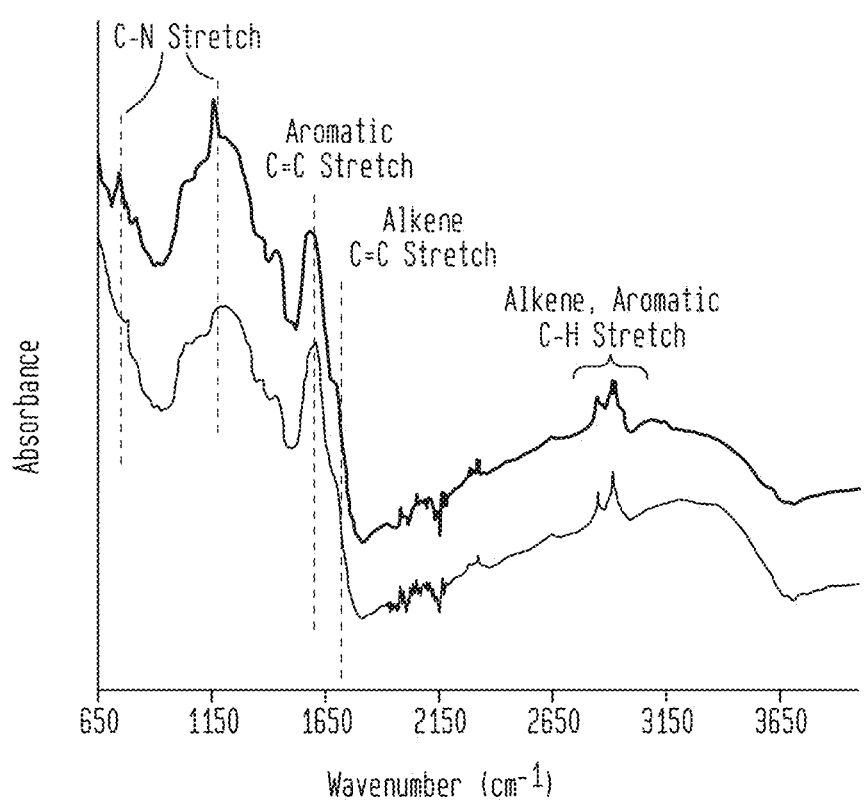
FIG. 7C is a Fourier Transform-Infrared (FT-IR) spectrum of coal before and after pretreatment with ionic liquids.

Fourier Transform-Infrared (FT-IR) analysis (FIG. 7C) also showed that ionic liquids could extract certain compounds from coal. Because [$C_4$mim]Cl exhibits the ability to interact substantially with the π-systems of the molecules in coal, the two peaks at about 1594 $cm^{-1}$ and about 1704 $cm^{-1}$ assigned to aromatic C=C bonds and alkene C=C bonds, respectively, showed lower intensities relative to the neighboring peaks. The intensity ratio of the aromatic C=C stretch over the alkene C=C stretch was found to decrease in coal residues, indicating that [$C_4$mim]Cl more favorably extracted compounds that contain C=C bonds in aromatic rings. Two additional peaks at about 744 $cm^{-1}$ and about 1162 $cm^{-1}$ were observed after ionic liquid pretreatment and were assigned to C—N bonds from residual ionic liquid in the sample. In some embodiments, the sample can be further treated to further remove the ionic liquids.

Figure 7E:
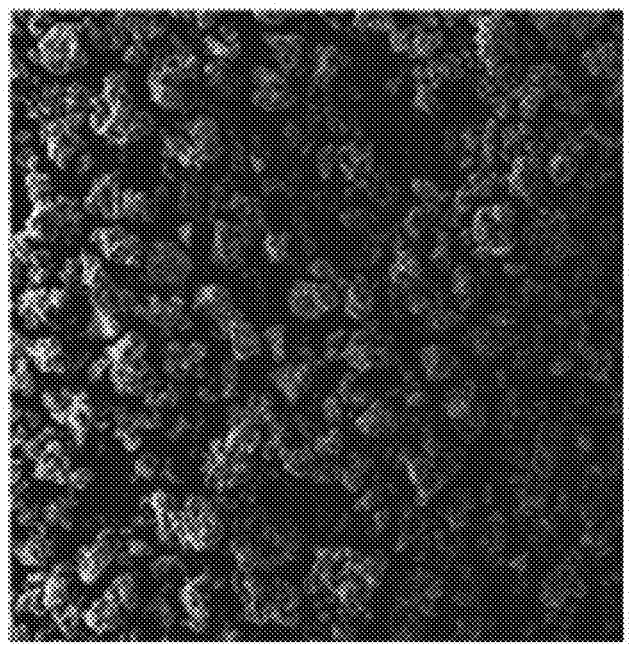
FIG. 7E is a SEM image of coal after pretreatment with ionic liquids.
Figure 7D:
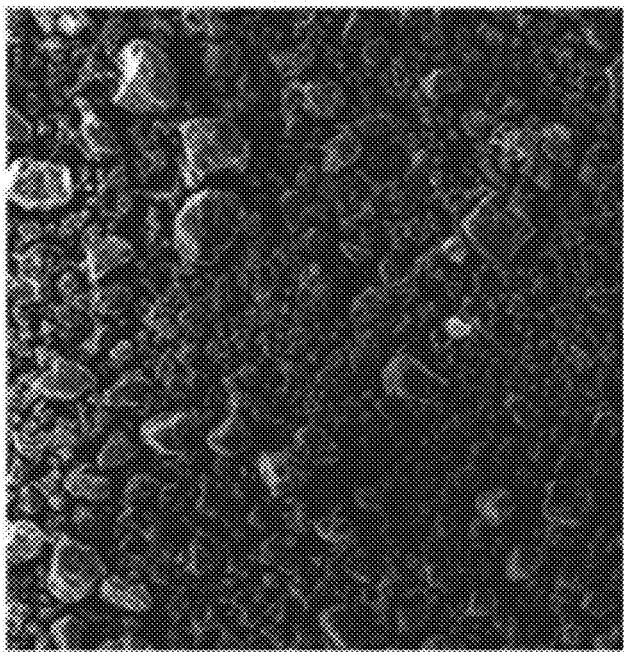
FIG. 7D is a scanning electron microscope (SEM) image of coal before pretreatment with ionic liquids.
Figures 7F, 7G:
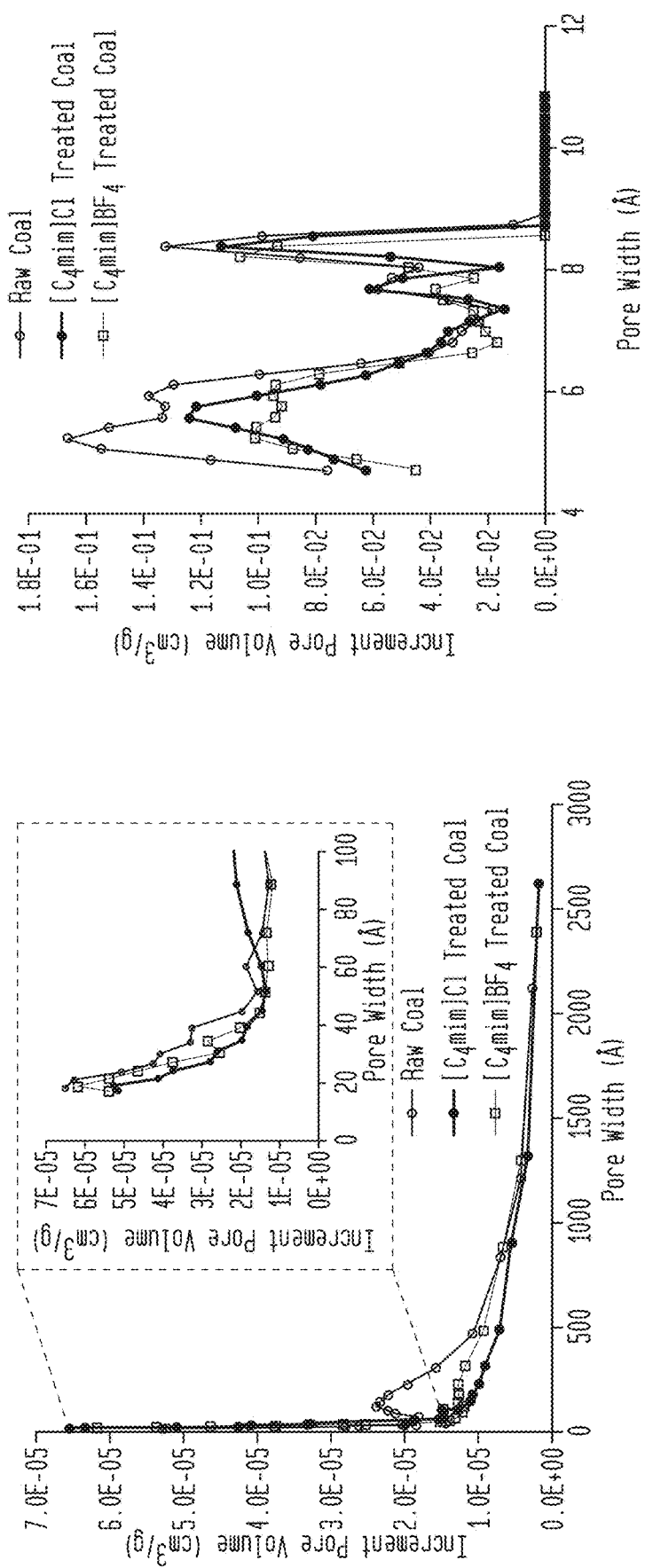
FIG. 7F shows pore distribution in a pore size range>2 nm derived from $N_2$ isotherm of coal before and after pretreatment with ionic liquids, and the inset is an enlargement of the plots.
FIG. 7G shows pore distribution in a pore size range<2 nm derived from $CO_2$ isotherm of coal before and after pretreatment with ionic liquids.

FIG. 7D is a scanning electron microscope (SEM) image of coal before pretreatment with ionic liquids, and FIG. 7E is a SEM image of coal after pretreatment with ionic liquids. After pretreatment with ionic liquids, the lamellar carbon structure on the coal surface (FIG. 7D) was no longer noticeable in the SEM image (FIG. 7E). Moreover, the mesopores having a width of about 10-50 nm collapsed into smaller pores of about 2-10 nm in width (FIG. 7F), which contributed to a slightly higher surface area of the pretreated coal (about 3.40 $m^2/g$) than in raw coal (about 3.36 $m^2/g$) as measured by $N_2$ isotherm. Additionally, the change of coal porosity through pretreatment with ionic liquids showed that the surface area of the micropores and the micropore distribution changed as measured by $CO_2$ isotherm (FIG. 7G). As compared to the Dubinin-Radushkevich micropore surface area of raw coal (about 145.81 $m^2/g$), the coal residues after pretreatment with ionic liquids showed a higher surface area (about 158.12 $m^2/g$), evidenced by the higher pore volumes and a micropore width of about 4 Å to about 7 Å.

Effect of Polymer Precursor on Carbon Fibers

The concentration of polymer precursor in organic solution plays a role in fiber formation during electrospinning processes. 4% PANMA in DMF with reduced viscosity resulted in polymeric particles from electrospray instead of electrospinning, and then surface tension became predominant, resulting in beaded fibers for a 7% PANMA/DMF solution. Until the concentration of PANMA increased to about 9%, the uniform nanofibers can be formed via electrospinning. By modulating the solution viscosity, as well as by adding PVP as a sacrificial agent to reduce the wt % of PANMA, a 5% PVP/5% PANMA/DMF solution with about 360,000 g/mol of PVP precursor was desirable for the formation of uniform fibers. Either lower PVP concentration (about 4%) or lower MW (about 40,000 g/mol) could result in beaded fibers. Cyclization of PANMA in the presence of oxygen in the carbon fiber stabilization step is controlled, since a sudden heat release would happen during this exothermic reaction that could lead to carbon fiber defects.

Figure 8B:
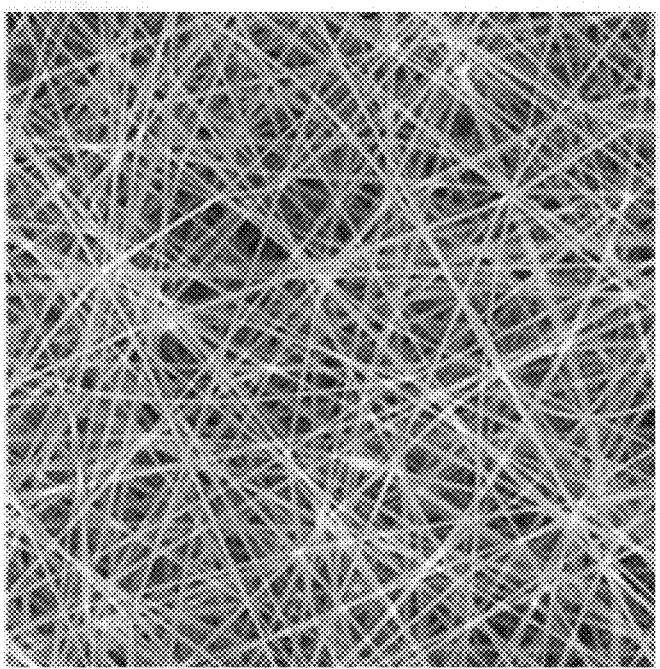
FIG. 8B is a SEM image of as-spun polymer based fibers from the comparative PVP/PANMA/DMF solution, and the inset is the corresponding fiber diameter distribution.
Figure 8A:
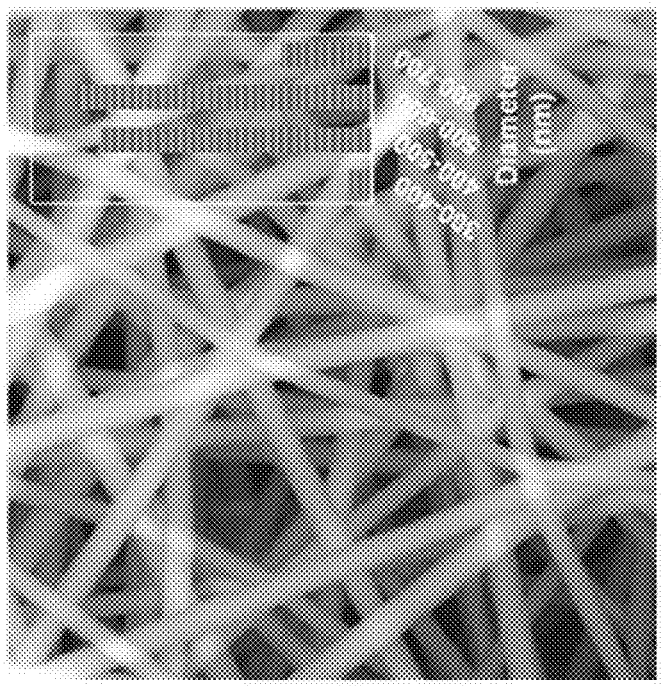
FIG. 8A is a scanning electron microscope (SEM) image of as-spun polymer based fibers from the comparative PVP/PANMA/DMF solution, and the inset is the corresponding fiber diameter distribution.

FIGS. 8A-8F show scanning electron microscope (SEM) images of the various fibers before and after stabilization (oxidation/cyclization) and carbonization. FIGS. 8A and 8B show SEM images (20 μm scale and 5 μm scale, respectively) of the fibers fabricated from the 5% PVP/5% PANMA/DMF solution. By adjusting the voltage (about 20 kV), flow rate of the solution (about 0.7 ml/hour), and distance between syringe needle and collector (about 20 cm), the uniform fibers fabricated from 5% PVP/5% PANMA/DMF solution were formed with a narrow diameter distribution between about 400 nm and about 600 nm.

By adding about 2 wt % of coal fragments in the solution (2F/5% PVP/5% PANMA/DMF), the diameter of the as-spun fibers reduced to between about 200 nm and about 400 nm (FIGS. 8C and 8D). This result indicated that adding coal fragments could influence the properties of the PVP/PANMA/DMF solution, for example, the electrical conductivity.

Figure 8F:
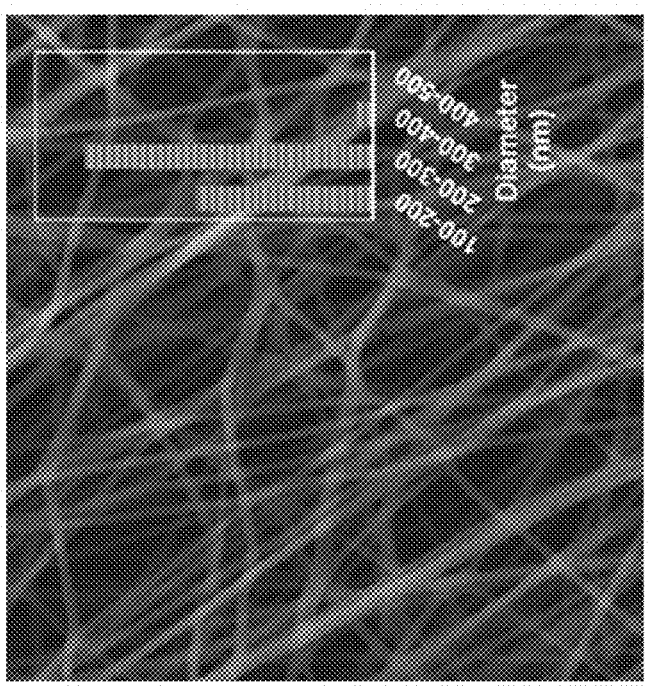
FIG. 8F is a SEM image of carbon fibers from the example carbon fiber 2F/PVP/PANMA-1000 following stabilization and carbonization, and the inset is the corresponding fiber diameter distribution, according to some embodiments.
Figure 8E:
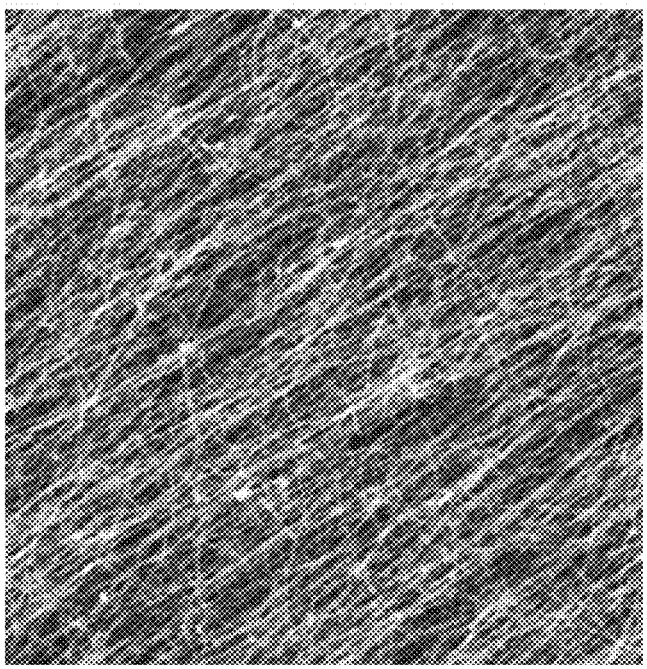
FIG. 8E is a SEM image of carbon fibers from the example carbon fiber 2F/PVP/PANMA-1000 following stabilization and carbonization, and the inset is the corresponding fiber diameter distribution, according to some embodiments.

FIGS. 8E and 8F show the carbon fibers of the 2F/5% PVP/5% PANMA after stabilization and then carbonization at about 1000° C. (2F/5% PVP/5% PANMA-1000). The diameter of the carbon fibers is between about 100 nm and about 300 nm. This result indicated decomposition of PVP and coal fragments. Here, a temperature of about 300° C. for about 3 hours was utilized for stabilization. Following the stabilization operation, carbonization was performed in an argon (Ar) environment. PVP started to decompose at about 400° C., resulting in generation of a porous structure on PANMA-based carbon fibers. The decomposition of coal fragments began at about 600° C. resulting in lower carbon fiber diameters.

Mechanical Properties of the Carbon Fibers

The example carbon fibers containing coal fragments showed good mechanical properties relative to common polymers as shown in Table 2. The carbon fibers showed increased stiffness over polytetafluoroethylene and comparable failure stress and failure strain relative to the comparative polymers.

TABLE 2

Mechanical Properties of Coal-Based Carbon Fibers

| | Carbon Fiber Samples | Comparatives |
|---|---|---|
| Elastic Modulus (MPa) | 445.14-614.52 | polytetrafluoroethylene: 400-500 |
| Failure Stress (MPa) | 3.71-4.01 | low-density polyethylene: 8.3-31.4 |
| Failure Strain (%) | 0.55-0.61 | polystyrene: 1.2-2.5 |

Surface Chemistry of the Carbon Fibers

Table 3 shows the relative surface concentrations of nitrogen and oxygen obtained by fitting the N1s and O1s x-ray photoelectron spectroscopy (XPS) spectra. Table 3 also shows C, N, and O component concentrations on the carbon fiber surface obtained from XPS survey scans. PANMA-1000 and PVP/PANMA-1000 are comparative carbon fibers. Adding PVP to PANMA showed an insignificant element composition change on the carbon fiber surface, which is likely due to most of the PVP decomposing during carbonization. The oxygen level in the fabricated carbon fiber with about 0.5 wt % coal fragments (Example 1) showed a much higher percentage of about 14.5% than in PVP/PANMA-1000, and increased to about 21.2% in the carbon fiber with about 2 wt % coal fragments (Example 3). The increase in total oxygen level indicated that the carbon fibers were enriched by oxygen as a result of adding coal fragments.

TABLE 3

Relative Surface Concentrations of Nitrogen and Oxygen and Carbon, Nitrogen, and Oxygen Component Concentrations on Carbon Fiber Surface (by XPS Measurements)

| Example | | Oxygen Species | | | Nitrogen Species | | O | N | C |
|---|---|---|---|---|---|---|---|---|---|
| Carbon Fiber | Composition | $O_I$ | $O_{II}$ | $O_{III}$ | N-P | N-Q | Total | Total | Total |
| Comparative 1 | PANMA-1000 | 29.6 | 42.6 | 27.8 | 37.8 | 62.2 | 4.8 | 3.1 | 92.1 |
| Comparative 2 | PVP/PANMA-1000 | 14.1 | 59.1 | 76.9 | 23.1 | 76.9 | 5.2 | 2.4 | 92.4 |
| Example 1 | 0.5F/PVP/PANMA-1000 | 3.1 | 60.0 | 36.9 | 23.5 | 76.5 | 14.5 | 1.5 | 84.0 |
| Example 2 | 1F/PVP/PANMA-1000 | 3.3 | 56.9 | 39.9 | 38.8 | 61.2 | 19.2 | 1.1 | 73.8 |
| Example 3 | 2F/PVP/PANMA-1000 | 6.4 | 74.7 | 18.9 | 36.9 | 63.1 | 21.2 | 2.3 | 76.5 |
| Example 4 | 2F/PVP/PANMA-800 | 5.1 | 74.7 | 20.2 | 46.1 | 53.9 | 11.6 | 5.5 | 82.9 |

Figure 9B:
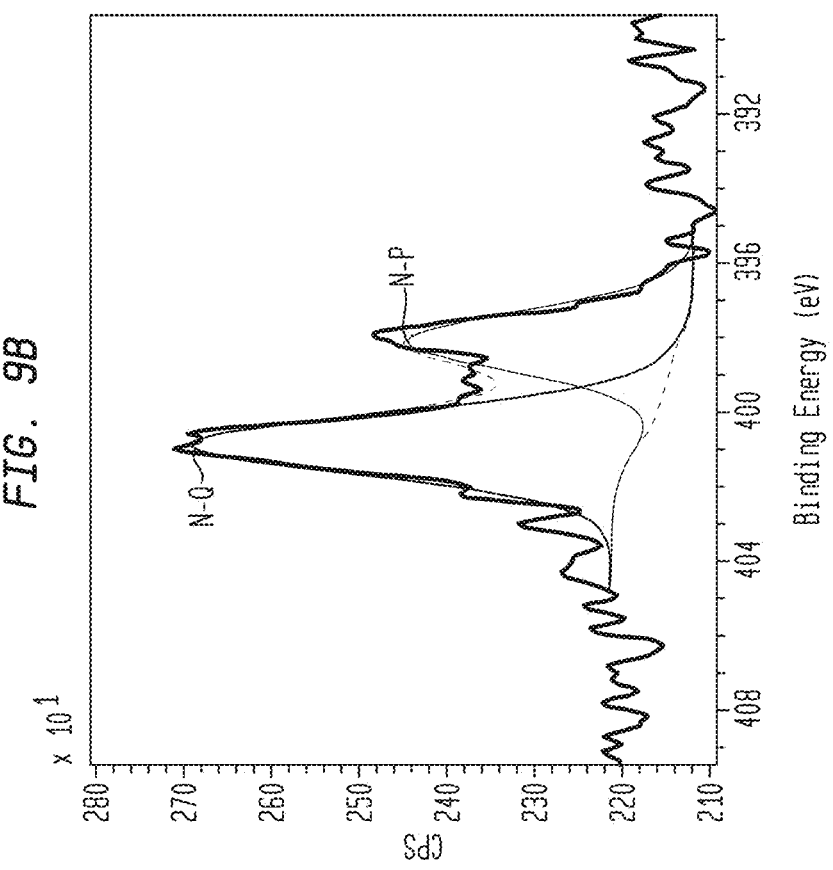
FIG. 9B is a N1s XPS spectrum of the comparative carbon fiber PANMA-1000.
Figure 9A:
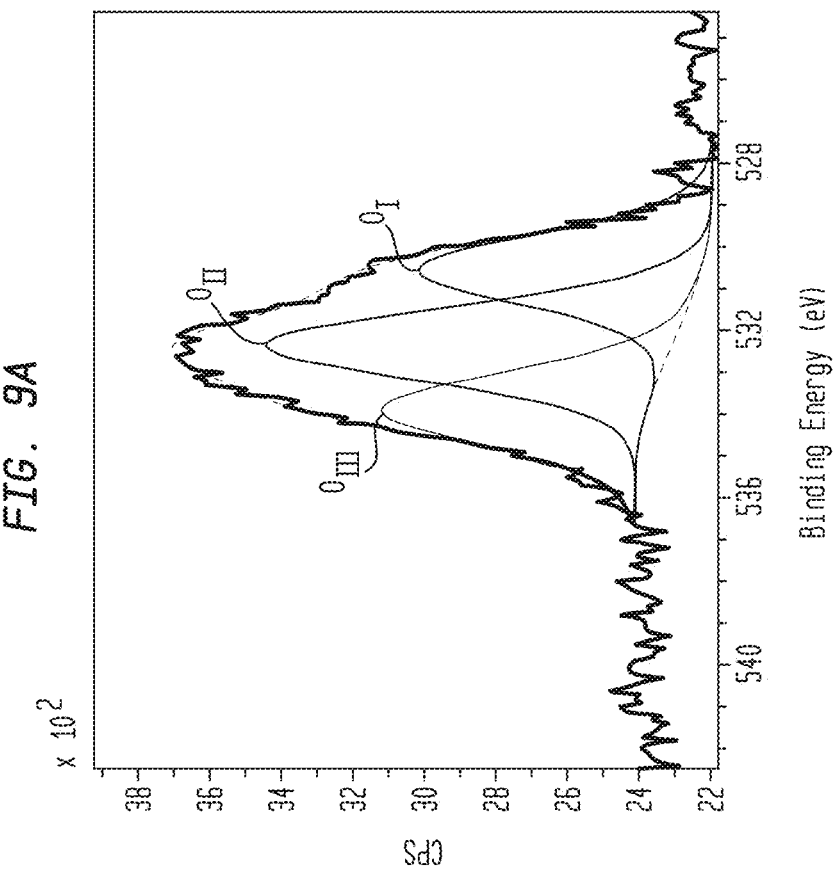
FIG. 9A is a O1s x-ray photoelectron spectroscopy (XPS) spectrum of the comparative carbon fiber PANMA-1000.
Figure 9F:
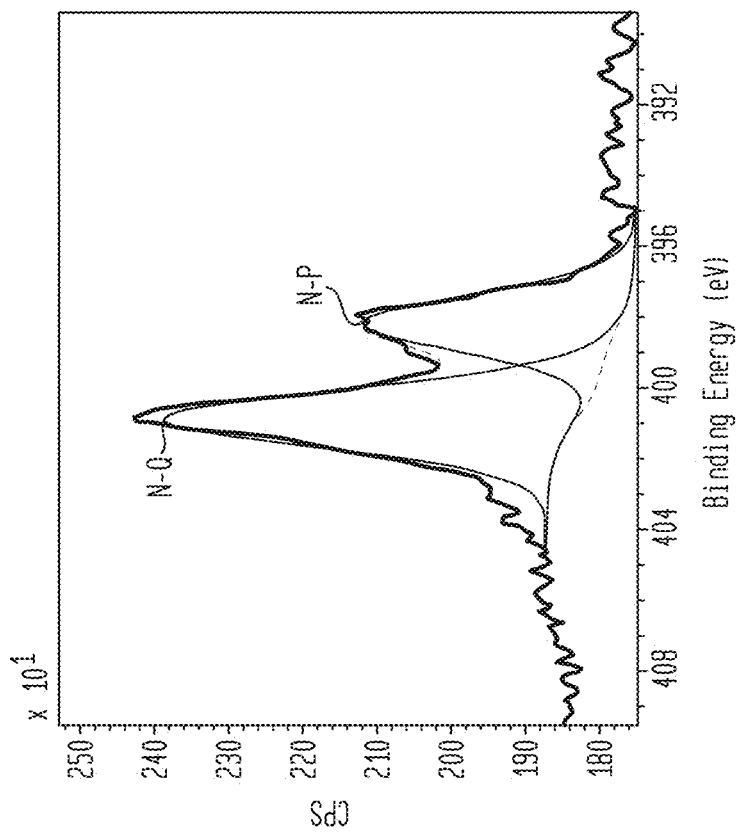
FIG. 9F is a N1s XPS spectrum of the example carbon fiber 2F/PVP/PANMA-1000.
Figure 9E:
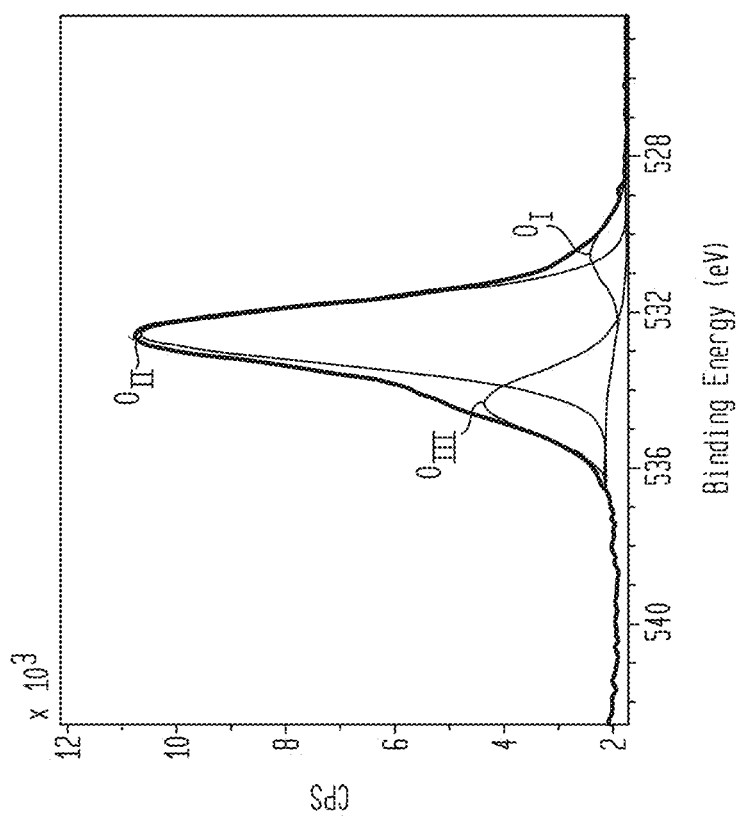
FIG. 9E is an O1s XPS spectrum of the example carbon fiber 2F/PVP/PANMA-1000.

High resolution XPS scans of O1s show the existing oxygen species on the surface of the example carbon fiber and the comparative carbon fibers (FIGS. 9A, 9C, 9E). The peak at about 530.5 eV represents the C—O quinone type groups ($O_I$); the peak at about 532 eV represents the C—OH phenol type groups and/or C—O—C ether type groups ($O_{II}$); and the peak at about 534 eV represents the COOH carboxylic type groups ($O_{III}$). Higher concentrations of $O_{II}$ type groups and $O_{III}$ type groups enhance the hydrophilic nature of carbon fibers resulting in higher wettability. In turn, wettability could enhance the transfer of ions from the electrolytes to the carbon fiber surface and within the carbon fibers.

Compared to the percentage of the $O_I$ group among the oxygen groups, the $O_{II}$ and $O_{III}$ groups were observed to be more concentrated in the carbon fiber containing about 2 wt % coal fragments (Example 3, FIG. 9E) than in the comparative carbon fiber (Comparative 1, FIG. 9C). Additionally, and in consideration of the much higher oxygen concentration in the carbon fibers having coal fragments (about 21.2%), a higher percentage of $O_I$ type groups is presented in the carbon fiber containing coal fragments (about 1.36% in Example 3) than the carbon fiber without coal fragments (about 0.7% in Comparative 1). Since $O_I$ quinone groups are involved in pseudofaradaic reactions, the carbon fiber containing coal fragments are believed to achieve higher capacitance resulting from both double-layer and pseudofaradaic effects.

Increasing carbonization temperature assists in the enrichment of oxygen on the carbon fiber surface as shown in Table 3. The carbon fiber carbonized at about 800° C. (Example 4) showed an oxygen concentration of about 11.6%, which was much lower than the carbon fiber carbonized at about 1000° C. (about 21.2%). While not wishing to be bound by theory, it is believed that the coal fragments that were initially embedded into the spun fibers from electrospinning became more exposed on the carbon fiber surface during the dehydrogenation/denitrification of the cross-linked PANMA polymer at higher carbonization temperatures.

FIGS. 9B, 9D, and 9F are high resolution XPS scans of N1s showing the existing nitrogen species on the surface of the example carbon fiber and the comparative carbon fibers. The peak at about 398 eV represents the pyridinic-nitrogen type groups (N-P) and the peak at about 401 eV represents the quaternary-nitrogen type groups (N-Q). The cyclization of PANMA forms turbostratic carbon with embedded N-Q within the network and N-P along the edges, contributing to about 37.8% N-P and about 62.2% N-Q in nitrogen species (Table 3). Adding PVP to PANMA (Comparative 2) facilitates the cyclization of PANMA with significantly increased N-Q concentration (about 76.9%) (FIG. 9D). This PVP effect on the nitrogen species could be another factor besides porosity that leads to enhanced capacitance in the carbon fibers fabricated from PVP/PANMA precursors. Compared to the significant change in oxygen species by adding about 0.5 wt % coal fragments, the concentration ratio between N-Q and N-P decreased slightly. Generally, when nitrogen-enriched precursors or functional groups were introduced into the carbon fibers, additional peaks emerged in N1s, such as pyrrolic/pyridine and pyridine-N-oxide. However, when the concentration of coal fragments increased to about 2 wt %, there were no additional peaks observed in N1s XPS spectra (FIG. 9F), which indicated that the amount of nitrogen functional groups introduced by the coal fragments was quite limited.

Surface Area and Porosity of the Carbon Fibers

Figure 10A:
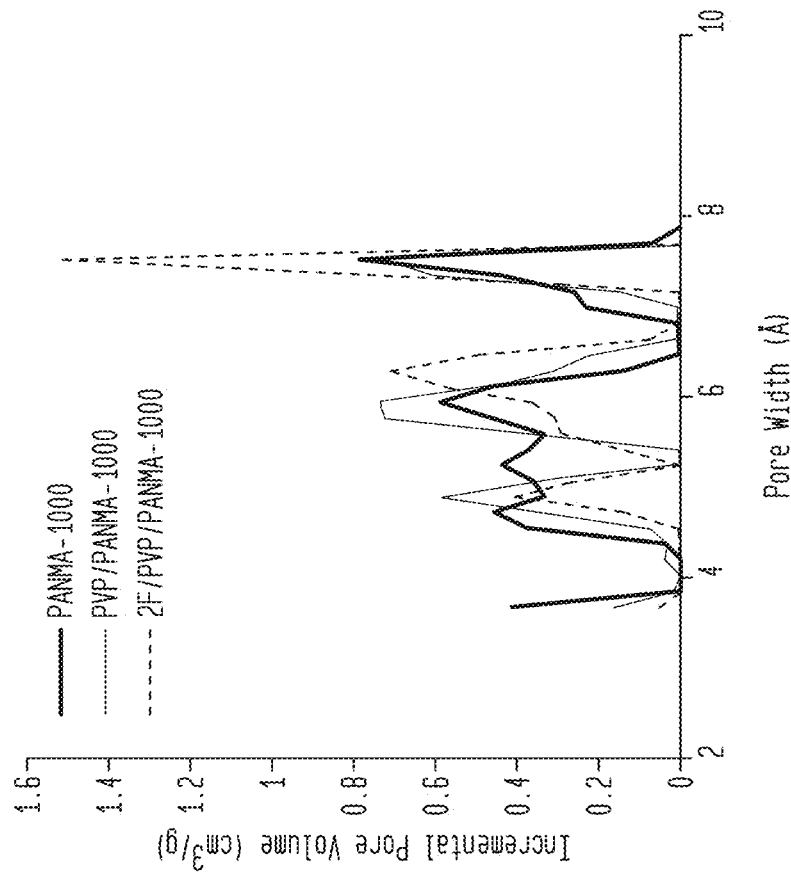
FIG. 10A is a plot of incremental pore volume versus pore width for an example carbon fiber and comparative carbon fibers calculated from $N_2$ adsorption isotherms, according to some embodiments.
Figure 10B:
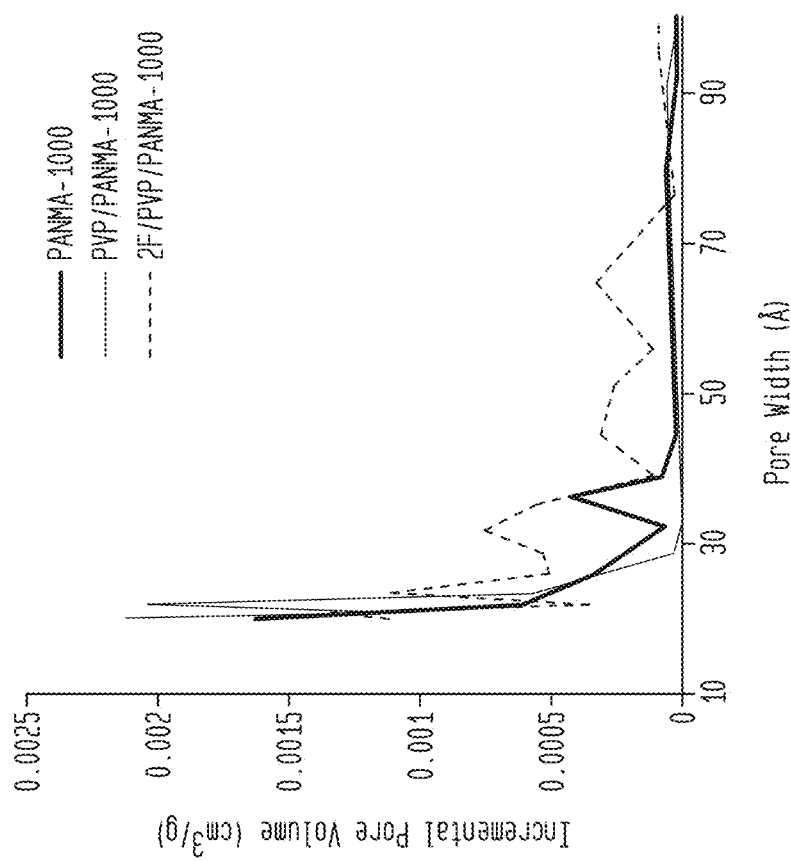
FIG. 10B is a plot of incremental pore volume versus pore width for an example carbon fiber and comparative carbon fibers calculated from $CO_2$ adsorption isotherms, according to some embodiments.

Table 4 summarizes the surface areas and porosities of the example carbon fibers and the comparative carbon fibers from $N_2$ and $CO_2$ adsorption isotherms. FIG. 10A shows pore size distributions for example and comparative carbon fibers in the mesoporous region calculated from $N_2$ adsorption isotherms using the Barrett-Joyner-Halenda (BJH) method. FIG. 10B shows pore size distributions for example and comparative carbon fibers in the microporous region calculated from $CO_2$ adsorption isotherms using the density functional theory (DFT) method.

Without steam or $CO_2$ as active agents to etch the surface of the PANMA-based carbon fiber after the carbonization operation, the resulting surface area ($S_{BET}$) of PANMA-1000 in the mesoporous region was about 106.635 m$^2$/g. The Brunauer, Emmett, and Teller (BET) surface area measurement is described in the Test Methods section. In contrast, a much higher surface area measured by $CO_2$ (about 729.270 m$^2$/g) indicated that micropores were predominant in the porous structure of the fabricated carbon fibers. PVP/PANMA-1000 (Comparative 2) had a higher mesopore surface area of about 400.651 m$^2$/g and a higher micropore surface area of about 984.609 m$^2$/g due to PVP decomposition. Adding coal fragments to PVP/PANMA precursors, e.g., Example 3, showed a similar mesopore surface area (about 375.895 m$^2$/g) and volume (0.213 cm$^3$/g), but a wider pore distribution from about 2 nm to about 7 nm (FIG. 10A). The wider pore distribution derived from carbon fibers containing coal fragments may facilitate ion diffusion from electrolytes into the porous structure of carbon fibers with lower ion diffusion resistance.

The carbon fiber containing about 2 wt % coal fragments (Example 3) had a large increase in micropore surface area (about 1678.799 m$^2$/g) and volume (about 7.633 cm$^3$/g), while the pore volume below about 0.1 nm in 2F/PVP/PANMA-1000 decreased from about 0.11 cm$^3$/g in 0.5F/PVP/PANMA-1000 to about 0.077 cm$^3$/g (FIG. 10B). These values were derived from the BET measurement device and software as discussed in the Test Methods section. This indicated that the ultra-small micropores under about 0.1 nm were partially blocked by adding more functional groups from coal fragments onto the carbon fiber surface.

Additionally, the effect of higher carbonization temperature on carbon fiber porosity was reflected by increased volumes in both the mesopore and micropore regions. Specifically, Example 4 (carbonization temperature of about 800° C.) had a mesoporous volume of about 0.133 cm$^3$/g, much lower than the mesoporous volume of about 0.213 cm$^3$/g for Example 3 (carbonization temperature of about 1000° C.). While not wishing to be bound by theory, it is believed that the reduction in mesoporous volume is due to $N_2$ not fully evolving in the formation of turbostratic carbon at about 800° C. Moreover, increased temperature during carbonization created smaller average pore width. Specifically, Example 4 had an average pore width of about 29.7 Å, and Example 3 had an average pore width of about 24.9 Å.

Furthermore, the decomposition of coal became more significant above about 800° C. (FIG. 10B) and fewer micropores were created in 2F/PVP/PANMA-800 (Example 4). The lower amount of micropores resulted in a reduced surface area (about 1055.860 m$^2$/g) and volume (about 4.697 cm$^3$/g) in the micropore region. The data show that the addition of coal fragments to PVP/PANMA widened the pore distribution in the mesoporous structure of the resulting carbon fiber and generated more micropores.

TABLE 4

Surface Areas and Porosities of Example and Comparative Carbon Fibers Derived from $N_2$ and $CO_2$ Adsorption Isotherms

| Example Carbon Fiber | Composition | Mesoporous Region (>2 nm) | | | Microporous Region (<2 nm) | | |
| --- | --- | --- | --- | --- | --- | --- | --- |
| | | $S_{BET}$ (m$^2$/g) | $V_{meso}$ (cm$^3$/g) | Pore Width (Å) | $S_{CO2}$ (m$^2$/g) | $V_{CO2}$ (cm$^3$/g) | $V_{<10Å}$ (cm$^3$/g) |
| Comparative 1 | PANMA-1000 | 106.635 | 0.039 | 32.066 | 729.270 | 1.275 | 0.089 |
| Comparative 2 | PVP/PANMA-1000 | 400.651 | 0.193 | 21.675 | 984.609 | 2.676 | 0.077 |
| Example 1 | 0.5F/PVP/PANMA-1000 | — | — | 22.145 | — | — | — |

TABLE 4-continued

Surface Areas and Porosities of Example and Comparative Carbon Fibers
Derived from $N_2$ and $CO_2$ Adsorption Isotherms

| Example Carbon Fiber | Composition | Mesoporous Region (>2 nm) | | | Microporous Region (<2 nm) | | |
|---|---|---|---|---|---|---|---|
| | | $S_{BET}$ (m²/g) | $V_{meso}$ (cm³/g) | Pore Width (Å) | $S_{CO2}$ (m²/g) | $V_{CO2}$ (cm³/g) | $V_{<10Å}$ (cm³/g) |
| Example 2 | 1F/PVP/PANMA-1000 | 366.008 | 0.208 | 23.042 | 1493.052 | 5.177 | 0.098 |
| Example 3 | 2F/PVP/PANMA-1000 | 375.895 | 0.213 | 24.909 | 1678.799 | 7.633 | 0.072 |
| Example 4 | 2F/PVP/PANMA-800 | 331.631 | 0.133 | 29.777 | 1055.860 | 4.697 | 0.085 |

Electrical Conductivity of the Carbon Fibers

FIG. 11A shows graphitization degrees (as measured by Raman spectroscopy of the surface) of the example carbon fibers and a comparative carbon fiber. FIG. 11B shows the conductivities of the carbon fibers. The D band of the Raman spectra (about 1380 cm$^{-1}$) refers to the vibration of carbon atoms with dangling bonds in the plane terminated by disordered graphite, while the G band (about 1590 cm$^{-1}$) corresponds to the E2g mode of hexagonal graphite involving the vibration of sp$^2$-hybridized carbon atoms in a graphite layer. FIGS. 11A and 11B show that the coal fragments increased the graphitization degree of the carbon fibers which resulted in enhanced conductivity of the carbon fibers. As shown in FIG. 11B, the graphitization degree increased linearly from about 0.97 in PVP/PANMA-1000 to about 1.02 in Example 3 (2F/PVP/PANMA-1000), revealing the consistent trend with the increased conductivity of carbon fibers in FIG. 11A. This fact could be a result of the high graphitization degree of the coal precursor used (e.g., the coal residues after pretreatment with ionic liquid) as well as the source of the coal.

Higher carbonization temperatures also significantly influenced the graphitization degree (FIG. 11D), which in turn significantly increased the conductivity. For example, the conductivity of 2F/PVP/PANMA-1000 was about 7.6 S/cm, which is about 6 times that of 2F/PVP/PANMA-800 (about 1.3 S/cm) (FIG. 11C). The data from FIGS. 11A-11D indicate that temperature plays a larger role than concentration of coal fragments in affecting the graphitization degree and the conductivity of carbon fibers.

Electrochemical Performance of the Carbon Fibers

Figure 12D:
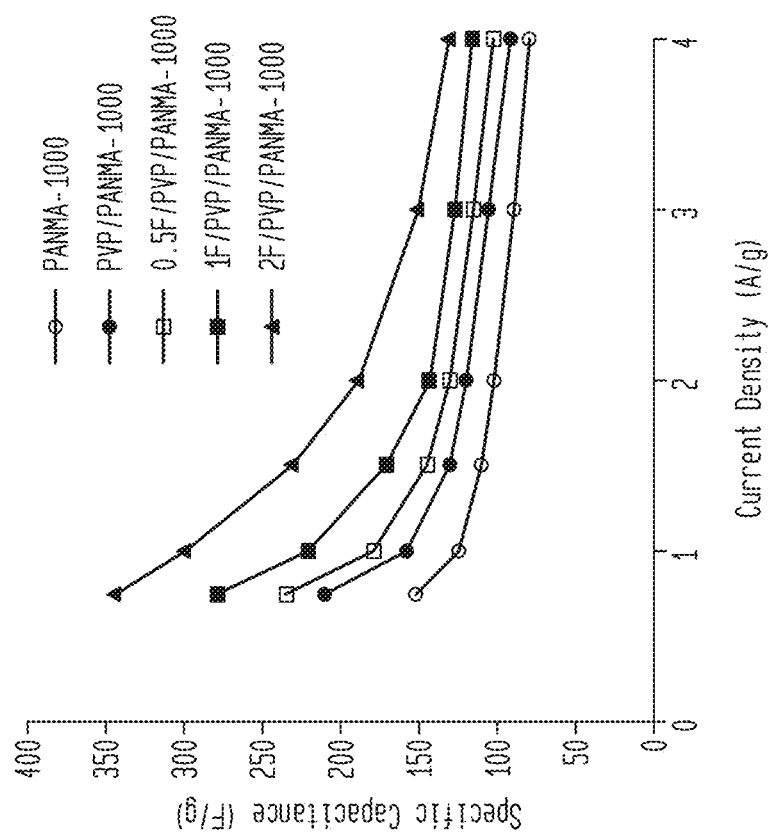
FIG. 12D shows rate performances for example carbon fibers and comparative carbon fibers, according to some embodiments.
Figure 12C:
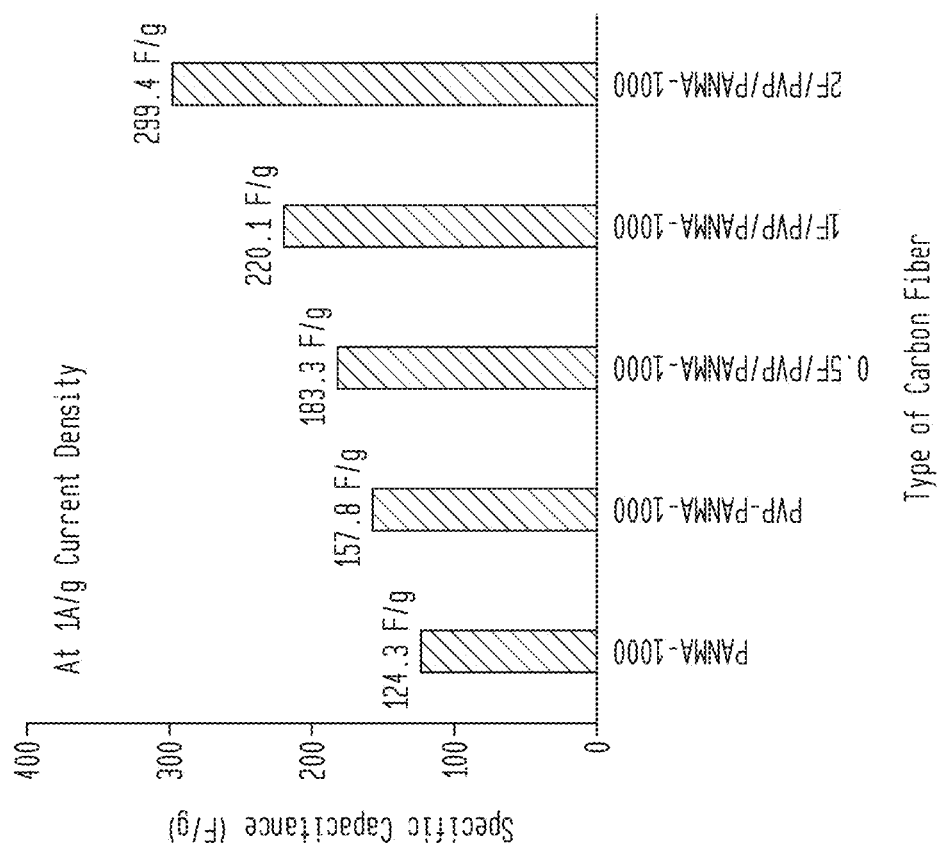
FIG. 12C shows calculated specific capacitance (F/g) versus type of carbon fiber at 1 A/g current density, according to some embodiments.

FIGS. 12A-12D show the electrochemical capacitance behaviors of the example and comparative carbon fibers studied in a three electrode cell using about 6M KOH aqueous electrolytes. The quasi-triangular shape of the galvanostatic charge-discharge profiles (FIG. 12B) represented the typical double-layer properties of carbon fibers containing coal fragments. The cyclic voltammetry (CV) profile of Comparative 1 (PANMA-1000) recorded at a scan rate of about 10 mV/s (FIG. 12A) showed a redox peak in a wide potential range from about −0.8 V to about −0.5 V. In contrast, the example carbon fibers with coal fragments showed more defined redox peaks. While not wishing to be bound by theory, it is believed that a pseudocapacitive effect results from the reversible reduction/oxidation of quinone introduced by coal fragments to hydroquinone. Increasing the concentration of coal fragments to about 2 wt % (2F/PVP/PANMA-1000) shows a more apparent redox peak in the CV profile (FIG. 12A) and a distorted curve that occurred around about 100 seconds in galvanostatic charge-discharge (FIG. 12B). Thus, the pseudofaradaic effect becomes more significant with higher concentrations of coal fragments, which is consistent with the surface chemistry (Table 3) that showed a higher $O_f$ concentration on the surface of 2F/PVP/PANMA-1000. By following the equation in the Test Methods section, the specific capacitances ($C_s$) of the fabricated carbon fibers were calculated from the galvanostatic charge-discharge at about 1 A/g current density (FIG. 12B) and summarized in FIG. 12C. As shown, the specific capacitances of comparatives PANMA-1000 and PVP/PANMA-1000 were about 124.3 Farads/gram (F/g) and about 157.8 F/g, respectively. By adding coal fragments, the capacitance increased to about 183.3 F/g for 0.5F/PVP/PANMA-1000, and further increased to about 299.4 F/g for 2F/PVP/PANMA-1000. When applying higher current densities from about 1 A/g to 4 A/g, the specific capacitance of PVP/PANMA-1000 as high as about 63.5% retention, while 2F/PVP/PANMA-1000 had about 56.6% retention (FIG. 12D).

Generally, at larger current loads, electrochemical polarization occurs in the faradaic reaction that results in weaker endurance for the pseudocapacitors when compared to double layer capacitors. Therefore, this dramatically reduced rate capability of carbon fiber containing coal fragments may result from their predominant pseudocapacitance nature. Generally, capacitors only have double-layer capacitance. However, O-type groups may be added such that the capacitors additionally have pseudocapacitance. In such situations, the capacitor has higher capacitance values than capacitors with only double layer capacitance. Adding coal provides added O-type groups, and accordingly, the carbon fibers with added coal have pseudocapacitance properties.

Figure 13B:
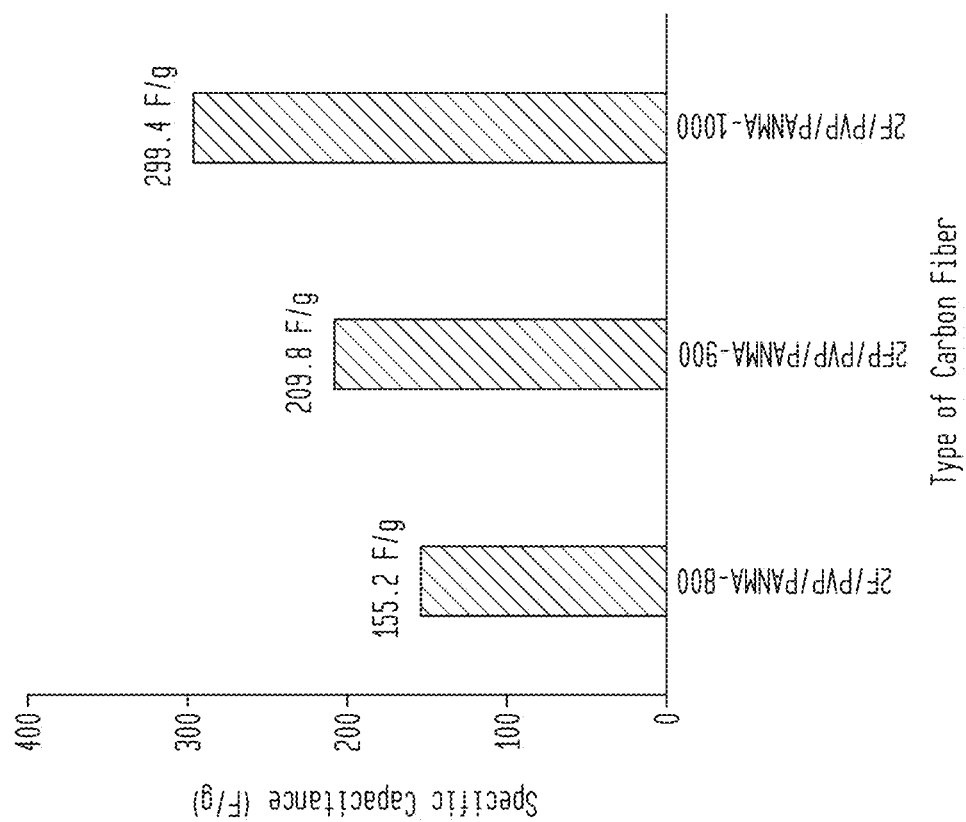
FIG. 13B shows calculated specific capacitances of example carbon fibers carbonized at different temperatures, according to some embodiments.
Figure 13A:
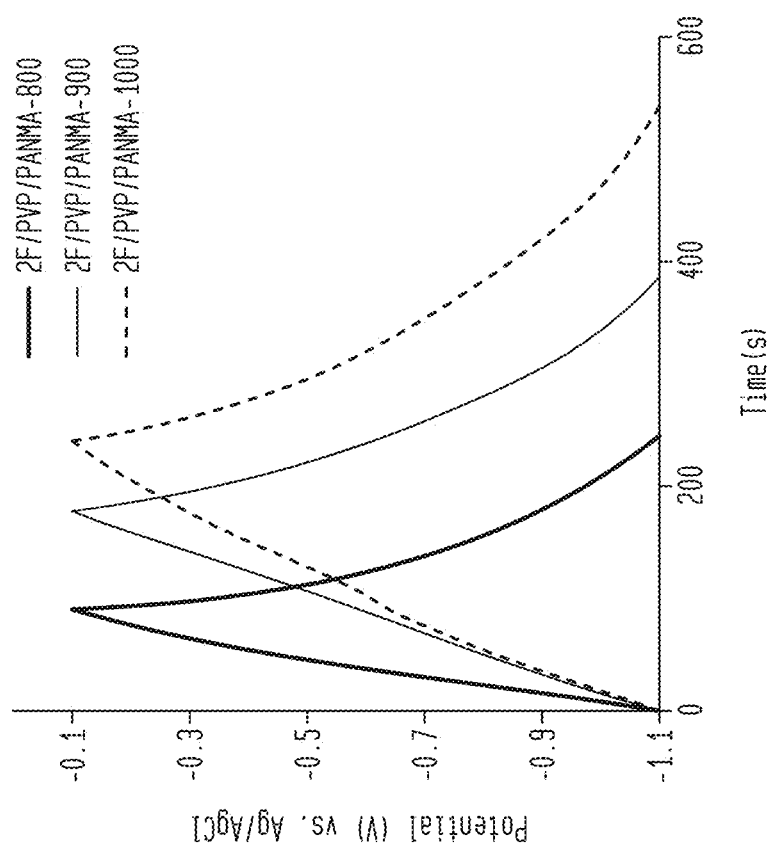
FIG. 13A shows galvanostatic charge-discharge curves at 1 A/g current density of example carbon fibers carbonized at different temperatures, according to some embodiments.

In addition to the linear relationship between concentration of coal fragments and specific capacitance, increasing the carbonization temperature results in increased capacitance of the carbon fiber. For example, the carbon fiber showed an about 92.9% capacitance increase for carbon fibers carbonized at about 800° C. (about 155.2 F/g) to about 1000° C. (about 299.4 F/g) (FIGS. 13A and 13B).

The introduction of coal fragments improved capacitance as compared to the PANMA and PVP/PANMA carbon fibers. The data shows that the improved capacitance is likely due to at least some of the following factors: more O- and N-groups were introduced by adding coal and resulting in pseudocapacitance effects; more micropores were generated with about 1 wt % of coal fragments (about 0.098 cm³/g, about 1493.1 cm²/g) than the comparative carbon fiber without coal (about 0.077 cm³/g, about 984.6 cm²/g); and the hydrophilic groups increased the wettability of the carbon fibers and provided for faster ion diffusion.

Electrochemical Impedance Spectroscopy (EIS) Study of Carbon Fibers

Figure 14B:
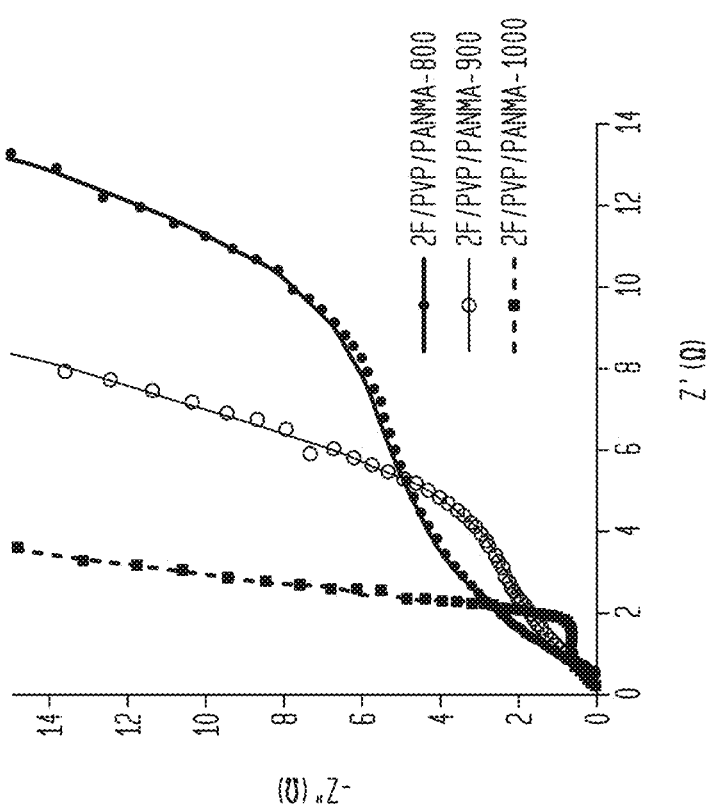
FIG. 14B is a Nyquist impedance plot of three electrode cells of example carbon fibers carbonized at different temperatures, according to some embodiments.
Figure 14A:
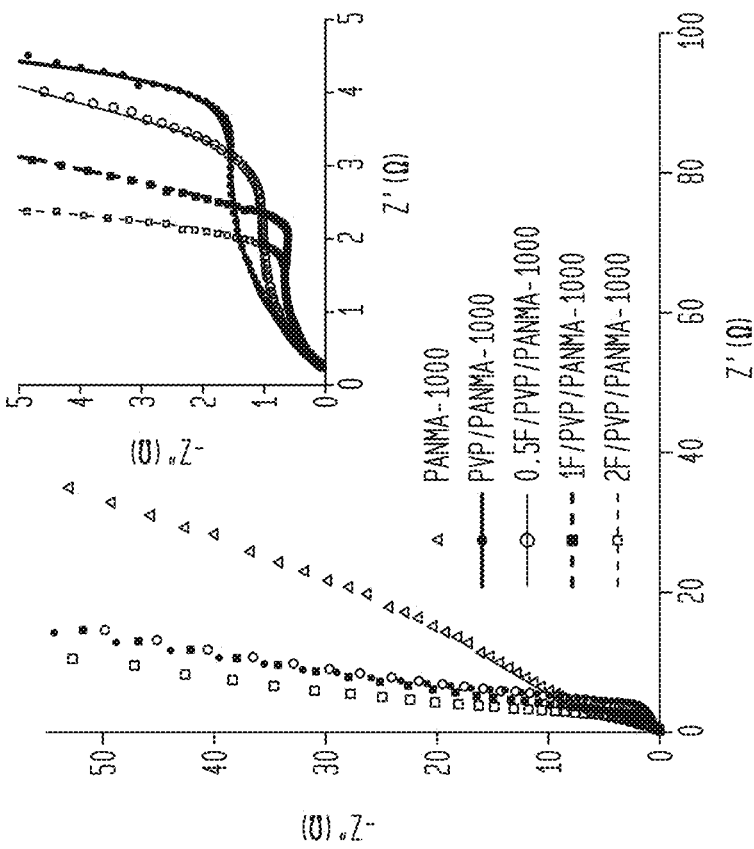
FIG. 14A is a Nyquist impedance plot of three electrode cells of example carbon fibers and comparative carbon fibers, according to some embodiments.

Electrochemical impedance spectroscopy (EIS) was carried out to study the dynamic properties on both electrodes and electrolytes. EIS measurements were conducted in a three electrode cell under about 6M KOH aqueous electrolytes at an applied potential of about 0 V with a sinusoidal signal of about 10 mV. The data was collected in the frequency range from about 10 kHz to about 0.01 kHz. Based on the equivalent circuit model, the Nyquist plots of fabricated carbon fibers (FIGS. 14A and 14B) were fitted using $Z_{view}$ software, well known in the art, to calculate the ion migration resistance in the electrolyte ($R_s$), internal resistance of electrode ($R_{ct}$), and ion diffusion resistance into porous structures of electrode ($R_p$) (Table 5). FIG. 14A is a Nyquist impedance plot of three electrode cells of example carbon fibers having different amounts of coal fragments and comparatives. FIG. 14B is a Nyquist impedance plot of three electrode cells of example carbon fibers carbonized at different temperatures. In both FIG. 14A and FIG. 14B, the hollow circle is experimental data and the solid line is calculated data.

2F/PVP/PANMA-1000 showed lower $R_{ct}$ (about 2.0Ω) and $R_p$ (about 0.012Ω) values than PVP/PANMA-800 ($R_{ct}$=~12.8Ω, $R_p$=~0.033Ω) (Table 5) as derived from their corresponding Nyquist impedance plots (FIG. 14B). This result is likely due to the enhanced oxygen concentration (Table 3) and conductivity (FIG. 11C) generated at higher temperatures. The oxygen-enriched surface and improved electrical conductivity, together with the microporous structure possessing higher pore volume in the range of <2 nm, resulted in the carbon fibers containing coal fragments exhibiting reduced internal and ion diffusion resistances of the electrode, and consequently, resulted in higher capacitance than the comparative PVP/PANMA and PANMA-based carbon fibers.

TABLE 5

Electrochemical Impedance Spectroscopy (EIS) Measurements for Carbon Fibers

| Example Carbon Fiber | Composition | $R_{sum}$ (Ω) | $R_s$ (Ω) | $R_{ct}$ (Ω) | $R_p$ (Ω) |
|---|---|---|---|---|---|
| Comparative 1 | PANMA-1000 | 40.523 | 0.300 | 40.100 | 0.024 |
| Comparative 2 | PVP/PANMA-1000 | 4.766 | 0.250 | 4.500 | 0.016 |
| Example 1 | 0.5F/PVP/PANMA-1000 | 3.407 | 0.275 | 3.100 | 0.032 |
| Example 2 | 1F/PVP/PANMA-1000 | 2.641 | 0.220 | 2.400 | 0.021 |
| Example 3 | 2F/PVP/PANMA-1000 | 2.212 | 0.200 | 2.000 | 0.012 |
| Example 4 | 2F/PVP/PANMA-800 | 13.083 | 0.250 | 12.800 | 0.033 |
| Example 5 | 2F/PVP/PANMA-900 | 6.284 | 0.270 | 6.000 | 0.014 |

Since the distance between working and counter electrodes was kept at about 1 cm, the value of $R_s$ (about 0.25Ω) remained about the same for each electrode shown in Table 5. As compared to the $R_{ct}$ value for PANMA-1000 (about 40.1Ω), PVP/PANMA-1000 showed a much lower internal resistance (about 4.5Ω), resulting from the higher concentration of N-P atoms that enhanced the electrical conductivity. Moreover, the $R_{ct}$ value was further linearly reduced by adding coal fragments (FIG. 14A). This phenomena is likely due to (1) the enhanced conductivity and higher graphitization degree of carbon in the carbon fiber containing coal fragments, and (2) the better charge transfer in pseudofaradaic reactions that occurs on oxygen-enriched carbon fiber surfaces.

In contrast, a different trend was observed for the $R_p$ value for each carbon fiber. As shown in Table 5, PVP/PANMA-1000 had a lower ion diffusion resistance (about 0.016Ω) than PANMA-1000 (about 0.0024Ω), which may be due to the generation of an increased mesoporous surface area and pore volume (Table 4) that facilitated ion diffusion into the porous structures. However, by adding about 0.5% coal fragments, the $R_p$ value increased to about 0.032Ω, indicating that the ions had more difficulty in diffusing into the porous structures of the carbon fiber containing coal fragments. Even though a higher micropore surface area and pore volume were achieved via decomposition of coal fragments, the large amount of micropores below about 10 Å might not be available for ion diffusion. Consequently, electrolytes could agglomerate near these micropores (below about 10 Å) and result in higher ion transfer resistance. However, $R_p$ values dropped to about 0.021Ω and about 0.012Ω in 1F/PVP/PANMA-1000 and 2F/PVP/PANMA-1000, with further increasing coal fragment concentration to about 1 wt % and to about 2 wt %, respectively (Table 5). This phenomena is believed to result from the increased wettability caused by the oxygen-enriched carbon fiber surface (FIG. 9E) and the wider mesopore distribution (FIG. 10A) that facilitated ion diffusion into the pores.

Durability of the Carbon Fibers

Figure 15B:
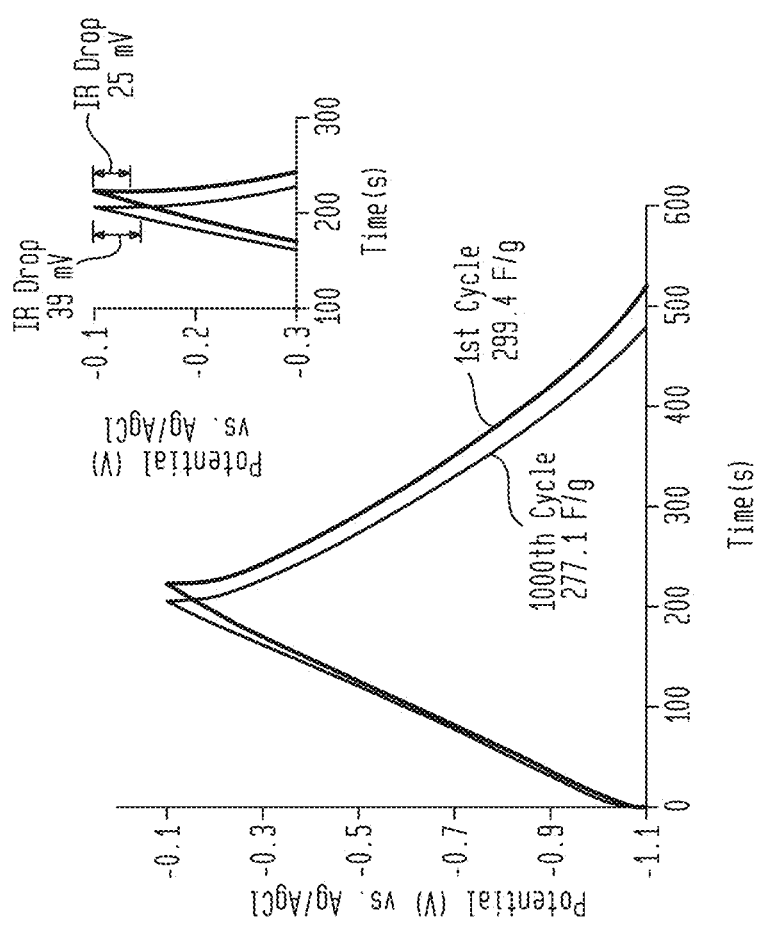
FIG. 15B shows galvanostatic charge-discharge curves at 1 A/g current density, for an example carbon fiber, and the inset is an enlargement of the tips of the charge-discharge curves, according to some embodiments.
Figure 15A:
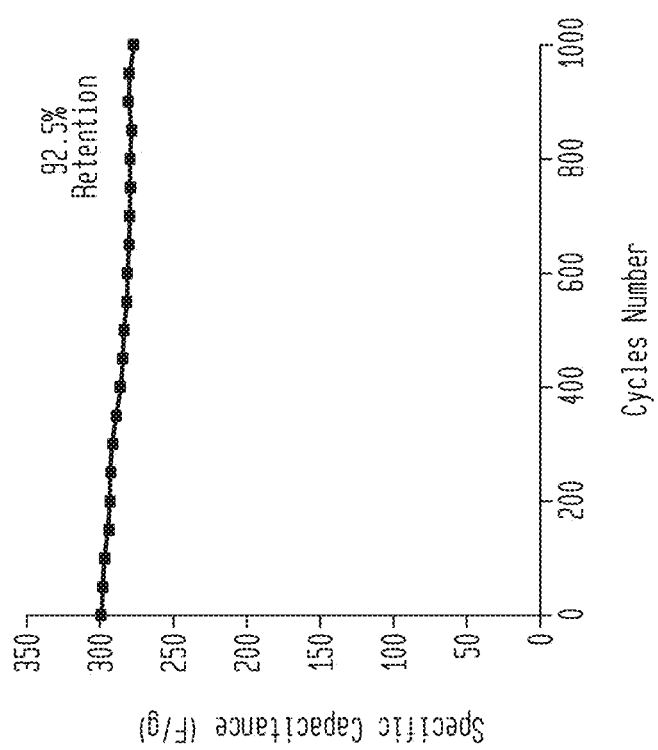
FIG. 15A is a plot of specific capacitance (F/g) versus cycling numbers at 1 A/g current load for an example carbon fiber, according to some embodiments.
Figure 15D:
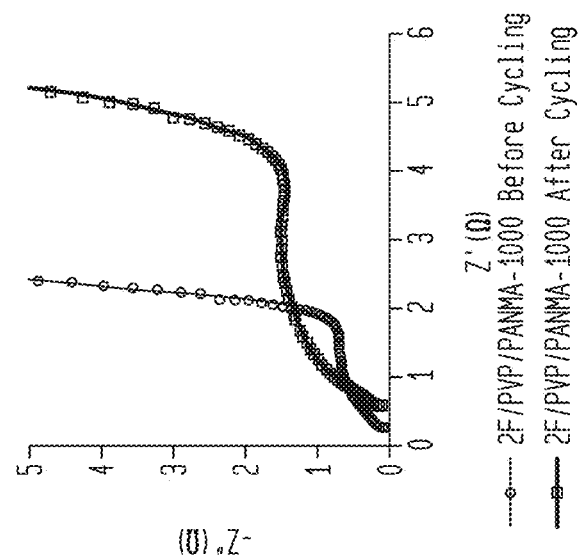
FIG. 15D shows Nyquist impedance plots of an example carbon fiber before and after cycling, according to some embodiments.
Figure 15C:
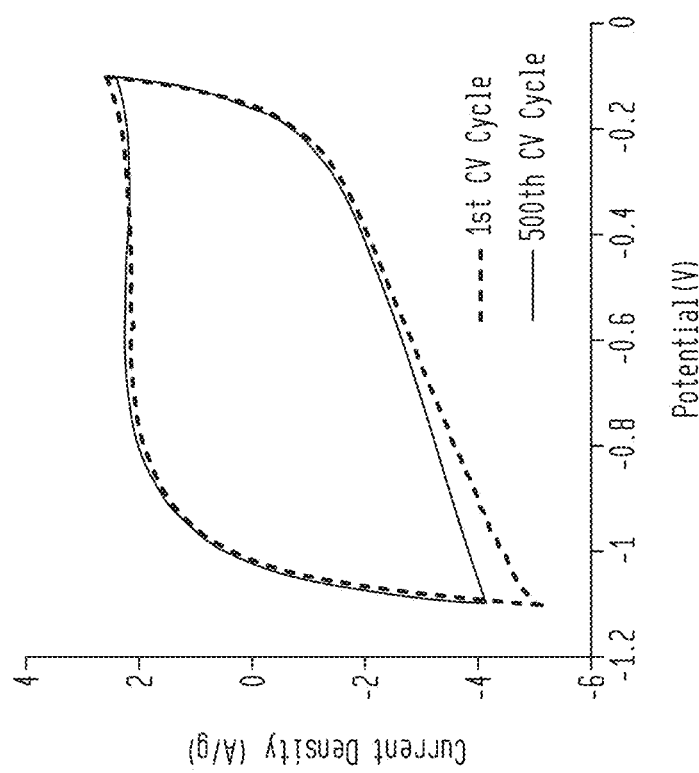
FIG. 15C shows cyclic voltammetry profiles for an example carbon fiber, according to some embodiments.

FIGS. 15A-15D show electrochemical data for the carbon fibers collected over a number of cycles. Durability testing was performed in both 1000 cycles of galvanostatic charge/discharge at 1 A/g current load and 500 cycles of CV at 10 mV/s scan rate. FIG. 15A is a plot of specific capacitance (F/g) versus cycling numbers at a current load of about 1 A/g for an example carbon fiber 2F/PVP/PANMA-1000 from 1 cycle and 1000 cycles. The plot shows that a capacity decay of about 7.5% occurred for 2F/PVP/PANMA-1000 after 1000 cycles. FIG. 15C is a cyclic voltammetry profile for the example carbon fiber 2F/PVP/PANMA-1000 at 1 cycle and 500 cycles. The CV profiles show an insignificant reduction in CV area after 500 cycles. Together, FIGS. 15A and 15C show that carbon fibers containing coal fragments have improved cycle durability.

FIG. 15B shows galvanostatic charge-discharge curves, at a current density of about 1 A/g, for example carbon fiber 2F/PVP/PANMA-1000 at 1 cycle and 1000 cycles. The inset is an enlargement of the tips of the charge-discharge curves. After galvanostatic charge/discharge cycling, the internal resistance (IR) dropped about 14 mV from its initial value (about 25 mV), indicating a higher resistance generated in the carbon fiber after cycling.

FIG. 15D shows Nyquist impedance plots for example carbon fiber 2F/PVP/PANMA-1000 before and after cycling. The Nyquist impedance plots were fitted using $Z_{view}$ software. After fitting the Nyquist impedance plots, the calculated $R_{ct}$ value and $R_p$ value increased to about 3.5Ω and about 0.017Ω after cycling, respectively, indicating a higher resistance after cycling. While not wishing to be bound by theory, it is believed that the loss of oxygen functional groups on the carbon fiber surface and/or the distortion in the carbon network during cycling may cause lower wettability and conductivity, leading to higher internal and ion diffusion resistances and consequently, the decay of carbon fiber capacity.

The data show that PANMA-based carbon fibers can be enriched with oxygen functional groups by adding coal fragments derived from depolymerization of raw coal. Instead of using non-environmentally friendly, harsh acidic conditions to depolymerize coal in a pretreatment operation, ionic liquids can be used to pretreat raw coal useful for carbon fiber applications. As a result of cleaving the intermolecular bounds within the coal network and distorting surface graphite structure caused by the exposure to ionic liquids, the pretreated coal can be well-dissolved in organic solvents. Upon mixing the pretreated coal with precursors such as PANMA and PVP polymers, and electrospinning the mixture, carbon fibers with unique properties can be formed.

Compared to the specific capacitances derived from the PANMA-based carbon fiber (about 124.3 Farads/gram (F/g)) and the PVP/PANMA-based carbon fiber (about 157.8 F/g) in a three electrode cell, adding 2 wt % coal fragments resulted in significantly increased specific capacitance (about 299.4 F/g). Surface chemistry properties, such as porosity and graphitization degree of carbon on the carbon fibers containing coal fragments, showed oxygen to be highly concentrated on the carbon fiber surface (about 21.2%), wider mesopore distribution, and higher microporous volume generated from decomposition of coal fragments, as well as increased graphitization degree of carbon. Such properties, among others, were responsible for the enhancement of wettability and conductivity (about 7.6 S/cm), which in turn resulted in lower internal and ion diffusion resistances calculated from the EIS study. Moreover, because of the quinone-type groups introduced by the coal fragments, pseudocapacitance predominated rather than double-layer capacitance, leading to highly increased capacitances. Durability of the carbon fibers containing coal fragments showed an about 92.5% retention of specific capacitance after 1000 cycles of galvanostatic charge/discharge, indicating a suitable cycle durability of fabricated carbon fibers containing coal fragments. The data reveals that carbon fibers containing coal fragments are durable.

Thus, the fabricated carbon fibers containing coal fragments can be used in a variety of applications, including as a functional energy material to be used in supercapacitor applications, fuel cells, and lithium-ion batteries.

Method of Recovering Rare Earth Elements (REEs) and REE Oxides from Coal

In some embodiments, a coal treatment process is provided. The process includes exposing a material comprising coal to an ionic liquid to form a mixture and extracting one or more of rare earth elements (REEs) and REE compounds (such as REE oxides) from the mixture. Processes such as these allow for preconcentration of REEs and REE compounds using ionic liquids.

In some embodiments, a coal treatment process includes exposing a material comprising coal to one or more ionic liquids to form a first mixture comprising residues; exposing the first mixture to (a) an acid, (b) a solvent, (c) or both to form a second mixture; and obtaining (i.e., isolating) one or more of REEs and REE compounds (such as REE oxides).

Figure 3:
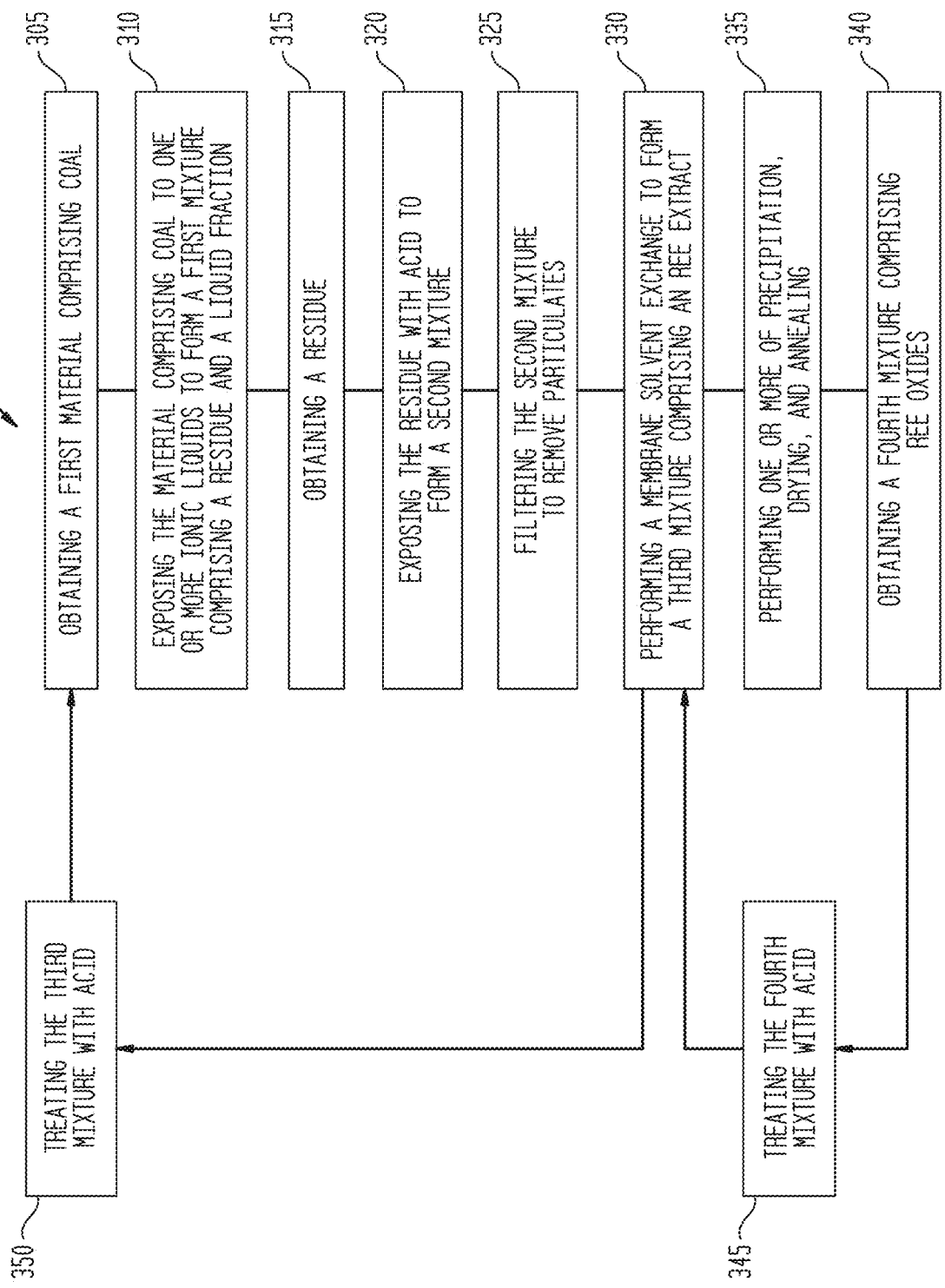
FIG. 3 is a flow diagram of a method of rare earth element (REE) oxide recovery from coal and coal byproducts according to some embodiments.

FIG. 3 shows a method 300 of obtaining (i.e., isolating) one or more of rare earth elements and rare earth element compounds (e.g., REE oxides) according to an embodiment. Method 300 includes obtaining a first material comprising coal at operation 305. The first material includes those materials set forth in operation 205 of FIG. 1, including coal byproducts and ash. Method 300 includes exposing the first material comprising coal to one or more ionic liquids to form a first mixture comprising a residue and a liquid fraction at operation 310, similar to operation 110 of FIG. 1. The ionic liquid(s) useful for method 300 include any ionic liquid as described above. The ionic liquid(s) may be selected based on a zeta potential of a composition comprising an ionic liquid adsorbed on coal. Method 300 includes obtaining a residue (e.g., coal solids and particulates) at operation 315, similar to operation 215 of FIG. 2.

In some embodiments, method 300 includes exposing the residue to acid (such as nitric acid ($HNO_3$) and sulfuric acid ($H_2SO_4$)) to form a second mixture at operation 320. The acids are used to adjust the pH for an accelerated precipitation-microfiltration (APS-MF) process that can be used in operation 325. Alternately, method 300 includes exposing the residue to a solvent, including solvents described herein, to form a second mixture at operation 320. The solvent may further comprise acids.

The second mixture comprises one or more of fine solids, residues, dissolved metals, and dissolved REE ions. The concentration of acid may be determined according to a variety of factors including the type of coal and the type of products desired. For example, coal ash can be exposed to 6M $HNO_3$ to retrieve yttrium and yttrium oxides. The second mixture is filtered to remove fine particulates and solids such as alumina and silica at operation 325. One type of filtration that can be used at operation 325 is an APS-MF. The filtration provides dissolved metals and dissolved REE ions. Method 300 includes performing a membrane solvent exchange to form a third mixture comprising an REE extract at operation 330. The REE extract comprises REEs and REE compounds (such as REE oxides). A cross-flow supported liquid membrane module, similar to those used by others in the art to recycle REEs from semiconductor chips. See *Environ. Sci. Technol.*, 2015, 49 (16), pp 9452-9459. Such membranes allow for further concentration and purification of the REEs. Instead of membranes, adsorption processes may be used.

Method 300 includes obtaining a fourth mixture comprising REEs and REE compounds (such as REE oxides) by performing one or more of precipitation, drying, and annealing at operations 335-340.

In some embodiments, the REE extract may be exposed to (or treated with) an acid such as $HNO_3$ and $H_2SO_4$ at operation 350. This exposure to acid is performed to adjust the pH in order to remove other metals and metal ions, such as calcium. In such embodiments, operation 350 is performed after operation 330, and may be performed according to operation 320. In some embodiments, one or more of operations 305-330 are then performed.

In some embodiments, the mixture comprising REEs and REE compounds may be exposed to (or treated with) an acid such as $HNO_3$ and $H_2SO_4$ at operation 345. In such embodiments, operation 345 is a strip solution recovery operation and is performed after operation 340. In some embodiments, diffusion dialysis systems such as those sold by Mech-Chem Associates, Inc., can be used for the strip solution recovery.

Feedstocks for the coal used for REE recovery include coal and coal byproducts. In some embodiments, it is preferred that the coal or coal byproduct is enriched in critical REE and depleted in radiogenic elements. For example, Wyoming coal ash byproducts, such as overburden, are shown to be enriched in critical REE and depleted in radiogenic elements. In one embodiment, a coal ash that is high in yttrium (Y) content was used for pretreatment with ionic liquids for the REE and REE oxide recovery process.

Figure 16B:
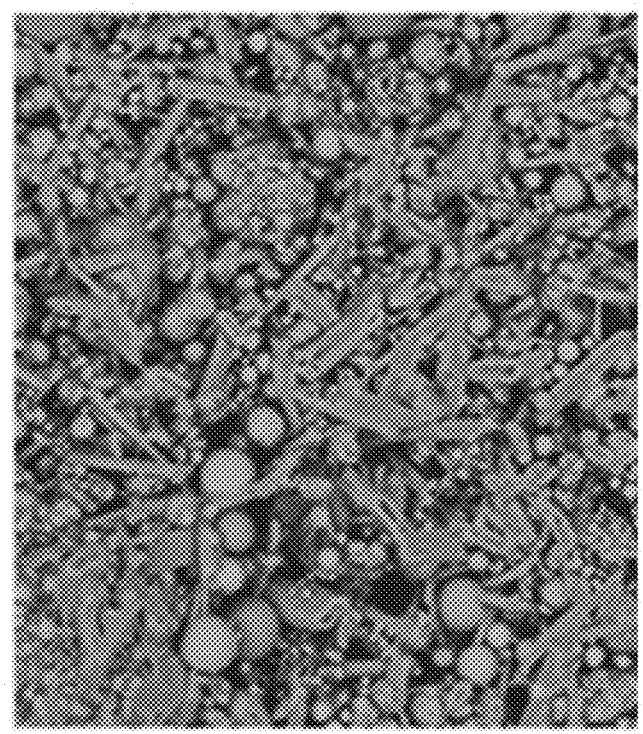
FIG. 16B is a SEM image of Wyoming coal ash before pretreatment with ionic liquids.
Figure 16A:
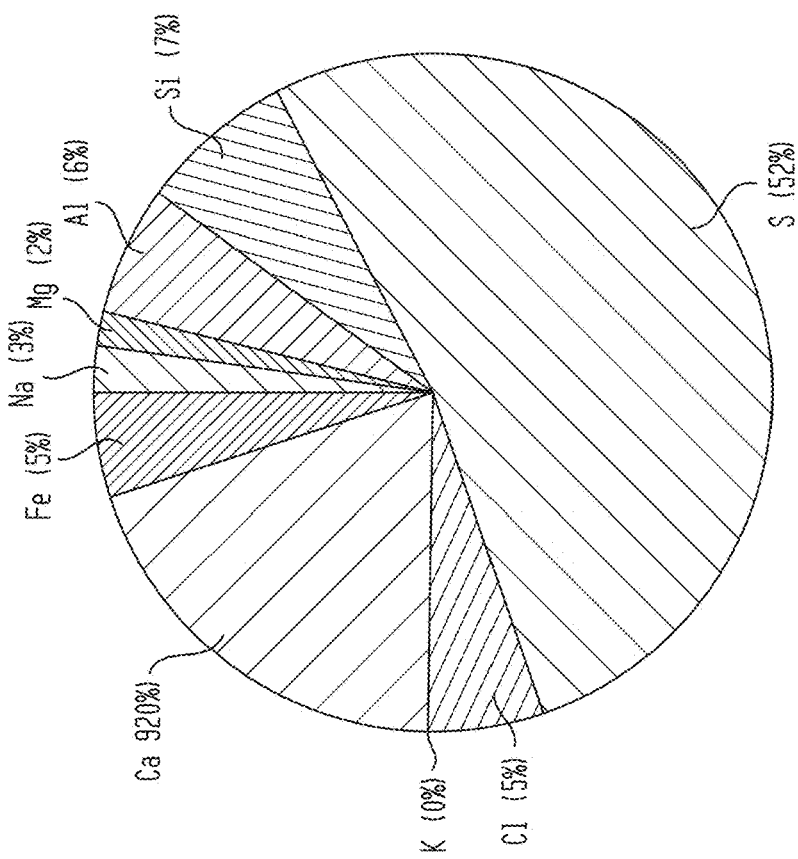
FIG. 16A is an elemental analysis of Wyoming coal ash before pretreatment with ionic liquids.
Figure 17B:
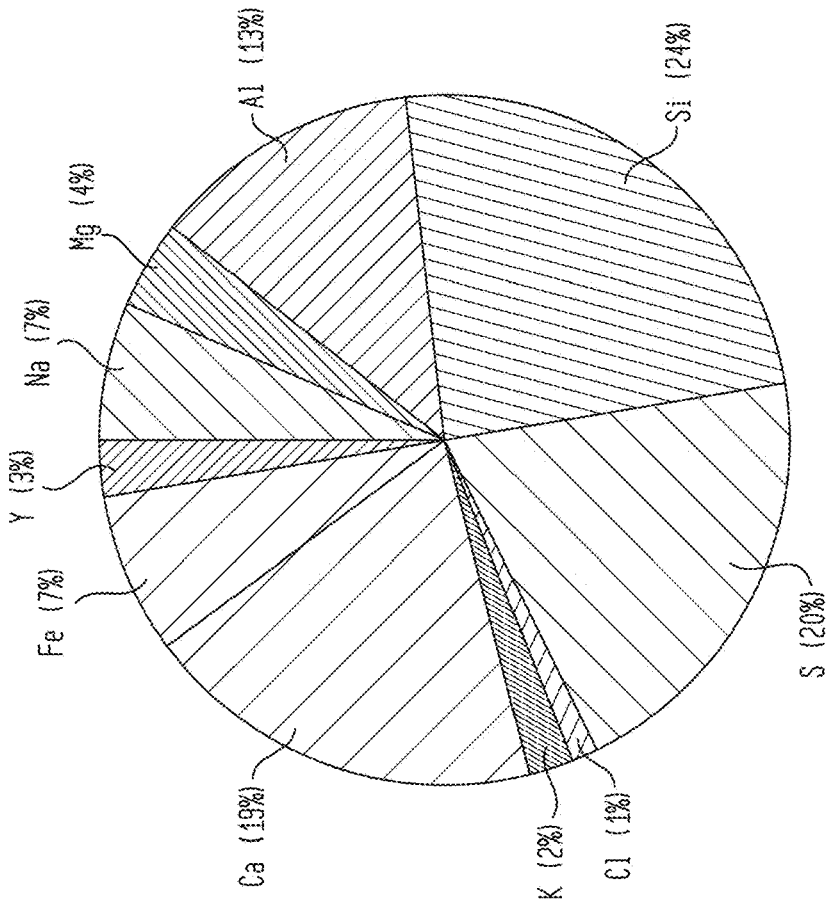
FIG. 17B is a SEM image of Wyoming coal ash before pretreatment with ionic liquids.
Figure 17A:
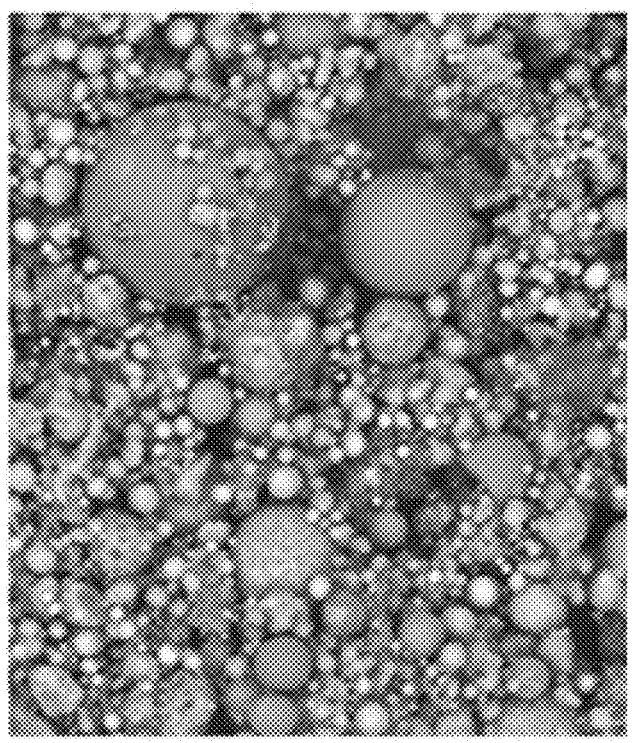
FIG. 17A is an elemental analysis of Wyoming coal ash after pretreatment with ionic liquids.

FIGS. 16A and 17A show elemental analyses of Wyoming coal before pretreatment with [$C_4$mim]Cl and after pretreatment with [$C_4$mim]Cl, respectively. The coal ash sample was from Dry Fork Plant, which burns coal from Wyodak-Anderson coal seam, part of Powder River Basin formation.

FIGS. 16B and 17B are SEM images of coal before pretreatment with ionic liquids and after pretreatement with ionic liquids, respectively. Elemental analyses was performed using SEM equipment (FEI Quanta FEG 450 FESEM instrument) and the accompanying INCA software.

Compared to FIGS. 16A and 16B, the element analysis and the SEM image shown in FIGS. 17A and 17B, respectively, demonstrated that pretreatment with ionic liquids decomposed the fiber-like particles with high concentrations of Ca, S, and Cl, and expose more Y on the particle surface. The amount of Y increased significantly to about 3%. The concentrations of Al, Mg, and other elements increased without dissolving into ionic liquids. Sulfur dissolution into the ionic liquids was also observed, resulting in sulfur concentration decreasing from about 53% to about 20% in the residue particles after pretreatment with the ionic liquids. Therefore, ionic liquids affect the partition of REEs and REE compounds in coal. As such, the pretreatment of coal with ionic liquids can be used to preconcentrate REEs and REE compounds (such as REE oxides) before further concentration, separation, and purification.

Test Methods

Materials: 1-Butyl-3-methylimidazolium hexafluoro-antimonate, 1-Butyl-3-methylimidazolium tetrafluoroborate, 1-butyl-3-methylimidazolium hexafluorophosphate, 1-butyl-3-methylimidazolium bis(trifluoromethanesulfonyl)imide, 1-Butyl-3-methylimidazolium chloride; 1-butyl-2,3-dimethylimidazolium, and 1-Hexyl-3-methylimidazolium chloride may be purchased from Sigma Aldrich at about 97-99% purity.

Standard Reference Material® 2682 subbituminous coal (0.5 wt % sulfur, 250 μm) from Wyodak-Anderson coal seam was purchased from National Institute of Standards. Standard Reference Material® 2684 bituminous coal (3% sulfur in mass fraction, 70 μm in average particle size) from Pittsburgh coal seam was purchased from National Institute of Standards.

1-Methyl-2-pyrrolidinone (NMP) (99.5%) from Sigma-Aldrich was used to dilute viscous coal/ILs solution for centrifugation. N,N-Dimethylformamide (DMF, 99.8%) (Sigma-Aldrich) was used as an organic solvent to dissolve PANMA, PVP and coal residues after pretreatment with ionic liquids. Poly(acrylonitrile-co-methyl acrylate) (PANMA) (acrylonitrile ~94 wt %) and polyvinylpyrrolidone (PVP) (360,000 g/mol) were purchased from Sigma-Aldrich.

Coal extraction yield calculation: Coal residues were washed with deionized water to fully remove DMF and ILs. The resulting coal powders were measured and the weight to determine the yields of coal extraction in liquefaction can be determined by the equation:

$$\text{Yield } (\%) = \frac{W_{coal\ residues}}{W_{raw\ coal} * (1 - \%_{moisture})} \times 100\%$$

where $W_{raw\ coal}$ is the weight of raw coal (e.g., 0.5 g); $\%_{moisture}$ is the percentage of moisture in the raw coal. NIST-2682 coal has 15.133% moisture by weight, while NIST-2684 coal has 1.437% moisture by weight. $W_{coal\ residues}$ is the weight of coal residues after coal extraction.

Zeta Potential Measurement: Zeta potential was measured in a Nanobrook 173 Plus from Brookhaven Instrument, which uses a phase analysis light scattering technique. A 35 mW red diode laser with nominal 640 nm wavelength was used. Aqueous potassium chloride (KCl, about 20 mM) was used as the background electrolyte based on OECD 106 standard "Adsorption-desorption using the batch equilibrium method" known to those skilled in the art. 1 mg of coal (various sizes, typically less than about 1 mm) and an amount of IL were added to aqueous KCl (about 3 ml, about 20 mM). The resulting mixture was sonicated for about 1 hour in order to fully disperse the coal particles, which remain well-dispersed under constant stirring (about 1000 rpm) at about room temperature over about 24 hours. The amount of ionic liquid added is selected so as to obtain different concentrations of IL (about 10 mM, about 50 mM, about 100 mM, about 150 mM, about 200 mM, about 250 mM, and about 300 mM). The concentration range of each IL used in the zeta potential measurements was determined by its solubility in water. 1 ml of the solution was added into a plastic cuvette that was then capped with electrolyte and inserted into a chamber to be analyzed.

Mass spectrometry: Mass spectrometry was performed using a Voyager MALDI-TOFMS (matrix-assisted laser desorption time-of-flight mass spectrometer) available from Applied Biosystems.

Electrospinning: Electrospinning was performed using a EC-DIG digital electrospinning machine from IME Technologies.

Characterizations of Coal Residues after ILs Pretreatment: X-ray diffraction (XRD) patterns of crystalline components in raw coal and coal residues were obtained using a Rigaku Model RU300 instrument with a rotating anode generator and a monochromatic detector. Cu-Kα radiation was used, with a power setting of about 40 kV and about 40 mA. Fourier transform infrared (FT-IR) spectra were recorded in the range of about 600-4000 cm$^{-1}$ by using a Nicolet iS50 (Thermo Scientific) with an iS50 ABX automated beamsplitter exchanger to reflect the change of organic compounds after ILs pretreatment. Raman spectrometry was performed in a DeltaNu ExamineR spectrometer at room temperature with excitation light wavelength of about 732 nm to study the graphitization degree of carbon. Data were collected from about 200 cm$^{-1}$ to about 3200 cm$^{-1}$ with an average spectrum from ten runs. $N_2$ adsorption isotherms using the Barrett-Joyner-Halenda (BJH) method were performed according to methods known in the art. A Brunauer, Emmett, and Teller (BET) surface area measurement was carried out using single point $N_2$ adsorption/desorption cycles at about 75.4 K (Micromeritics ASAP 2020 instrument) to determine the porosity change of coal via ILs pretreatment. Additionally, the Dubinin-Radushkevich (DR) method was used to characterize micropore surface area (about <2 nm) by $CO_2$ at about 273 K, and DFT was used for the pore distribution of carbon fibers derived from the $CO_2$ isotherm. Calculations and values are automatically generated from the software in the BET device. References for DR calculations and equations can be found in *Adsorption*, 1997, 3, 189-195 and *Langmuir*, 1989, 5, 1118-1121. Scanning electron microscope (SEM) images of raw coal and coal residues were obtained from a FEI Quanta FEG 450 FESEM instrument, visually showing the coal structure change after ILs pretreatment.

Characterizations of Carbon Fibers: The surface compositions and compounds on the carbon fibers were characterized via X-ray photoelectron spectroscopy (XPS) with a monochromatic Al-Kα x-ray source under about 10$^{-10}$ torr vacuum. XPS was performed using a Kratos Axis Ultra DLD. Survey scans were performed at 80 eV pass energy with an energy resolution of about 0.5 eV and three sweeps.

High resolution scans of C1s, N1s, and O1s were performed at 40 eV pass energy with an energy resolution of about 0.02 eV and about three sweeps. SEM, Raman spectroscopy, and BET described above were used to characterize the fiber structures, graphitization degree and porosity of the resulting carbon fiber. The electrical conductivity ("σ") of the carbon fiber in the parallel direction was calculated by the equation:

$$\sigma = \frac{L}{A \times R}$$

wherein, the electrical resistance ("R") was measured by a digital micro-ohmmeter, the cross-section ("A") of the carbon fiber was determined by the width and thickness that was measured by a caliper with about 0.001 mm resolution, and "L" is the distance between two electrodes. The density of the carbon fiber was determined by the volume and weight of the measured carbon fiber.

Electrochemical Measurements: All of the electrochemical measurements were performed in a CompactStat.h10800 potentiostat electro-station from Ivium Technology. The electrochemical properties of the carbon fibers were measured in about 6M KOH by using a three electrode cell, which consists of a 0.5 cm×0.5 cm carbon fiber mat with pressed nickel foams on both sides as the working electrode, Pt foil as the counter electrode, and Ag/AgCl as the reference electrode. Cyclic voltammetry (CV) profiles were recorded from about −1.1 V to about −0.1 V at about 10 mV/s. Galvanostatic charge-discharge was performed at the same potential range (about −1.1 V to about −0.1 V) by varying the current densities from about 1 A/g to about 5 A/g. The galvanostatic charge-discharge measurements were used to calculate the specific capacitances of the resulting carbon fibers by the equation:

$$C_s = I_D \times \frac{\Delta t}{\Delta V}$$

wherein $C_s$ is the specific capacitance of the electrode in Farads per gram (F/g), $I_D$ is the discharge current density in ampere per gram (A/g), $\Delta t$ is the discharge time in seconds (s), and $\Delta V$ is the potential range in volts (V). Electrochemical impedance spectroscopy (EIS) was measured with an amplitude of 10 mV in the frequency range from about 10 kHz to about 0.01 Hz. The durability testing was carried out in both 1000 cycles of galvanostatic charge-discharge at about 1 A/g current density and about 500 cycles of CV from about −1.1 V to about −0.1 V at about 5 mV/s scan rate.

Based on the equivalent circuit model, the Nyquist plots of fabricated carbon fibers were fitted using $Z_{view}$ software, well known in the art, to calculate the ion migration resistance in the electrolyte ($R_s$), internal resistance of electrode ($R_{ct}$), and ion diffusion resistance into porous structures of electrode ($R_p$) (Table 5).

While the foregoing is directed to embodiments of the present disclosure, other and further embodiments of the disclosure may be devised without departing from the basic scope thereof, and the scope thereof is determined by the claims that follow.

What is claimed is:

1. A coal treatment method, comprising:
   exposing coal or coal byproducts to an ionic liquid to form residues and a liquid fraction; and
   isolating rare earth elements from the residues by treating the residues with an acid, wherein the isolating rare earth elements further comprises:
      performing a membrane solvent exchange on the residues and the acid to recover an extract comprising the rare earth elements.

2. The method of claim 1, further comprising precipitating the rare earth elements from the extract.

3. The method of claim 1, wherein at least a portion of the rare earth elements are in the form of oxides.

4. A coal treatment method, comprising:
   exposing coal or coal byproducts to an ionic liquid to form residues and a liquid fraction;
   isolating rare earth elements from the residues by treating the residues with an acid;
   removing the liquid fraction prior to treating the residues with the acid; and
   recovering organic compounds by performing solid-phase extraction on the liquid fraction.

5. The method of claim 1, wherein the ionic liquid is represented by formula (A) or formula (B):

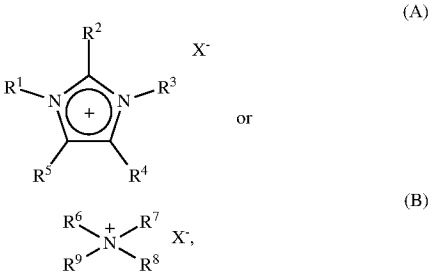

wherein:
   each of $R^1$ and $R^3$ is independently a hydrocarbyl radical or a substituted hydrocarbyl radical;
   each of $R^2$, $R^4$, and $R^5$ is independently a hydrogen, a hydrocarbyl radical, a substituted hydrocarbyl radical, a $C_4$ to $C_{20}$ aryl radical, or a substituted $C_4$ to $C_{20}$ aryl radical;
   each of $R^6$, $R^7$, $R^8$, and $R^9$ is independently a hydrogen, a hydrocarbyl radical, a substituted hydrocarbyl radical, a $C_4$ to $C_{20}$ aryl radical, or a substituted $C_4$ to $C_{20}$ aryl radical, or two or more adjacent $R^6$, $R^7$, $R^8$, and $R^9$ groups are independently joined together to form a substituted or unsubstituted hydrocarbyl ring or heterocyclic ring, where the substituted or unsubstituted hydrocarbyl ring or heterocyclic ring has 5, 6, 7, or 8 ring atoms; and
   X is independently chloride (Cl), bromide (Br), iodide (I), thiocyanate (SCN), hexafluorophosphate ($PF_6$), antimony hexafluoride ($SbF_6$), bis(trifluoromethyl-sulfonyl)imide ($NTf_2$), tetrafluoroborate ($BF_4$), tetracyanoborate ($B(CN)_4$), trifluoromethanesulfonate (OTf), dicyanamide ($N(CN)_2$), alkyl sulfate ($C_nH_{2n+1}OSO_3$, where n=0, 1, or 8, such as methyl sulfate), dimethyl phosphate ($Me_2PO_4$), or acetate ($MeCO_2$).

6. The method of claim 5, wherein:
   each of $R^1$ and $R^3$ is independently a $C_1$ to $C_{20}$ hydrocarbyl radical; and
   both $R^4$ and $R^5$ are hydrogen.

7. The method of claim 6, wherein $R^2$ is hydrogen or methyl.

8. The method of claim 5, wherein the ionic liquid is one or more of

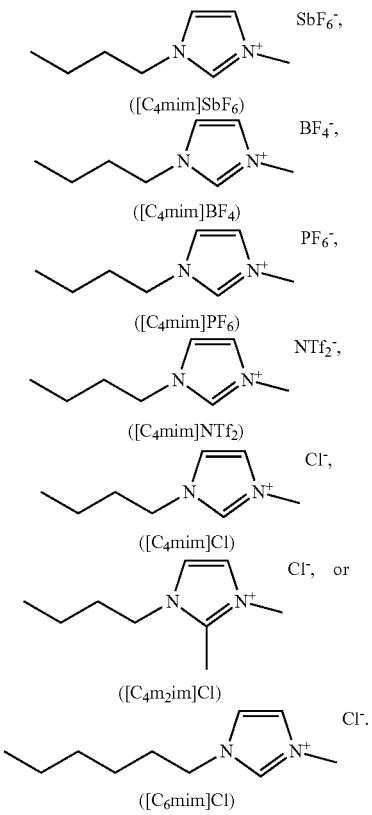

9. The method of claim 1, wherein the acid comprises nitric acid or sulfuric acid.

10. The method of claim 1, wherein:
the coal or the coal byproducts is coal ash; and
the acid is nitric acid.

11. A coal treatment method, comprising:
selecting an ionic liquid based on a zeta potential of a composition comprising the ionic liquid adsorbed on coal;
forming a first mixture comprising coal ash and the ionic liquid, the ionic liquid having the formula

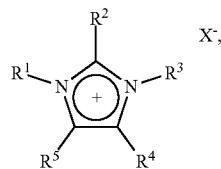

wherein:
each of $R^1$ and $R^3$ is independently a hydrocarbyl radical or a substituted hydrocarbyl radical;
each of $R^2$, $R^4$, and $R^5$ is independently a hydrogen, a hydrocarbyl radical, a substituted hydrocarbyl radical, a $C_4$ to $C_{20}$ aryl radical, or a substituted $C_4$ to $C_{20}$ aryl radical; and
X is independently chloride (Cl), bromide (Br), iodide (I), thiocyanate (SCN), hexafluorophosphate ($PF_6$), antimony hexafluoride ($SbF_6$), bis(trifluoromethyl-sulfonyl)imide ($NTf_2$), tetrafluoroborate ($BF_4$), tetracyanoborate ($B(CN)_4$), trifluoromethanesulfonate (OTf), dicyanamide ($N(CN)_2$), alkyl sulfate ($C_nH_{2n+1}OSO_3$, where n=0, 1, or 8, such as methyl sulfate), dimethyl phosphate ($Me_2PO_4$), or acetate ($MeCO_2$);
exposing the first mixture to an acid and a solvent to form a second mixture; and
isolating rare earth elements or rare earth element oxides from the second mixture.

12. The method of claim 11, wherein the isolating rare earth elements or rare earth element oxides from the second mixture comprises:
performing a membrane solvent exchange on the second mixture to recover an extract; and
removing the rare earth elements or the rare earth element oxides from the extract by precipitating, drying, or annealing.

13. The method of claim 11, wherein the solvent comprises N-methyl-2-pyrrolidone, trifluoroacetic acid, trichloroacetic acid, dichloromethane, dimethylsulfoxide, or combinations thereof.

14. The method of claim 11, wherein the acid comprises nitric acid or sulfuric acid.

15. The method of claim 11, wherein:
each of $R^1$ and $R^3$ is independently a $C_1$ to $C_{20}$ hydrocarbyl radical; and
both $R^4$ and $R^5$ are hydrogen.

16. The method of claim 11, wherein the ionic liquid comprises one or more of

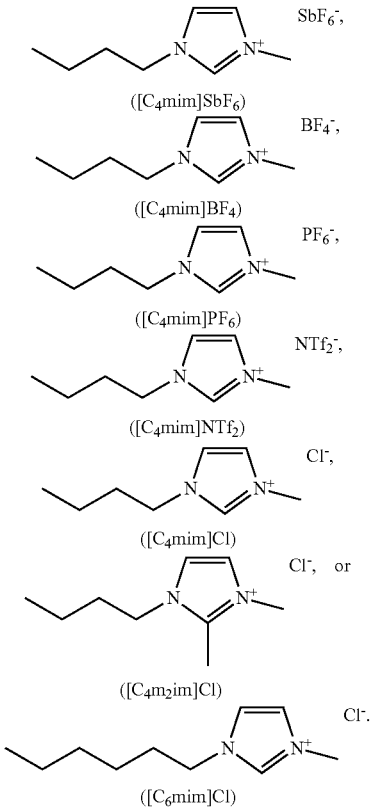

17. The method of claim 11, wherein the ionic liquid comprises one or more of

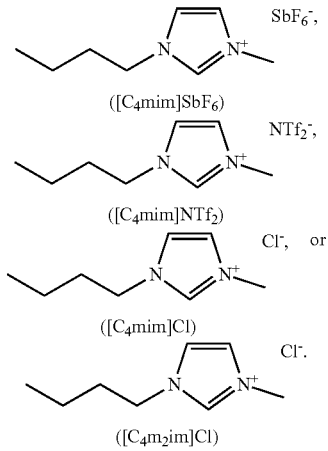

18. A coal treatment method, comprising:
exposing coal to an ionic liquid to obtain a residue, the ionic liquid having the formula

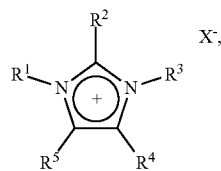

wherein:
each of $R^1$ and $R^3$ is independently a $C_1$ to $C_{20}$ hydrocarbyl radical;
$R^2$ is hydrogen or methyl;
both $R^4$ and $R^5$ are hydrogen; and
X is chloride (Cl), bromide (Br), iodide (I), hexafluorophosphate ($PF_6$), antimony hexafluoride ($SbF_6$), bis(trifluoromethyl-sulfonyl)imide ($NTf_2$), tetrafluoroborate ($BF_4$);
exposing the residue to acid and a solvent to form a mixture, the acid comprising nitric acid or sulfuric acid;
performing a membrane solvent exchange on the mixture to form an extract; and
precipitating, drying, or annealing the extract to obtain rare earth element oxides.

19. The method of claim 18, wherein:
the coal comprises coal ash;
the acid comprises nitric acid; and
the ionic liquid comprises one or more of

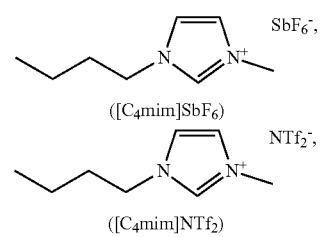

20. The method of claim 4, wherein at least a portion of the rare earth elements are in the form of oxides.

21. The method of claim 4, wherein the ionic liquid is represented by formula (A) or formula (B):

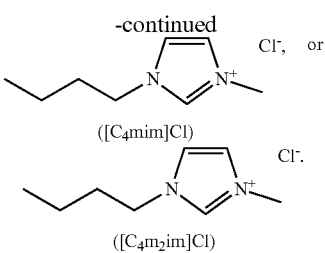

wherein:
each of $R^1$ and $R^3$ is independently a hydrocarbyl radical or a substituted hydrocarbyl radical;
each of $R^2$, $R^4$, and $R^5$ is independently a hydrogen, a hydrocarbyl radical, a substituted hydrocarbyl radical, a $C_4$ to $C_{20}$ aryl radical, or a substituted $C_4$ to $C_{20}$ aryl radical;
each of $R^6$, $R^7$, $R^8$, and $R^9$ is independently a hydrogen, a hydrocarbyl radical, a substituted hydrocarbyl radical, a $C_4$ to $C_{20}$ aryl radical, or a substituted $C_4$ to $C_{20}$ aryl radical, or two or more adjacent $R^6$, $R^7$, $R^8$, and $R^9$ groups are independently joined together to form a substituted or unsubstituted hydrocarbyl ring or heterocyclic ring, where the substituted or unsubstituted hydrocarbyl ring or heterocyclic ring has 5, 6, 7, or 8 ring atoms; and
X is independently chloride (Cl), bromide (Br), iodide (I), thiocyanate (SCN), hexafluorophosphate ($PF_6$), antimony hexafluoride ($SbF_6$), bis(trifluoromethyl-sulfonyl)imide ($NTf_2$), tetrafluoroborate ($BF_4$), tetracyanoborate ($B(CN)_4$), trifluoromethanesulfonate (OTf), dicyanamide ($N(CN)_2$), alkyl sulfate ($C_nH_{2n+1}OSO_3$, where n=0, 1, or 8, such as methyl sulfate), dimethyl phosphate ($Me_2PO_4$), or acetate ($MeCO_2$).

22. The method of claim 21, wherein:
each of $R^1$ and $R^3$ is independently a $C_1$ to $C_{20}$ hydrocarbyl radical; and
both $R^4$ and $R^5$ are hydrogen.

23. The method of claim 22, wherein $R^2$ is hydrogen or methyl.

24. The method of claim 21, wherein the ionic liquid is one or more of

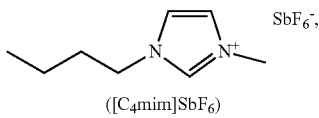

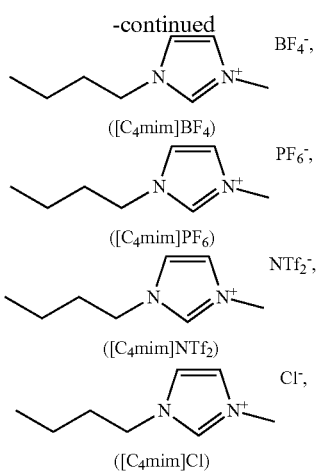
([C₄mim]BF₄)
([C₄mim]PF₆)
([C₄mim]NTf₂)
([C₄mim]Cl)
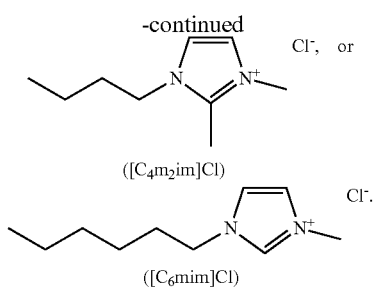
([C₄m₂im]Cl)
([C₆mim]Cl)
25. The method of claim 4, wherein the acid comprises nitric acid or sulfuric acid.
26. The method of claim 4, wherein:
the coal or the coal byproducts is coal ash; and
the acid is nitric acid.
* * * * *